(12) United States Patent
Phillips et al.

(10) Patent No.: US 11,198,316 B2
(45) Date of Patent: Dec. 14, 2021

(54) OPTICAL STRUCTURES PROVIDING DICHROIC EFFECTS

(71) Applicant: WAVEFRONT TECHNOLOGY, INC., Paramount, CA (US)

(72) Inventors: Roger Winston Phillips, Santa Rosa, CA (US); Christopher Chapman Rich, Rancho Palos Verdes, CA (US); Joel Mikael Petersen, Valley Village, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 0 days.

(21) Appl. No.: 16/780,777

(22) Filed: Feb. 3, 2020

(65) Prior Publication Data
US 2020/0316981 A1 Oct. 8, 2020

Related U.S. Application Data

(60) Provisional application No. 62/829,572, filed on Apr. 4, 2019.

(51) Int. Cl.
| | |
|---|---|
| *B42D 25/373* | (2014.01) |
| *B42D 25/355* | (2014.01) |
| *B42D 25/29* | (2014.01) |
| *B42D 25/378* | (2014.01) |
| *B42D 25/351* | (2014.01) |
| *B42D 25/45* | (2014.01) |
| *C09D 11/102* | (2014.01) |

(52) U.S. Cl.
CPC .......... *B42D 25/373* (2014.10); *B42D 25/29* (2014.10); *B42D 25/351* (2014.10); *B42D 25/355* (2014.10); *B42D 25/378* (2014.10); *B42D 25/45* (2014.10)

(58) Field of Classification Search
CPC .... B42D 25/373; B42D 25/29; B42D 25/351; B42D 25/355; B42D 25/378; B42D 25/45
USPC .................. 283/72, 82, 83, 94, 98, 901, 904
See application file for complete search history.

(56) References Cited

U.S. PATENT DOCUMENTS

| | | | |
|---|---|---|---|
| 2,278,970 A | 4/1942 | Atwood et al. | |
| 2,590,906 A | 4/1952 | Tripp | |
| 3,338,730 A | 8/1967 | Slade et al. | |

(Continued)

FOREIGN PATENT DOCUMENTS

| | | |
|---|---|---|
| EP | 0 277 423 | 8/1988 |
| KR | 10-2019-0028142 | 3/2019 |

(Continued)

OTHER PUBLICATIONS

Dobrowolski et al., "Research on Thin Film Anticounterfeiting Coatings at the National Research Council of Canada", Applied Optics, Jul. 15, 1989, vol. 28, No. 14, pp. 2702-2717.

(Continued)

*Primary Examiner* — Justin V Lewis
(74) *Attorney, Agent, or Firm* — Knobbe, Martens, Olson & Bear, LLP

(57) ABSTRACT

A document, product, or package, such as a banknote, passport or the like comprises structures having dichroic effects that change color with viewing angle in both transmission and reflection. Such structures can be useful as security features that counter the ability to effectively use counterfeit documents, products, packages, etc.

22 Claims, 27 Drawing Sheets

(56) References Cited

U.S. PATENT DOCUMENTS

| | | | |
|---|---|---|---|
| 3,553,001 | A | 1/1971 | Kohlschutter et al. |
| 4,417,784 | A | 11/1983 | Knop et al. |
| 4,434,010 | A | 2/1984 | Ash |
| 4,705,300 | A | 11/1987 | Berning et al. |
| 5,059,245 | A | 10/1991 | Phillips et al. |
| 5,084,351 | A | 1/1992 | Philips et al. |
| 5,135,812 | A | 8/1992 | Phillips et al. |
| 5,171,363 | A | 12/1992 | Phillips et al. |
| 5,278,590 | A | 1/1994 | Phillips et al. |
| 5,698,268 | A | 12/1997 | Takagi et al. |
| 5,877,895 | A | 3/1999 | Shaw et al. |
| 6,031,653 | A | 2/2000 | Wang |
| 6,106,983 | A | 8/2000 | Burke |
| 6,114,018 | A | 9/2000 | Phillips et al. |
| 6,256,146 | B1 | 7/2001 | Merrill et al. |
| 6,524,381 | B1 | 2/2003 | Phillips et al. |
| 6,797,366 | B2 | 9/2004 | Hanson et al. |
| 6,833,184 | B2 | 12/2004 | Damnjanovic et al. |
| 6,838,166 | B2 | 1/2005 | Phillips et al. |
| 6,875,522 | B2 | 4/2005 | Seto et al. |
| 7,238,424 | B2 | 7/2007 | Raksha et al. |
| 7,470,318 | B2 | 12/2008 | Cao et al. |
| 7,811,725 | B2 | 10/2010 | Chen et al. |
| 9,274,258 | B2 | 3/2016 | Fuhse et al. |
| 10,525,759 | B2 | 1/2020 | Rahm et al. |
| 10,838,218 | B2 | 11/2020 | Phillips et al. |
| 2003/0063239 | A1 | 4/2003 | Suzuki |
| 2003/0137736 | A1 | 7/2003 | Phillips |
| 2003/0190473 | A1 | 10/2003 | Argoitia et al. |
| 2008/0160185 | A1 | 7/2008 | Endle et al. |
| 2008/0315574 | A1 | 12/2008 | Emerich et al. |
| 2009/0078316 | A1 | 3/2009 | Khazeni et al. |
| 2012/0170124 | A1 | 7/2012 | Fuhse et al. |
| 2014/0191500 | A1 | 7/2014 | Holmes |
| 2014/0285892 | A1* | 9/2014 | Sauvage-Vincent ... G02B 5/008 359/572 |
| 2017/0068025 | A1 | 3/2017 | Ockenfuss |
| 2017/0239972 | A1 | 8/2017 | Zhang et al. |
| 2017/0248746 | A1 | 8/2017 | Banerjee et al. |
| 2018/0117951 | A1 | 5/2018 | Demange et al. |
| 2018/0170094 | A1 | 6/2018 | Raksha et al. |
| 2019/0107726 | A1 | 4/2019 | Phillips et al. |
| 2019/0225003 | A1 | 7/2019 | Raksha |

FOREIGN PATENT DOCUMENTS

| | | |
|---|---|---|
| WO | WO 02/040599 | 5/2002 |
| WO | WO 2011/051668 | 5/2011 |
| WO | WO 2016/005158 | 1/2016 |
| WO | WO 2016/082153 | 6/2016 |
| WO | WO 2019/070335 | 4/2019 |
| WO | WO 2020/205053 | 10/2020 |

OTHER PUBLICATIONS

Glausch et al., "Special Effect Pigments", Vincentz Verlag, Hannover, Germany, 1998, pp. 5-13.

Glausch et al., "Special Effect Pigments", Vincentz Verlag, Hannover, Germany, 1998, pp. 36-39.

"Insights into New OVDs", Presented by Dr. Mark Deakes at The Holography Conference, Nov. 2017, Barcelona, 38 pages.

Leech, Patrick W., "Microrelief Structures for Anti-Counterfeiting Applications", Microelectronic Engineering 65, 2003, pp. 439-446.

Program of the Topical Meeting on Optical Interference Coatings, Optical Society of America, Asilomar Conference Grounds, Pacific Grove, California, Feb. 24-26, 1976, 24 pages.

Rancourt, James D., "Optical Thin Films: User's Handbook", Macmillan Publishing Company, 1987, Ch. 4, pp. 110-113.

Sandberg, Howard, "The History of Dichroic Glass", https://web.archive.org/web/20111108142943/http://www.cbs-dichroic.com/Dichro-History.pdf, Nov. 8, 2011, 3 pages.

Van Renesse, Rudolf L., "Optical Document Security", 2nd Edition, 1998, Fig. 4.6, pp. 88-89.

Van Renesse, Rudolf L., "Optical Document Security", 2nd Edition, 1998, pp. 300-303.

Wang, Yu, "Metal/Dielectric-Film Interference Color Filters", NASA Tech Briefs, vol. 23, No. 2, Electronics & Computers, Feb. 1, 1999, 3 pages.

Invitation to Pay Additional Fees received in PCT Application No. PCT/US2018/045278, dated Sep. 28, 2018 in 2 pages.

International Search Report and Written Opinion received in PCT Application No. PCT/US2018/045278, dated Dec. 12, 2018 in 21 pages.

International Preliminary Report on Patentability and Written Opinion received in PCT Application No. PCT/US2018/045278, dated Apr. 16, 2020 in 18 pages.

International Search Report and Written Opinion received in PCT Application No. PCT/US2020/016448, dated Jun. 16, 2020 in 14 pages.

European Commission, "Counterfeit and Piracy Watch List", http://trade.ec.europa.eu/doclib/docs/2018/december/tradoc_157564.pdf, 2018, 40 pages.

"Global Brand Counterfeiting Report, 2018—Research and Markets", https://www.researchandmarkets.com/reports/4438394/global-brand-counterfeiting-report-2018, 3 pages.

"Mosaic", <https://web.archive.org/web/20200128063103/http://www.en.wikipedia.org/wiki/Mosaic>, as archived Jan. 28, 2020 in 35 pages.

Preliminary Amendment as filed in U.S. Appl. No. 16/054,898 dated Dec. 4, 2018.

Restriction Requirement received in U.S. Appl. No. 16/054,898 dated Aug. 21, 2019.

Response to Restriction Requirement as filed in U.S. Appl. No. 16/054,898 dated Oct. 21, 2019.

Notice of Allowance received in U.S. Appl. No. 16/054,898 dated Nov. 12, 2019.

Notice of Allowance received in U.S. Appl. No. 16/054,898 dated Feb. 28, 2020.

Notice of Allowance received in U.S. Appl. No. 16/054,898 dated Jun. 30, 2020.

Amendment as filed in U.S. Appl. No. 16/054,898 dated Sep. 30, 2020.

Park et al., "Trans-Reflective Color Filters Based on a Phase Compensated Etalon Enabling Adjustable Color Saturation", *Scientific Reports*, May 6, 2016, vol. 6, No. 1, 10 pages, retrieved from http://www.nature.com/articles/srep25496.pdf.

* cited by examiner

CIE 1931 Chromaticity Diagram

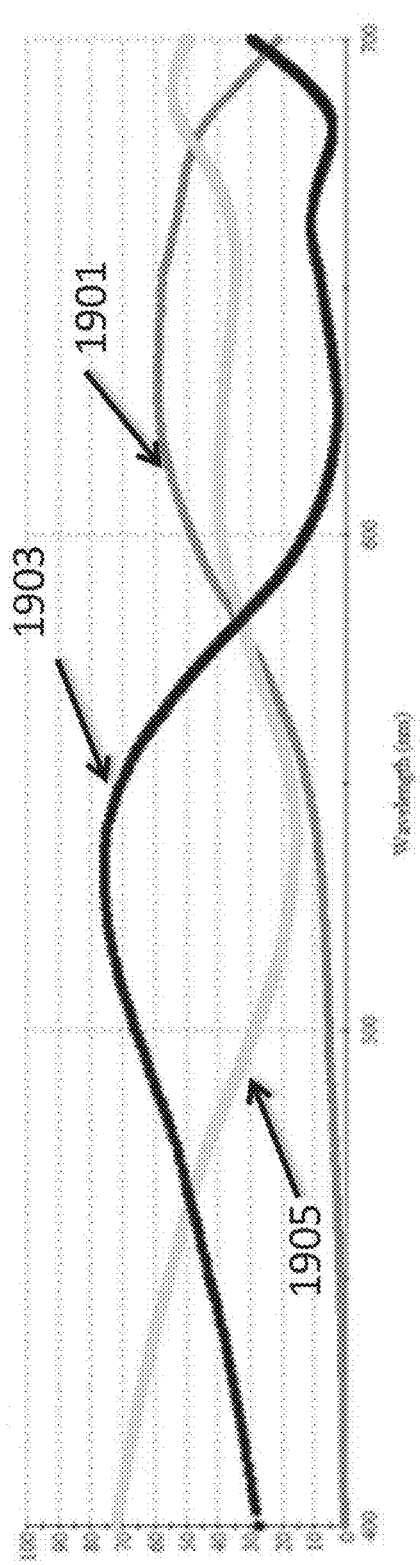
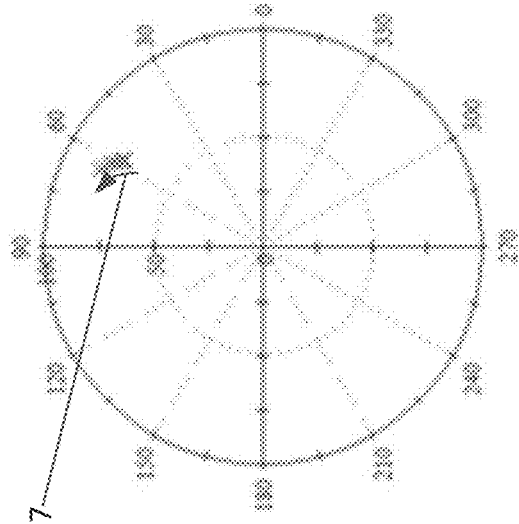
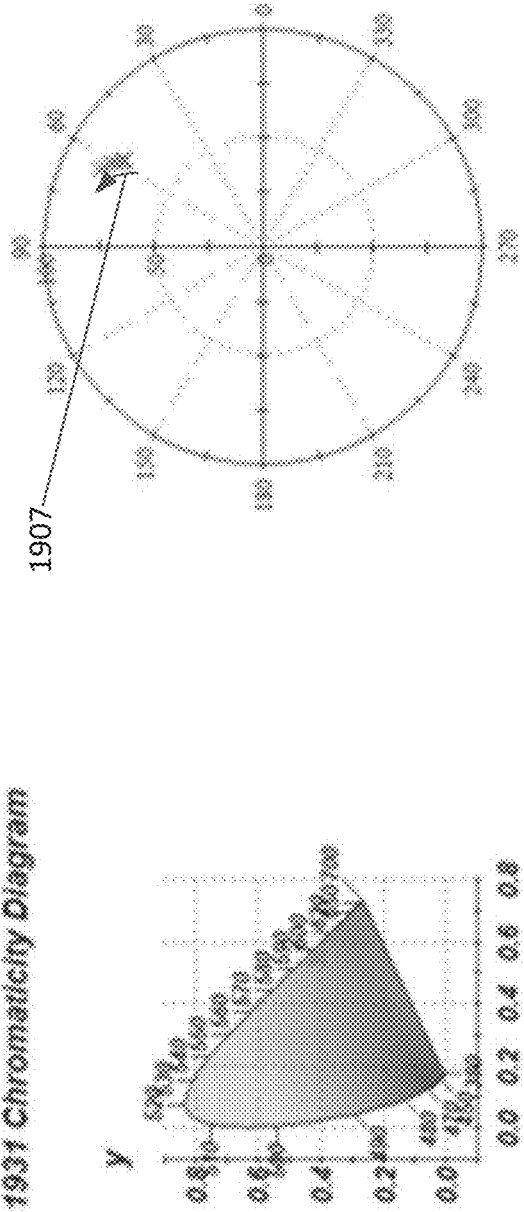
Fig. 19A
Fig. 19C
Fig. 19B

OPTICAL STRUCTURES PROVIDING DICHROIC EFFECTS

INCORPORATION BY REFERENCE TO ANY PRIORITY APPLICATIONS

This application claims the benefit of priority of U.S. Provisional Application No. 62/829,572 filed on Apr. 4, 2019, the entire disclosure of which is expressly incorporated herein by reference.

STATEMENT REGARDING FEDERALLY SPONSORED R&D

This invention was made with government support under Contract No. TEPS 16-34769 awarded by the Bureau of Engraving and Printing. The government has certain rights in the invention.

TECHNICAL FIELD

The present application generally relates to thin interference optical structures, films, coatings and pigments for producing color in both reflection mode and transmission mode. More specifically, these structures, films, coatings, and pigments exhibit large color shifting properties with changes in both reflection and transmission potentially with a change in the angle of incidence or the viewing angle.

DESCRIPTION OF THE RELATED TECHNOLOGY

Color shifting features can be used as a security device (for example, on a banknote) to prevent counterfeiting. The color shifting effect produced by the color shifting materials can be easy for the common person to observe. The color shifting effect produced by the color shifting features, however, can be impractical to recreate using counterfeit copies produced by color copiers, printers and/or photographic equipment. Color copiers, printers and/or photographic equipment use pigments based on dyes having absorption and as such the printed colors can be insensitive to a change in the viewing angle. Therefore, the difference between an authentic document comprising color shifting features and a fake one can be detected by tilting the document to observe if there is a color shift. Some color shifting features that are available are opaque and exhibit a color shift for reflection mode. Additionally, counterfeiters have developed sophisticated methods that compromise the effectiveness the existing reflective color shifting features as counterfeit protection. Thus, with respect to security devices, a new security feature that is difficult to counterfeit and can be readily incorporated into an item such as a banknote is desirable.

SUMMARY

This application discloses and contemplates a wide variety of structures including some at least partially transmissive optical structures. Advantageously, variations of such at least partially transmissive optical structures can present a color shift in both reflection mode and transmission mode with respect to viewing angle. Also, variations of such at least partially transmissive optical structures can be integrated with documents (e.g., a banknote), packaging as well as potential other items to, for example, enhance security and/or prevent counterfeiting. Although such features described herein can be used in security applications such as reducing the incidence of counterfeiting, alternatively or in addition, such feature could be used for providing an aesthetic effect or for other reasons.

This application contemplates documents, products, and packaging with features (e.g., security features) that provides an optical effect of changing color with angle of observation in both reflection and transmission. The color shift with respect to viewing angle in both reflection and transmission can be achieved by incorporating the at least partially transmissive optical structures in the document, product, packaging etc., as a security feature. The at least partially transmissive optical structures can be a dichroic structure. The at least partially transmissive optical structures can be in the form of a thin film coating on a flexible support or base layer such as a sheet, web or carrier. In some embodiments, the at least partially transmissive optical structures comprise a pigment. In some cases, an assembly of particles comprising the at least partially transmissive optical structures can be included in a medium and form, for example an ink. The optical effect from the assembly of particles can provide a color shift in reflection and transmission. The color in transmission may be the complement color of the color perceived in reflection mode, or it maybe a non-complementary color In some such embodiments, each particle can comprise the same structure or similar structures.

Some implementations of the at least partially transmissive optical structures contemplated herein can comprise at least two metal layers that sandwich at least one transparent layer between the at least two metal layers. The at least one transparent layer sandwiched between the at least two metal layers can have a refractive index that is greater than, less than or equal to 1.65. The at least partially transmissive optical structures contemplated herein can further comprise transparent layers on the other side of the at least two metal layers. The transparent layers on the side of the at least two metal layers opposite the side facing the sandwiched at least one transparent layer can have a refractive index greater than or equal to 1.65. The at least two metal layers can comprise metals that have a ratio of their real (n) and imaginary (k) refractive index less than 1.0. Accordingly, the metals of the at least two metal layers can have the ratio n/k<1. Without any loss of generality, the real part n is the refractive index and indicates the phase velocity, while the imaginary part k is called the extinction coefficient and can relate to absorption. The at least two metal layers can comprise silver, silver alloys, aluminum, gold, as well as other metals or materials or combination thereof.

Various optical structures contemplated in this application can provide color shift when viewed in reflection and transmission mode as a function of viewing angle. Hence these structures can be incorporated as security features for documents such as banknotes or other documents to verify authenticity of the documents. Structures contemplated in this application can be configured to be used as a security thread, as a laminate, as a hot stamp, as a window patch or as pigment. The laminate comprising a substrate (e.g., PET), the dichroic thin film and the protective UV cured resin can be adhered as a unit to the banknote with an adhesive. Structures contemplated in this application can be configured to be used in a printing ink. Non-shifting transparent dyes or pigments can be incorporated with the optical structures contemplated in this application to obtain new colors when viewed in reflection and transmission mode. It is further contemplated that the two or more at least partially transmissive optical structures can be disposed over each other (e.g., printed or laminated over each other) to produce unique color effects. The at least partially transmissive optical structures contemplated herein can be configured or arranged to form, include or otherwise display text, symbols, numbers or figures that appear and/or disappear in reflection or transmission as the viewing angle of the security device is changed. In other configurations, the figures, images, numbers, pictures or symbols can be viewed at substantially all angles in transmission. For example, if the figures, images, numbers, pictures or symbols are printed in black, then they can be viewed at substantially all angles in transmission. In some cases, for example text, numbers, pictures or symbols can be underprinted and/or overprinted under and/or over the at least partially transmissive optical structures using existing printing technologies.

The at least partially transmissive optical structures can be included in or on or configured as a film, a foil, a coating, a pigment or an ink. When configured as a pigment, in some implementations, the pigment can be encapsulated with a protective layer. The protective layer can comprise $SiO_2$. The protective layer can comprise a solution prepared using a sol-gel technology such as, for example, acid or based catalyzed tetraethylorthosilicate (TEOS) reactions for increased durability. In some cases, the protective layer can further comprise silica spheres having same or different sizes. A silane coupling agent can be bonded with the protective layer comprising silica ($SiO_2$). The silane coupling agent can be bonded to a resin, ink or paint vehicle. The resin, ink or paint vehicle can comprise a material, such as, for example, acrylic melamine, urethanes, polyesters, vinyl resins, acrylates, methacrylate, acrylonitrile butadiene styrene (ABS) resins, epoxies, styrenes and formulations based on alkyd resins and combinations or mixtures thereof. In some implementations, the at least partially transmissive optical structures can be encapsulated, for example, with an encapsulating layer having a refractive index that matches or closely matches the refractive index of the article to which it is applied. In certain implementations, the encapsulating layer can comprise a rough surface so that particles will not tend to stick together or stick to print rollers. The encapsulating layer can comprise a UV curing polymer.

These and other aspects of the at least partially transmissive optical structures will be apparent from their accompanying drawings and this specification.

The at least partially transmissive optical structures disclosed herein can be used for security features included in documents, products, packages, etc., in particular, as security threads in bank notes or as a laminated strip, or as a patch or as a window. Other items such as passports, ID cards, chip cards, credit cards, stock certificates or other investment securities, vouchers, admission tickets as well as commercial packages that protect items of value such as CD's, medicinal drugs, car and aircraft parts, etc. may also be protected against counterfeiting using the concepts and embodiments described herein. Furthermore, the at least partially transmissive optical structures disclosed herein can also be used for non-security applications.

Although some of the optical structures discussed herein can provide color shift with viewing angle, optical structures that do not exhibit color shift with change in viewing angle or produce very little color shift with change in viewing angle are also contemplated.

The systems, methods and devices disclosed herein each have several innovative aspects, no single one of which is solely responsible for the desirable attributes disclosed herein. A variety of example systems and methods are provided below.

Example 1

An optical structure comprising: a first transparent dielectric layer having a refractive index greater than or equal to 1.65;

a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;

a second transparent dielectric layer disposed over the first metal layer;

a second metal layer disposed over the second transparent dielectric layer, the second metal layer having a second refractive index, wherein a ratio of the real part (n) of the second refractive index to the imaginary part (k) of the second refractive index is greater than or equal to 0.01 and less than or equal to 0.5; and a third transparent dielectric layer disposed over the second metal layer, the third transparent dielectric layer having a refractive index greater than or equal to 1.65.

Example 2

The optical structure of Example 1, wherein the second transparent dielectric layer has a refractive index less than 1.65.

Example 3

The optical structure of any of Examples 1-2, wherein the second transparent dielectric layer has a refractive index greater than or equal to 1.65.

Example 4

The optical structure of any of Examples 1-3, having a transmission peak comprising:

a maximum transmittance greater than 50%; and a spectral bandwidth defined by a full width of the transmission peak at 50% of the maximum transmittance, wherein the maximum transmittance is at least 50%, and wherein the spectral bandwidth of the transmission peak is greater than 2 nm.

Example 5

The optical structure of Example 4, wherein the spectral bandwidth of the transmission peak is greater than or equal to about 10 nm and less than or equal to about 200 nm.

Example 6

The optical structure of any of Examples 4-5, wherein the maximum transmittance is at a wavelength between about 400 nm and about 700 nm.

Example 7

The optical structure of any of Examples 4-6, further comprising a reflection peak comprising:

a maximum reflectance; and a spectral bandwidth defined by a full width of the reflection peak at 50% of the maximum reflectance, wherein the maximum reflectance is at least 50%, and wherein the spectral bandwidth of the reflection peak is greater than 2 nm.

Example 8

The optical structure of Example 7, wherein the spectral bandwidth of the reflection peak is greater than or equal to about 10 nm and less than or equal to about 200 nm.

Example 9

The optical structure of any of Examples 7-8, wherein the maximum reflectance is at a wavelength between about 400 nm and about 700 nm.

Example 10

The optical structure of any of Examples 7-9, wherein the maximum transmittance is at a first wavelength, and wherein the maximum reflectance is at a second wavelength different from the first wavelength.

Example 11

The optical structure of any of Examples 1-10, configured to display a first color when viewed by an average human eye along a direction normal to a surface of the optical structure in reflection mode and a second color different from the first color when viewed by an average human eye along a direction normal to a surface of the optical structure in transmission mode.

Example 12

The optical structure of Example 11, wherein the first color shifts to a third color when viewed by an average human eye along a direction at an angle away from the normal to the surface of the optical structure in reflection mode.

Example 13

The optical structure of any of Examples 11-12, wherein the second color shifts to a fourth color when viewed by an average human eye along a direction at an angle away from the normal to the surface of the optical structure in transmission mode.

Example 14

The optical structure of any of Examples 1-13, wherein the first or the second metal layer has a thickness greater than or equal to about 5 nm and less than or equal to about 35 nm.

Example 15

The optical structure of any of Examples 1-14, wherein the second transparent dielectric layer has a thickness greater than or equal to about 100 nm and less than or equal to about 2 microns.

Example 16

The optical structure of any of Examples 1-15, wherein first or the third transparent dielectric layer has a thickness greater than or equal to about 100 nm and less than or equal to about 500 nm.

Example 17

The optical structure of any of Examples 1-16, further comprising an encapsulating layer comprising silica.

Example 18

The optical structure of Example 17, wherein the silica is bonded to a silane coupling agent.

Example 19

The optical structure of Example 18, wherein the silane coupling agent is configured to bind to an ink or paint medium.

Example 20

The optical structure of any of Examples 1-19, wherein the first or the second metal layer comprises at least one of aluminum, silver, gold, silver alloy, or gold alloy.

Example 21

The optical structure of any of Examples 1-20, wherein the second transparent dielectric layer comprises a material having a refractive index less than 1.65, greater than 1.65 or equal to 1.65.

Example 22

The optical structure of any of Examples 1-21, wherein the second transparent dielectric layer comprises at least one of $SiO_2$, $MgF_2$ or a polymer.

Example 23

The optical structure of any of Examples 1-22, wherein the first or the third transparent dielectric layer comprises at least one of zinc oxide (ZnO), zinc sulfide (ZnS), zirconium dioxide ($ZrO_2$), titanium dioxide ($TiO_2$), tantalum pentoxide ($Ta_2O_5$), ceric oxide ($CeO_2$), yttrium oxide ($Y_2O_3$), indium oxide ($In_2O_3$), tin oxide ($SnO_2$), indium tin oxide (ITO), tungsten trioxide ($WO_3$), or combinations thereof.

Example 24

The optical structure of any of Examples 1-23, wherein the first or the second metal layer has a thickness greater than or equal to about 5 nm, or less than or equal to about 35 nm.

Example 25

The optical structure of any of Examples 1-24, wherein the second transparent dielectric layer has a thickness greater than or equal to about 100 nm, or less than or equal to about 700 nm.

Example 26

The optical structure of any of Examples 1-25, wherein the first or the third transparent dielectric layer has a thickness greater than or equal to about 100 nm, or less than or equal to about 500 nm.

Example 27

The optical structure of any of Examples 1-26, configured as a pigment, a paint or an ink.

Example 28

The optical structure of any of Examples 1-27, further comprising a base layer configured to support the first dielectric layer, wherein the optical structure is configured as film.

Example 29

The optical structure of Example 28, wherein the base layer is flexible.

Example 30

The optical structure of any of Examples 28-29, wherein the base layer comprises a polymer.

Example 31

The optical structure of any of Examples 28-30, wherein the film is surrounded by a protective barrier.

Example 32

The optical structure of Example 31, wherein the protective barrier comprises a UV curable resin.

Example 33

The optical structure of any of Examples 1-32, further comprising an encapsulating layer, wherein the optical structure is configured as a pigment, a paint or an ink.

Example 34

The optical structure of Example 33, wherein the encapsulating layer comprises silicon dioxide ($SiO_2$).

Example 35

The optical structure of any of Examples 33-34, further comprising a plurality of silica spheres embedded in the encapsulating layer.

Example 36

The optical structure of Example 35, wherein some of the plurality of silica spheres have a size different from a size of some other of the plurality of silica spheres.

Example 37

The optical structure of any of Examples 33-36, wherein the encapsulating layer is chemically attached to a silane coupling agent, the silane coupling agent comprising a reactive group that is configured to chemically bond with an ink or a paint medium.

Example 38

The optical structure of Example 37, wherein the ink or the paint medium comprises a material selected from the group consisting of acrylic melamine, urethanes, polyesters, vinyl resins, acrylates, methacrylate, ABS resins, epoxies, styrenes and formulations based on alkyd resins and mixtures thereof.

Example 39

The optical structure of any of Examples 37-38, wherein the ink or the paint medium comprises a resin or a polymer.

Example 40

A banknote or a document comprising the optical structure of any of Examples 1-39.

Example 41

The banknote or document of Example 40, wherein the optical structure is configured as laminate that is attached to the banknote or document.

Example 42

The banknote or document of Example 40, wherein the optical structure is configured as a security thread that is inserted in the banknote or document.

Example 43

The banknote or document of Example 40, wherein the optical structure is configured as a label that is attached to the banknote or document.

Example 44

The banknote or document of Example 40, further comprising a window, wherein the optical structure is incorporated in the window.

Example 45

A document having a security feature comprising:
a main body of the document; and
an optical structure comprising:
a first transparent dielectric layer having a refractive index greater than or equal to 1.65;
a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;
a second transparent dielectric layer disposed over the first metal layer;
a second metal layer disposed over the second transparent dielectric layer, the second metal layer having a second refractive index, wherein a ratio of the real part (n) of the second refractive index to the imaginary part (k) of the second refractive index is greater than or equal to 0.01 and less than or equal to 0.5; and
a third transparent dielectric layer having a refractive index greater than or equal to 1.65 disposed over the second metal layer,
wherein the optical structure is configured to display a first color in reflection mode and display a second color different from the first color in transmission mode.

Example 46

The security document of Example 45, further comprising a second optical structure comprising:

a fourth transparent dielectric layer having a refractive index greater than or equal to 1.65;

a third metal layer disposed over the fourth transparent dielectric layer, the third metal layer having a third refractive index, wherein a ratio of the real part (n) of the third refractive index to the imaginary part (k) of the third refractive index (k) is greater than or equal to 0.01 and less than or equal to 0.5;

a fifth transparent dielectric layer disposed over the third metal layer;

a fourth metal layer disposed over the fifth transparent dielectric layer, the fourth metal layer having a fourth refractive index, wherein a ratio of the real part (n) of the fourth refractive index to the imaginary part (k) of the fourth refractive index is greater than or equal to 0.005 and less than or equal to 0.5; and a sixth transparent dielectric layer having a refractive index greater than or equal to 1.65 disposed over the fourth metal layer, wherein the second optical structure is configured to display a third color in reflection mode different from the first and the second color and display a fourth color different from the first, second and the third color in transmission mode.

Example 47

The security document of Example 46, wherein the optical structure or the second optical structure is configured as a film attached to the main body of the document.

Example 48

The security document of any of Examples 46-47, wherein the optical structure or the second optical structure is configured as a thread inserted into the main body of the document.

Example 49

The security document of any of Examples 46-48, wherein the optical structure or the second optical structure is configured as a laminate disposed over the main body of the document.

Example 50

The security document of any of Examples 46-49, wherein the optical structure or the second optical structure is configured as an ink, a dye, or a paint contacting the main body of the document.

Example 51

The security document of any of Examples 46-50, further comprising a first window comprising the optical structure and a second window comprising the second optical structure.

Example 52

The security document of any of Examples 46-51, wherein the optical structure is configured as a dichroic ink, a dichroic pigment or a dichroic paint that is configured to produce a first color at a first viewing angle and a second color at a second viewing angle.

Example 53

The security document of any of Examples 46-52, wherein the document is printed with the dichroic ink, the dichroic pigment or the dichroic paint.

Example 54

The security document of Example 53, wherein the dichroic ink, the dichroic pigment or the dichroic paint is disposed over, under or mixed with a non-dichroic ink, pigment, or paint that is configured to produce the first color at the first and the second viewing angles.

Example 55

The security document of Example 54, wherein the non-dichroic, ink pigment or paint forms a text, an image, a number or a symbol.

Example 56

The security document of Example 55, wherein the text, the image, the number or the symbol is invisible at the first viewing angle and visible at the second viewing angle.

Example 57

A method of manufacturing a security feature configured to produce a first color in reflection mode and a second color in transmission mode, the method comprising:
  providing a base layer; and
  disposing an optical structure on the base layer, the optical structure comprising:
    a first transparent dielectric layer on the base layer, the first transparent dielectric layer having a refractive index greater than or equal to 1.65;
    a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;
    a second transparent dielectric layer disposed over the first metal layer;
    a second metal layer disposed over the second transparent dielectric layer, the second metal layer having a second refractive index, wherein a ratio of the real part (n) of the second refractive index to the imaginary part (k) of the second refractive index is greater than or equal to 0.01 and less than or equal to 0.5; and
    a third transparent dielectric layer disposed over the second metal layer, the third dielectric layer having a refractive index greater than or equal to 1.65.

Example 58

The method of Example 57, wherein disposing the optical structure on the base layer comprises:
  coating the first transparent dielectric layer on the base layer;
  depositing the first metal layer on the first transparent dielectric layer;
  disposing the second transparent dielectric layer on the first metal layer;
  depositing the second metal layer on the second transparent dielectric layer; and disposing the third transparent dielectric layer on the second metal layer.

Example 59

The method of any of Examples 57-58, further comprising:
cutting a strip of the base layer with the optical structure; and
coating the strip with a UV curable polymer to obtain a security thread.

Example 60

The method of any of Examples 57-58, further comprising:
removing the optical structure from the base layer;
fragmenting optical structure into platelets having an area that is between five times and about ten times the thickness of the optical structure;
encapsulating the platelet in an encapsulation layer comprising a plurality of silica spheres;
attaching a silane coupling agent to the encapsulating layer; and
mixing the platelets with an ink or a paint medium to obtain a dichroic ink or paint.

Example 61

The method of any of Examples 57-60, wherein the base layer is flexible.

Example 62

The method of any of Examples 57-61, wherein the base layer comprise web.

Example 63

An optical structure comprising:
a substrate;
a first optical structure over the substrate; and
a second optical structure over the substrate, the first optical structure and the second optical structure at least partially overlapping,
wherein the each of the first and the second optical structure comprises:
a first transparent dielectric layer having a refractive index greater than or equal to 1.65;
a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;
a second transparent dielectric layer disposed over the first metal layer;
a second metal layer disposed over the second transparent dielectric layer, the second metal layer having a second refractive index, wherein a ratio of the real part (n) of the second refractive index to the imaginary part (k) of the second refractive index is greater than or equal to 0.01 and less than or equal to 0.5; and
a third transparent dielectric layer disposed over the second metal layer, the third transparent dielectric layer having a refractive index greater than or equal to 1.65,
wherein a thickness of the various layers of the first optical structure is configured to reflect a first color and transmit a second color different from the first color, and
wherein a thickness of the various layers of the second optical structure is configured to reflect a third color different from the first color and transmit a fourth color different from the first, the second or the third color.

Example 64

The optical structure of Example 63, wherein the first and the second optical structures are completely overlapping.

Example 65

The optical structure of any of Examples 63-64, wherein the first and the second optical structures are configured as films.

Example 66

The optical structure of any of Examples 63-65, wherein the first and the second optical structures are configured as pigments.

Example 67

The optical structure of any of Examples 63-66, wherein the first and the second optical structures are configured as laminates.

Example 68

The optical structure of any of Examples 63-67, wherein the first and the second optical structures are configured as security threads.

Example 69

A document having a security feature comprising:
a main body of the document; and
a pigment disposed on the main body, the pigment comprising:
an optical structure comprising:
a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;
a transparent dielectric layer disposed over the first metal layer; and
a second metal layer disposed over the transparent dielectric layer, the second metal layer having a second refractive index, wherein a ratio of the real part (n) of the second refractive index to the imaginary part (k) of the second refractive index is greater than or equal to 0.01 and less than or equal to 0.5; and
an encapsulation layer encapsulating the optical structure.

Example 70

The document of Example 69, wherein the encapsulation layer comprises silica.

Example 71

The document of any of Examples 69-70, wherein the pigment produces a first color at a first viewing angle and a second color different from the first color at a second viewing angle.

Example 72

The document of any of Examples 69-71, wherein the pigment comprises a resin configured to chemically attach to the encapsulation layer.

Example 73

The document of any of Examples 69-72, wherein the optical structure has a thickness, and wherein a length or a width of the optical structure is at least 5 times the thickness.

Example 74

An optical structure comprising:
a dielectric region having an outer surface enclosing a volume of a dielectric material; and
a partially optically transmissive metal layer surrounding the outer surface of the dielectric region,
wherein a thickness of the optical structure has a value between about 100 nm and about 2 micron,
wherein a lateral dimension of the optical structure is between about 1 micron and about 20 micron, and
wherein the optical structure is configured to display a first color in a reflection mode and display a second color different from the first color in transmission mode.

Example 75

The optical structure of Example 74, further comprising a second dielectric region comprising one or more dielectric materials having a refractive index greater than about 1.65, the second dielectric region surrounding the partially optically transmissive metal layer.

Example 76

The optical structure of any of Examples 74-75, wherein the partially optically transmissive metal layer covers at least 80% of the outer surface of the dielectric region.

Example 77

The optical structure of any of Examples 74-76, wherein the partially optically transmissive metal layer covers at least 90% of the outer surface of the dielectric region.

Example 78

The optical structure of any of Examples 74-77, wherein the partially optically transmissive metal layer covers 100% of the outer surface of the dielectric region.

Example 79

The optical structure of any of Examples 74-78, wherein the dielectric region is spherical, ellipsoidal or round.

Example 80

The optical structure of any of Examples 74-79, wherein the dielectric region is a cube or a rectangular cuboid.

Example 81

The optical structure of any of Examples 74-80, wherein the dielectric region comprises a particle.

Example 82

The optical structure of any of Examples 74-81, wherein the partially optically transmissive metal layer comprises silver.

Example 83

The optical structure of any of Examples 74-82, wherein the partially optically transmissive metal layer has a thickness between about 3 nm and about 40 nm.

Example 84

The optical structure of any of Examples 74-83, wherein the dielectric region comprises silicon dioxide or titanium dioxide.

Example 85

The optical structure of any of Examples 75-84, wherein the second dielectric layer comprises a material having a refractive index greater than about 1.65.

Example 86

The optical structure of any of Examples 75-85, wherein the second dielectric layer comprises titanium dioxide.

Example 87

The optical structure of any of Examples 75-86, wherein the second dielectric layer covers at least 80% of the outer surface of the partially optically transmissive metal layer.

Example 88

The optical structure of any of Examples 75-87, wherein the second dielectric layer covers at least 90% of the outer surface of the partially optically transmissive metal layer.

Example 89

The optical structure of any of Examples 75-88, wherein the second dielectric layer covers at least 95% of the outer surface of the partially optically transmissive metal layer.

Example 90

The optical structure of any of Examples 75-89, wherein the second dielectric layer covers 100% of the outer surface of the partially optically transmissive metal layer.

Example 91

The optical structure of any of Examples 74-90, wherein said dielectric region comprises $SiO_2$.

Example 92

The optical structure of any of Examples 74-91, wherein said dielectric region comprises $TiO_2$.

Example 93

The optical structure of any of Examples 74-92, wherein said dielectric region comprises borosilicate with a high refractive index metal oxide layer thereon.

Example 94

The optical structure of any of Examples 74-93, wherein said dielectric region comprises borosilicate with $TiO_2$ thereon.

Example 95

The optical structure of any of Examples 74-94, wherein said dielectric region comprises borosilicate with $SiO_2$ thereon.

Example 96

The optical structure of any of Examples 74-95, included in a security thread or security ink.

Example 97

The optical structure of any of Examples 74-95, included in a film, a thread, a foil, or a laminate.

Example 98

The optical structure of any of Examples 74-95, included in a flexible film having a flexible base.

Example 99

The optical structure of any of Examples 74-95, included in a pigment, a paint or an ink.

Example 100

A security document comprising the optical structure of any of Examples 74-99.

Example 101

A security document comprising the optical structure of any of Examples 74-100, wherein the first color and second color are complementary colors.

Example 102

A method of manufacturing a dichroic ink or paint configured to produce a first color in reflection mode and a second color in transmission mode, the method comprising:
providing a base layer; and
disposing an optical structure on the base layer, the optical structure comprising:
a first metal layer disposed on the base layer, the first metal layer having a first refractive index, wherein a ratio of the real part (n) of the first refractive index to the imaginary part (k) of the first refractive index (k) is greater than or equal to 0/01 and less than or equal to 0.5;
a first transparent dielectric layer disposed over the first metal layer; and
a second metal layer disposed over the first transparent dielectric layer, the second metal layer having a second refractive index, wherein a ratio of the real part (n) of the second refractive index to the imaginary part (k) of the second refractive index is greater than or equal to 0.01 and less than or equal to 0.5.

Example 103

The method of Example 102, further comprising:
removing the optical structure from the base layer;
fragmenting optical structure into platelets having an area that is between five times and about ten times the thickness of the optical structure; and
dispersing the platelets in an ink medium or a paint medium to obtain a dichroic ink or paint.

Example 104

The method of Example 103, further comprising encapsulating an individual platelet in an encapsulation layer comprising a plurality of silica spheres.

Example 105

The method of Example 104, further comprising attaching a silane coupling agent to the encapsulating layer.

Example 106

The method of any of Examples 102-105, wherein the optical structure further comprises:
a second transparent dielectric layer between the base layer and the first metal layer, the second transparent dielectric layer having a refractive index greater than or equal to 1.65; and
a third transparent dielectric layer disposed over the second metal layer, the third dielectric layer having a refractive index greater than or equal to 1.65.

Example 107

A dichroic ink or paint configured to produce a first color in reflection mode and a second color in transmission mode, the dichroic ink or paint comprising:
a base layer; and
an optical structure on the base layer, the optical structure comprising:
a first metal layer disposed on the base layer, the first metal layer having a first refractive index, wherein a ratio of the real part (n) of the first refractive index to the imaginary part (k) of the first refractive index (k) is greater than or equal to 0.01 and less than or equal to 0.5;
a first transparent dielectric layer disposed over the first metal layer; and
a second metal layer disposed over the first transparent dielectric layer, the second metal layer having a second refractive index, wherein a ratio of the real part (n) of the second refractive index to the imaginary part (k) of the second refractive index is greater than or equal to 0.01 and less than or equal to 0.5.

Example 108

The dichroic ink or paint of Example 107, wherein the optical structure further comprises:

a second transparent dielectric layer between the base layer and the first metal layer, the second transparent dielectric layer having a refractive index greater than or equal to 1.65; and a third transparent dielectric layer disposed over the second metal layer, the third dielectric layer having a refractive index greater than or equal to 1.65.

Example 109

The dichroic ink or paint of any of Examples 107-108, further comprising an ink medium or a paint medium comprising the optical structure, wherein the optical structure has a thickness between 100 nm and 2 micron, and wherein a lateral dimension of the optical structure is between 1 micron and 20 micron.

Example 110

An optical structure comprising:

a dielectric region having an outer surface enclosing a volume of a dielectric material; and a partially optically transmissive metal layer surrounding the outer surface of the dielectric region, wherein a thickness of the optical structure has a value between about 100 nm and about 2 micron, wherein a lateral dimension of the optical structure is between about 100 nm and about 20 micron, and wherein the optical structure is configured to display a first color in a reflection mode and display a second color different from the first color in transmission mode.

Example 111

The optical structure of Example 110, further comprising a second dielectric region comprising one or more dielectric materials having a refractive index greater than about 1.65, the second dielectric region surrounding the partially optically transmissive metal layer.

Example 112

The optical structure of any of Examples 110-111, wherein the partially optically transmissive metal layer covers at least 80% of the outer surface of the dielectric region.

Example 113

The optical structure of any of Examples 110-112, wherein the partially optically transmissive metal layer covers at least 90% of the outer surface of the dielectric region.

Example 114

The optical structure of any of Examples 110-113, wherein the partially optically transmissive metal layer covers 100% of the outer surface of the dielectric region.

Example 115

The optical structure of any of Examples 110-114, wherein the dielectric region is spherical, ellipsoidal or round.

Example 116

The optical structure of any of Examples 110-115, wherein the dielectric region is a cube or a rectangular cuboid.

Example 117

The optical structure of any of Examples 110-116, wherein the dielectric region comprises a particle.

Example 118

The optical structure of any of Examples 110-117, wherein the partially optically transmissive metal layer comprises silver.

Example 119

The optical structure of any of Examples 110-118, wherein the partially optically transmissive metal layer has a thickness between about 3 nm and about 40 nm.

Example 120

The optical structure of any of Examples 110-119, wherein the dielectric region comprises silicon dioxide or titanium dioxide.

Example 121

The optical structure of any of Examples 111-120, wherein the second dielectric layer comprises a material having a refractive index greater than about 1.65.

Example 122

The optical structure of any of Examples 111-121, wherein the second dielectric layer comprises titanium dioxide.

Example 123

The optical structure of any of Examples 111-122, wherein the second dielectric layer covers at least 80% of the outer surface of the partially optically transmissive metal layer.

Example 124

The optical structure of any of Examples 111-123, wherein the second dielectric layer covers at least 90% of the outer surface of the partially optically transmissive metal layer.

Example 125

The optical structure of any of Examples 111-124, wherein the second dielectric layer covers at least 95% of the outer surface of the partially optically transmissive metal layer.

Example 126

The optical structure of any of Examples 111-125, wherein the second dielectric layer covers 100% of the outer surface of the partially optically transmissive metal layer.

Example 127

The optical structure of any of Examples 110-126, wherein said dielectric region comprises $SiO_2$.

Example 128

The optical structure of any of Examples 110-127, wherein said dielectric region comprises $TiO_2$.

Example 129

The optical structure of any of Examples 110-128, wherein said dielectric region comprises borosilicate with a high refractive index metal oxide layer thereon.

Example 130

The optical structure of any of Examples 110-129, wherein said dielectric region comprises borosilicate with $TiO_2$ thereon.

Example 131

The optical structure of any of Examples 110-130, wherein said dielectric region comprises borosilicate with $SiO_2$ thereon.

Example 132

The optical structure of any of Examples 110-131, included in a security thread or security ink.

Example 133

The optical structure of any of Examples 110-132, included in a thread, a foil, or a laminate.

Example 134

The optical structure of any of Examples 110-133, included in a flexible film having a flexible base.

Example 135

The optical structure of any of Examples 110-134, included in a pigment, a paint or an ink.

Example 136

A security document comprising the optical structure of any of Examples 110-135.

Example 137

A security document comprising the optical structure of any of Examples 110-136, wherein the first color and second color are complementary colors.

Example 138

The optical structure of any of Examples 1-26, configured as a foil, a thread or a laminate.

Example 139

The optical structure of any of Examples 110-112, wherein the partially optically transmissive metal layer covers at least 95% of the outer surface of the dielectric region.

Example 140

The optical structure of any of Examples 74-76, wherein the partially optically transmissive metal layer covers at least 95% of the outer surface of the dielectric region.

Example 141

The security document of Example 55, wherein the text, the image, the number or the symbol is invisible at the second viewing angle and visible at the first viewing angle.

Example 142

The method of Example 58, wherein disposing the second transparent dielectric layer on the first metal layer comprises depositing the second transparent dielectric layer on the first metal layer.

Example 143

The method of Example 58, wherein disposing the third transparent dielectric layer on the second metal layer comprises depositing the third transparent dielectric layer on the second metal layer.

Example 144

The method of Example 57 or 58, further comprising:
removing the optical structure from the base layer;
fragmenting optical structure into platelets having an area that is between five times and about ten times the thickness of the optical structure;
attaching a silane coupling agent to the optical structure; and
mixing the platelets with an ink or a paint medium to obtain a dichroic ink or paint.

Example 145

The method of Example 144, further comprising:
encapsulating the platelet in an encapsulation layer; and
attaching the silane coupling agent to the encapsulation layer.

Example 146

The method of Example 58, further comprising depositing the first metal layer on the first transparent dielectric layer using an electroless method.

Example 147

The method of Example 58, further comprising depositing the second metal layer on the second transparent dielectric layer using an electroless method.

Example 148

A pigment comprising:
an optical structure comprising:
a first metal layer disposed over the first transparent dielectric layer, the first metal layer having a first refractive index, wherein a ratio of the real part (n) of the first refractive index to the imaginary part (k) of the first refractive index (k) is greater than or equal to 0.01 and less than or equal to 0.5;
a transparent dielectric layer disposed over the first metal layer; and
a second metal layer disposed over the transparent dielectric layer, the second metal layer having a second refractive index, wherein a ratio of the real part (n) of the second refractive index to the imaginary part (k) of the second refractive index is greater than or equal to 0.01 and less than or equal to 0.5.

Example 149

The pigment of Example 148, further comprising an encapsulation layer encapsulating the optical structure.

Example 150

The pigment of Example 149, wherein the encapsulation layer comprises silica.

Example 151

The pigment of any of Examples 148-150, further comprising a resin configured to chemically attach to the encapsulation layer.

Example 152

The pigment of any of Examples 148-151, configured to produce a first color at a first viewing angle and a second color different from the first color at a second viewing angle.

Example 153

The pigment of any of Examples 148-152, wherein the optical structure has a thickness, and wherein a length or a width of the optical structure is at least 5 times the thickness.

Example 154

A document comprising the pigment of any of Examples 148-153, the document comprising a main body and the pigment disposed on the main body.

Example 155

A packaging comprising the pigment of any of Examples 148-153, the packaging comprising a main body and the pigment disposed on the main body.

Example 156

The optical structure of any of Examples 1-26, configured as a foil.

Example 157

The optical structure of any of Examples 1-26, configured as a thread.

Example 158

The optical structure of any of Examples 1-26, configured as a laminate.

Example 159

The optical structure of any of Examples 110-132, included in a thread.

Example 160

The optical structure of any of Examples 110-132, included in a foil.

Example 161

The optical structure of any of Examples 110-132, included in a laminate.

Example 162

A document having a security feature comprising:
a main body of the document; and
a pigment disposed on the main body, the pigment comprising:
an optical structure comprising at least three metal layers and at least two dielectric layers,
wherein the at least two dielectric layers are disposed on opposite sides of a first metal layer of the at least three metal layers, and remaining metal layers of the at least three metal layers are disposed on a side of the at least two dielectric layers opposite the side facing the first metal layer,
wherein a ratio of the real part (n) of a refractive index of the at least three metal layers to the imaginary part (k) of the refractive index of the at least three metal layers is greater than or equal to 0.01 and less than or equal to 0.2.

Example 163

The document of Example 162, wherein the pigment produces a first color in a reflection mode and a second color different from the first color in a transmission mode.

Example 164

The document of any of Examples 162-163, wherein the pigment comprises a medium, and wherein the optical structure is suspended in the medium.

Example 165

The document of any of Examples 162-164, wherein the medium comprises a material having a refractive index of 1.5.

Example 166

The document of any of Examples 162-165, medium comprises an organic resin.

Example 167

The document of any of Examples 162-166, wherein the optical structure has a thickness, and wherein a length or a width of the optical structure is between about 5-10 times the thickness.

Example 168

The document of any of Examples 162-167, wherein the optical structure comprises three metal layers.

Example 169

The document of any of Examples 162-168, wherein one or more of the at least three metal layers comprises silver.

Example 170

The document of any of Examples 162-169, wherein one or more of the at least three metal layers comprises gold.

Example 171

The document of any of Examples 162-170, wherein one or more of the at least two dielectric layers comprises a material that is substantially transparent to visible light.

Example 172

The document of any of Examples 162-171, wherein the thickness of an individual layer of the at least three metal layers is between about 5 nm and about 100 nm.

Example 173

The document of any of Examples 162-172, wherein the thickness of an individual layer of the at least two dielectric layers is between about 50 nm and about 800 nm.

Example 174

The document of any of Examples 162-173, wherein one or more of the at least two dielectric layers comprises magnesium fluoride.

Example 175

The document of any of Examples 162-174, wherein one or more of the at least two dielectric layers comprises zinc sulfide.

Example 176

The document of any of Examples 162-175, wherein one or more of the at least two dielectric layers comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

Example 177

The document of any of Examples 163-176, wherein the second color is a complementary color of the first color.

Example 178

The document of any of Examples 163-176, wherein the second color is a non-complementary color of the first color.

Example 179

The document of any of Examples 163-176, wherein the first color or the second color changes with a change in a viewing angle.

Example 180

The document of any of Examples 163-176, wherein the first color or the second color does not change with a change in a viewing angle.

Example 181

The document of any of Examples 162-180, wherein the pigment comprising the optical structure is applied on a substrate which is configured as a security thread inserted in the main body.

Example 182

The document of any of Examples 162-180, wherein the pigment comprising the optical structure is configured as an ink applied to the main body.

Example 183

The document of any of Examples 162-180, wherein the pigment comprising the optical structure is applied on a substrate which is configured as a foil that is attached to the main body via hot stamp.

Example 184

The document of any of Examples 162-180, wherein the pigment comprising the optical structure is applied on a substrate which is configured as a laminate attached to the main body.

Example 185

The document of any of Examples 162-180, wherein the pigment comprising the optical structure is incorporated in a window of the main body.

Example 186

An optical structure comprising:
a first metallic region having an outer surface enclosing a volume of a first metal material;
a dielectric region surrounding the outer surface of the first metallic region, the dielectric region having an outer surface enclosing a volume of a dielectric material; and
a second metallic region surrounding the outer surface of the dielectric region, the second metallic region having an outer surface enclosing a volume of a second metal material;
wherein a thickness of the optical structure has a value between about 100 nm and about 2 micron,
wherein a lateral dimension of the optical structure is between 1 micron and about 20 micron, and wherein the optical structure is configured to display a first color in a reflection mode and display a second color different from the first color in transmission mode.

Example 187

The optical structure of Example 186, wherein the first metal material comprises at least one of silver and gold.

Example 188

The optical structure of any of Examples 186-187, wherein the second metal material comprises at least one of silver and gold.

Example 189

The optical structure of any of Examples 186-188, wherein the dielectric material comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

Example 190

A pigment comprising:
an optical structure comprising:
a first metal layer having a first refractive index, wherein a ratio of the real part (n) of the first refractive index to the imaginary part (k) of the first refractive index is greater than or equal to 0.01 and less than or equal to 0.2;
a first dielectric layer disposed on a first side of the first metal layer;
a second dielectric layer disposed on a second side of the first metal layer;
a second metal layer disposed on a side of the first dielectric layer opposite the side facing the first metal layer, the second metal layer having a second refractive index, wherein a ratio of the real part (n) of the second refractive index to the imaginary part (k) of the second refractive index is greater than or equal to 0.01 and less than or equal to 0.2; and
a third metal layer disposed on a side of the second dielectric layer opposite the side facing the first metal layer, the third metal layer having a third refractive index, wherein a ratio of the real part (n) of the third refractive index to the imaginary part (k) of the third refractive index is greater than or equal to 0.01 and less than or equal to 0.2.

Example 191

The pigment of Example 190, further comprising a medium in which the optical structure is suspended.

Example 192

The pigment of any of Examples 190-191, configured to produce a first color in transmission mode and a second color different from the first color in reflection mode.

Example 193

The pigment of any of Examples 190-192, wherein the optical structure has a thickness, and wherein a length or a width of the optical structure is between about 5-10 times the thickness.

Example 194

The optical structure of any of Examples 190-193, wherein the first metal layer comprises at least one of silver or gold.

Example 195

The optical structure of any of Examples 190-194, wherein the second metal layer comprises at least one of silver or gold.

Example 196

The optical structure of any of Examples 190-195, wherein the third metal layer comprises at least one of silver or gold.

Example 197

The optical structure of any of Examples 190-196, wherein the first dielectric layer comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

Example 198

The optical structure of any of Examples 190-196, wherein the second dielectric layer comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

Example 199

A document comprising:
a main body;
the pigment of any of Examples 190-198 disposed on the main body.

Example 200

The document of Example 199, wherein the main body comprises cloth.

Example 201

The document of Example 199, wherein the main body comprises paper.

Example 202

A packaging comprising:
a main body;
the pigment of any of Examples 190-198 disposed on the main body.

Example 203

The packaging of Example 202, wherein the main body comprises paper.

Example 204

The packaging of Example 202, wherein the main body comprises cardboard.

Example 205

The packaging of Example 202, wherein the main body comprises plastic.

Additional Examples

1. A document having a security feature comprising:
   a main body of the document; and
   a pigment disposed on the main body, the pigment comprising:
   an optical structure comprising at least three metal layers and at least two dielectric layers,
   wherein the at least two dielectric layers are disposed on opposite sides of a first metal layer of the at least three metal layers, and remaining metal layers of the at least three metal layers are disposed on a side of the at least two dielectric layers opposite the side facing the first metal layer,
   wherein a ratio of the real part (n) of a refractive index of the at least three metal Clayers to the imaginary part (k) of the refractive index of the at least three metal layers is greater than or equal to 0.01 and less than or equal to 0.2.
2. The document of Example 1, wherein the pigment produces a first color in a reflection mode and a second color different from the first color in a transmission mode.
3. The document of Example 1 or 2, wherein the optical structure is suspended in a medium.
4. The document of Example 3, wherein the medium comprises a material having a refractive index of 1.5.
5. The document of Example 3, medium comprises an organic resin.
6. The document of any of the above Examples, wherein the optical structure has a thickness, and wherein a length or a width of the optical structure is between about 5-10 times the thickness.
7. The document of any of the above Examples, wherein the optical structure comprises only three metal layers.
8. The document of any of the above Examples, wherein one or more of the at least three metal layers comprises silver.
9. The document of any of the above Examples, wherein one or more of the at least three metal layers comprises gold.
10. The document of any of the above Examples, wherein one or more of the at least two dielectric layers comprises a material that is substantially transparent to visible light.
11. The document of any of the above Examples, wherein the thickness of an individual layer of the at least three metal layers is between about 5 nm and about 100 nm.
12. The document of any of the above Examples, wherein the thickness of an individual layer of the at least two dielectric layers is between about 50 nm and about 800 nm.
13. The document of any of the above Examples, wherein one or more of the at least two dielectric layers comprises magnesium fluoride.
14. The document of any of the above Examples, wherein one or more of the at least two dielectric layers comprises zinc sulfide.
15. The document of any of the above Examples, wherein one or more of the at least two dielectric layers comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.
16. The document of Example 2, wherein the second color is a complementary color of the first color.
17. The document of Example 2, wherein the second color is a non-complementary color of the first color.
18. The document of Example 2 or Example 16 or Example 17, wherein the first color or the second color changes with a change in a viewing angle.
19. The document of Example 2 or Example 16 or Example 17, wherein the first color or the second color does not change with a change in a viewing angle.
20. The document of any of Examples 1-19, wherein the pigment comprising the optical structure is applied on a substrate which is configured as a security thread inserted in the main body.
21. The document of any of Examples 1-19, wherein the pigment comprising the optical structure is configured as an ink applied to the main body.
22. The document of any of Examples 1-19, wherein the pigment comprising the optical structure is applied on a substrate which is configured as a foil that is attached to the main body via hot stamp.
23. The document of any of Examples 1-19, wherein the pigment comprising the optical structure is applied on a substrate which is configured as a laminate attached to the main body.
24. The document of any of Examples 1-19, wherein the pigment comprising the optical structure is incorporated in a window of the main body.
25. The document of any of the above Examples, further comprising two additional dielectric layers disposed on sides of the remaining metal layers opposite the sides facing the at least two dielectric layers.
26. The document of Example 25, wherein at least one of the two additional dielectric layers has a thickness from about 2 nm to about 20 nm.
27. The document of Example 25 or Example 26, wherein the optical structure is suspended in a medium, and wherein the two additional dielectric layers have a refractive index that substantially matches the refractive index of the medium.
28. The optical structure of any of Examples 25-27, wherein the two additional dielectric layers comprise silicon dioxide.
29. An optical structure comprising:
   a first metallic region having an outer surface enclosing a volume of a first metal material;
   a dielectric region surrounding the outer surface of the first metallic region, the dielectric region having an outer surface enclosing a volume of a dielectric material; and
   a second metallic region surrounding the outer surface of the dielectric region, the second metallic region having an outer surface enclosing a volume of a second metal material;
   wherein a thickness of the optical structure has a value between about 100 nm and about 2 micron,
   wherein a lateral dimension of the optical structure is between 1 micron and about 20 micron, and
   wherein the optical structure is configured to display a first color in a reflection mode and display a second color different from the first color in transmission mode.
30. The optical structure of Example 29, wherein the first metal material comprises at least one of silver or gold.

31. The optical structure of Example 29 or Example 30, wherein the second metal material comprises at least one of silver or gold.

32. The optical structure of any of Examples 29-31, wherein the dielectric material comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

33. The optical structure of any of Examples 29-32, further comprising a second dielectric region surrounding the outer surface of the second metallic region.

34. The optical structure of Example 33, wherein the second dielectric region has a thickness from about 2 nm to about 20 nm.

35. The optical structure of Example 33 or Example 34, wherein the second dielectric region comprises silicon dioxide.

36. The optical structure of Example 33 or Example 34, wherein the second dielectric region has a refractive index greater than or equal to about 1.65.

37. The optical structure of Example 36, wherein the second dielectric region comprises $ZrO_2$, $TiO_2$, ZnS, ITO, $CeO_2$ or $Ta_2O_3$.

38. A pigment comprising:
an optical structure comprising:
a first metal layer having a first refractive index, wherein a ratio of the real part (n) of the first refractive index to the imaginary part (k) of the first refractive index is greater than or equal to 0.01 and less than or equal to 0.2;
a first dielectric layer disposed on a first side of the first metal layer;
a second dielectric layer disposed on a second side of the first metal layer;
a second metal layer disposed on a side of the first dielectric layer opposite the side facing the first metal layer, the second metal layer having a second refractive index, wherein a ratio of the real part (n) of the second refractive index to the imaginary part (k) of the second refractive index is greater than or equal to 0.01 and less than or equal to 0.2; and
a third metal layer disposed on a side of the second dielectric layer opposite the side facing the first metal layer, the third metal layer having a third refractive index, wherein a ratio of the real part (n) of the third refractive index to the imaginary part (k) of the third refractive index is greater than or equal to 0.01 and less than or equal to 0.2.

39. The pigment of Example 38, wherein the optical structure is suspended in a medium.

40. The pigment of Example 38 or Example 39, configured to produce a first color in transmission mode and a second color different from the first color in reflection mode.

41. The pigment of any of Examples 38-40, wherein the optical structure has a thickness, and wherein a length or a width of the optical structure is between about 5-10 times the thickness.

42. The pigment of any of Examples 38-41, wherein the first metal layer comprises at least one of silver or gold.

43. The pigment of any of Examples 38-42, wherein the second metal layer comprises at least one of silver or gold.

44. The pigment of any of Examples 38-43, wherein the third metal layer comprises at least one of silver or gold.

45. The pigment of any of Examples 38-44, wherein the first dielectric layer comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

46. The pigment of any of Examples 38-45, wherein the second dielectric layer comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

47. The pigment of any of the above Examples, further comprising:
a third dielectric layer disposed on a side of the second metal layer opposite the side facing the first dielectric layer; and
a fourth dielectric layer disposed on a side of the third metal layer opposite the side facing the second dielectric layer.

48. The pigment of Example 47, wherein the third and/or the fourth dielectric layers have a thickness from about 2 nm to about 20 nm.

49. The pigment of Example 47 or Example 48, wherein the pigment comprises a medium, wherein the optical structure is suspended in the medium, and wherein the third and/or fourth dielectric layers have a refractive index that substantially matches the refractive index of the medium.

50. The optical structure of any of Examples 47-49, wherein the third and/or fourth dielectric layers comprise silicon dioxide.

51. A document comprising:
a main body;
the pigment of any of Examples 38-50 disposed on the main body.

52. The document of Example 51, wherein the main body comprises cloth.

53. The document of Example 51, wherein the main body comprises paper.

54. A packaging comprising:
a main body;
the pigment of any of Examples 38-50 disposed on the main body.

55. The packaging of Example 54, wherein the main body comprises paper.

56. The packaging of Example 54, wherein the main body comprises cardboard.

57. The packaging of Example 54, wherein the main body comprises plastic.

58. An optical structure comprising:
at least three metal layers; and
at least two dielectric layers,
wherein the at least two dielectric layers are disposed on opposite sides of a first metal layer of the at least three metal layers, and remaining metal layers of the at least three metal layers are disposed on a side of the at least two dielectric layers opposite the side facing the first metal layer,
wherein a ratio of the real part (n) of a refractive index of the at least three metal layers to the imaginary part (k) of the refractive index of the at least three metal layers is greater than or equal to 0.01 and less than or equal to 0.2.

59. The optical structure of Example 58, wherein the optical structure produces a first color in a reflection mode and a second color different from the first color in a transmission mode.

60. The optical structure of Example 58 or Example 59, wherein the optical structure has a thickness, and wherein a length or a width of the optical structure is between about 5-10 times the thickness.

61. The optical structure of any of Examples 58-60, wherein the optical structure comprises only three metal layers.

62. The optical structure of any of Examples 58-61, wherein one or more of the at least three metal layers comprises silver.

63. The optical structure of any of Examples 58-62, wherein one or more of the at least three metal layers comprises gold.

64. The optical structure of any of Examples 58-63, wherein one or more of the at least two dielectric layers comprises a material that is substantially transparent to visible light.

65. The optical structure of any of Examples 58-64, wherein the thickness of an individual layer of the at least three metal layers is between about 5 nm and about 100 nm.

66. The optical structure of any of Examples 58-65, wherein the thickness of an individual layer of the at least two dielectric layers is between about 50 nm and about 800 nm.

67. The optical structure of any of Examples 58-66, wherein one or more of the at least two dielectric layers comprises magnesium fluoride.

68. The optical structure of any of Examples 58-67, wherein one or more of the at least two dielectric layers comprises zinc sulfide.

69. The optical structure of any of Examples 58-66, wherein one or more of the at least two dielectric layers comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

70. The optical structure of Example 59, wherein the second color is a complementary color of the first color.

71. The optical structure of Example 59, wherein the second color is a non-complementary color of the first color.

72. The optical structure of Example 59 or Example 70 or Example 71, wherein the first color or the second color changes with a change in a viewing angle.

73. The optical structure of Example 59 or Example 70 or Example 71, wherein the first color or the second color does not change with a change in a viewing angle.

74. The optical structure of any of Examples 58-73, wherein the optical structure is configured as a film or foil.

75. The optical structure of any of Examples 58-73, wherein the optical structure is configured as a thread, laminate, hot stamp, window patch, or label.

76. The optical structure of any of Examples 58-75, wherein the optical structure is applied on a substrate.

77. The optical structure of Example 76, wherein the substrate comprises a polymeric material.

78. The optical structure of Example 77, wherein the substrate comprises polyethylene terephthalate (PET) or acrylate.

79. The optical structure of any of Examples 76-78, wherein the substrate is coated with a release layer.

80. The optical structure of any of Examples 58-79, further comprising two additional dielectric layers disposed on sides of the remaining metal layers opposite the sides facing the at least two dielectric layers.

81. The optical structure of Example 80, wherein at least one of the two additional dielectric layers has a thickness from about 2 nm to about 20 nm.

82. The optical structure of Example 80 or Example 81, wherein the two additional dielectric layers comprise silicon dioxide.

83. The optical structure of any of Examples 80-82, wherein at least one of the two additional dielectric layers has a refractive index greater than or equal to about 1.65.

84. The optical structure of any of Examples 80-82, wherein at least one of the two additional dielectric layers comprises $ZrO_2$, $TiO_2$, ZnS, ITO, $CeO_2$ or $Ta_2O_3$.

85. A document comprising:
a main body;
the optical structure of any of Examples 58-84 disposed on the main body.

86. The document of Example 85, wherein the document is a banknote.

87. The document of Example 85, wherein the main body comprises cloth.

88. The document of Example 85, wherein the main body comprises paper.

89. The document of Example 85, wherein the main body comprises plastic.

90. The document of Example 85, wherein the main body comprises cardboard.

91. A packaging comprising:
a main body;
the optical structure of any of Examples 58-84 disposed on the main body.

92. The document of Example 91, wherein the main body comprises cloth.

93. The document of Example 91, wherein the main body comprises paper.

94. The document of Example 91, wherein the main body comprises plastic

95. The document of Example 91, wherein the main body comprises cardboard.

BRIEF DESCRIPTION OF THE DRAWINGS

Example embodiments will now be described in conjunction with the drawings.

FIGS. 2A-1 and 2A-2 schematically illustrate side views of optical structures configured to be used as a security feature in the form of a platelet encapsulated with an encapsulating layer, comprising, for example, a $SiO_2$ layer and silica spheres.

FIGS. 2B-1 and 2B-2 illustrates a plurality of platelets dispersed in a polymer which can comprise an ink or a paint medium.

FIG. 19A shows the variation of the transmittance, reflectance and absorptance with wavelength for a fifth example of the optical structure shown in FIG. 14A or 14B at a viewing angle of about 0 degrees with respect to a normal to the surface of the optical structure.

FIG. 19B is a CIE 1931 color space chromaticity diagram showing the x and y chromaticity coordinates of light transmitted through the fifth example of the optical structure shown in FIG. 14A or 14B for different viewing angles between 0 degrees and 40 degrees with respect to a normal to a surface of the optical structure.

FIG. 19C illustrates the a*b* values in the CIE L*a*b* color space when the fifth example of the optical structure shown in FIG. 14A or 14B is viewed in the transmission mode at different viewing angles between 0 degrees and 40 degrees with respect to the normal to the surface of the fifth example of the optical structure.

DETAILED DESCRIPTION

Figure 1:
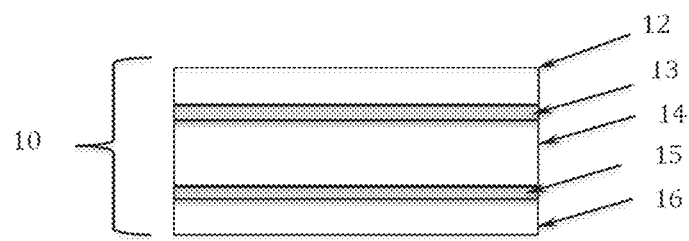
FIG. 1 schematically illustrates a side view of an optical structure configured to be used as a security feature.

To curtail counterfeiting, currency, documents (e.g., banknotes) as well as other items such as products and packaging can be provided with security features that can be inspected by the general public to verify authenticity. In many cases, it can be advantageous if the security features can be easily seen under a variety of light conditions and without the need for special lighting conditions. It can also be desirable that the security features have distinct characteristics that can be easily identified by the public within a 1-10 second time frame. In addition, it is advantageous in general, if the security feature is not susceptible to copying by electronic or photographic equipment, such as, for example, printers, copiers, cameras, etc.

One example of a security feature employed in banknotes is the watermark, which has a fairly high degree of awareness among the general public. An example of a watermark can be an image comprising light and dark regions that can be easily seen by holding up the banknote to see the watermark in light transmission. However, watermarks may be susceptible to be copied and thus are not very secure. Other examples of security features may use inks and motion type features that are not readily seen under low light conditions (e.g., at low lit bars, restaurants, etc.), have poor image resolution, and/or have slow optical movement relative to the movement of the banknote. Accordingly, some existing security features tend to be more complicated structures having more complex color changing effects. This approach, however, can be disadvantageous when the complicated security devices are applied to banknotes or currency, as these complicated security devices may confuse an average person who is looking for a distinctive security feature.

Having a security features that has high contrast with respect to the background that can be easily identified by the general public under a variety of light conditions, including low light, can be advantageous. Accordingly, various security features disclosed can appears to have one color in reflection and another different color in transmission. These security features can be incorporated in a banknote. A consumer, merchant, or a bank teller can holdup such a banknote to light to readily verify the authenticity of the banknote. Additionally, in some implementations, the security feature can be configured to exhibit color shift and/or movement of identifiable features when the viewing angle is varied to enhance security. These and other features are described in further detail herein.

Accordingly, various security features contemplated herein can comprise optical stacks and/or structures that are at least partially reflective and at least partially transmissive. The security features contemplated herein can be configured as coatings, threads, laminates, foils, films, hot stamps, window patches, labels, pigments and/or inks and incorporated with documents (e.g., banknotes), packaging, or other items. The innovative aspects described in this application also include systems and methods of fabricating optical structures and/or stacks that are at least partially reflective and at least partially transmissive. In some embodiments, such optical structures may be fabricated on support or base layers or sheets such as webs (e.g., roll coated webs). Processes described herein may also include removing the fabricated optical structures and/or stacks from a support or base layer (e.g., roll or sheet). The innovative aspects described in this application further includes methods and systems for including the optical structures and/or stacks that are at least partially reflective and at least partially transmissive in pigment and inks having a desired amount of durability and mechanical strength to be further used in or on or incorporated into banknotes and other security devices/documents. In some implementations, a document or packaging can include a main body and the optical structure can be disposed on the main body. The main body can comprise cloth, paper, plastic, cardboard, etc.

Optical Structures Comprising Metal Layers Surrounded by Dielectric Layers

FIG. 1 schematically illustrates an optical structure 10 comprising a stack of layers that can be used as a security feature. The optical structure 10 comprises at least two metal layers 13 and 15. The at least two metal layers 13 and 15 can comprise metals having a ratio of the real part (n) of the refractive index to the imaginary part (k) of the refractive index (k) that is less than 1. For example, the at least two metal layers 13 and 15 can comprise metals that have an n/k value between about 0.01 and about 0.6, between about 0.015 and about 0.6, between about 0.01 and about 0.5, between about 0.01 and about 0.2, between about 0.01 and about 0.1, or any value in a range or sub-range defined by these values. Accordingly, the at least two metal layers 13 and 15 can comprise silver, silver alloys, gold, aluminum or copper and their respective alloys. Nickel (Ni) and Palladium (Pd) can be used in some implementations. In some cases, however, the at least two metal layers 13 and 15 do not comprise chromium, titanium, and/or tungsten or any metal having an n/k ratio greater than 0.6. In some cases, the metal layer 13 and 15 can have a thickness greater than or equal to about 3 nm and less than or equal to about 35 nm. For example, thickness of the metal layer 13 and 15 can be greater than or equal to about 10 nm and less than or equal to about 30 nm, greater than or equal to about 15 nm and less than or equal to about 27 nm, greater than or equal to about 20 nm and less than or equal to about 25 nm, or any value in a range or sub-range defined by these values. The thickness of the metal layer 13 can be equal to the thickness of the metal layer 15. Alternately, the thickness of the metal layer 13 can be greater than or less than the thickness of the metal layer 15.

A transparent dielectric layer 14 is sandwiched between the at least two metal layers 13 and 15. The dielectric layer 14 can have a refractive index greater than, less than or equal to 1.65. Materials with an index greater than or equal to 1.65 can be considered as high refractive index materials for the purpose of this application and materials with an index less than 1.65 can be considered as low index materials for the purpose of this application. The transparent dielectric layer 14 can comprise inorganic materials including but not limited to silicon dioxide ($SiO_2$), aluminum oxide ($Al_2O_3$), magnesium fluoride ($MgF_2$), cerium fluoride ($CeF_3$), lanthanum fluoride ($LaF_3$), zinc oxide (ZnO), zinc sulfide (ZnS), zirconium dioxide ($ZrO_2$), titanium dioxide ($TiO_2$), tantalum pentoxide ($Ta_2O_5$), ceric oxide ($CeO_2$), yttrium oxide ($Y_2O_3$), indium oxide ($In_2O_3$), tin oxide ($SnO_2$), indium tin oxide (ITO) and tungsten trioxide ($WO_3$) or combinations thereof. The transparent dielectric layer 14 can comprise polymers including but not limited to parylene, acrylates, and/or methacrylate. Without any loss of generality, the transparent dielectric layer 14 can comprise a material having an index of refraction greater than, less than, or equal to 1.65 and an extinction coefficient between 0 and about 0.5 such that it has low absorption of light in the visible spectral range.

The dielectric layer 14 can have a thickness that is greater than or equal to about 75 nm and less than or equal to about 2 micron. For example, the dielectric layer 14 can have a thickness that is greater than or equal to about 150 nm and less than or equal to about 650 nm, greater than or equal to about 200 nm and less than or equal to about 600 nm, greater than or equal to about 250 nm and less than or equal to about 550 nm, greater than or equal to about 300 nm and less than or equal to about 500 nm, greater than or equal to about 350 nm and less than or equal to about 450 nm, greater than or equal to about 700 nm and less than or equal to about 1 micron, greater than or equal to about 900 nm and less than or equal to about 1.1 micron, greater than or equal to about 1 micron and less than or equal to about 1.2 micron, greater than or equal to about 1.2 micron and less than or equal to about 2.0 microns or any value in a range/sub-range defined by these values. Without subscribing to any particular theory, in various implementations, the thickness of the dielectric layer 14 can be approximately a quarter wavelength of light (e.g., visible light) incident thereon or an integer multiple of a quarter wavelength. In various implementations, the thickness of the dielectric layer 14 may be, for example, ¼, ¾, 5/4, 7/4, 9/4, 10/4, etc. of the wavelength of visible light incident on the dielectric layer 14.

The optical structure 10 further comprises a transparent dielectric layer 12 that is disposed on a side of the metal layer 13 that is opposite to the dielectric layer 14 and a transparent dielectric layer 16 that is disposed on a side of the metal layer 15 that is opposite to the dielectric layer 14. In some cases, layers 12 and 16 can comprise materials having a refractive index greater than or equal to 1.65. For example, layers 12 and 16 can comprise $ZrO_2$, $TiO_2$, ZnS, ITO (indium tin oxide), $CeO_2$ or $Ta_2O_3$. Dielectric layers 12 and 16 can have a thickness that is greater than or equal to about 100 nm and less than or equal to about 400 nm, greater than or equal to about 150 nm and less than or equal to about 350 nm, greater than or equal to about 200 nm and less than or equal to about 300 nm, or any value in a range/sub-range defined by these values. The thickness of the dielectric layer 12 can be equal to the thickness of the dielectric layer 16. Alternately, the thickness of the dielectric layer 12 can be greater than or less than the thickness of the dielectric layer 16. The optical structure 10 can have a thickness that is less than or equal to about 2 microns.

Fabricating the optical structure 10 can include providing the layer of dielectric material 12 (or the layer of dielectric material 16) and depositing the metal layer 13 (or the metal layer 15) over the layer of dielectric material 12 (or the layer of dielectric material 16). The metal layer 13 (or the metal layer 15) can be deposited over the layer of dielectric material 12 (or the layer of dielectric material 16) using an electroless method discussed in further detail below. The metal layer 13 (or the metal layer 15) can be deposited as a continuous thin film, as small spheres, metallic clusters or island like structures. The other dielectric layer 14 can be subsequently disposed over the metal layer 13 (or the metal layer 15). The initial layer of dielectric material 12 (or the layer of dielectric material 16) can be disposed and/or formed over a support. The support is also referred to herein as a base layer. The support can comprise a carrier. The support can comprise a sheet such as a web. The support can comprise a substrate. The substrate can be a continuous sheet of PET or other polymeric web structure. The support can comprise a non-woven fabric. Non-woven fabrics can be flat, porous sheets comprising fibers. In some implementations, the non-woven fabric can be configured as a sheet or a web structure that is bonded together by entangling fiber or filaments mechanically, thermally, or chemically. In some implementations, the non-woven fabric can comprise perforated films (e.g., plastic or molten plastic films). In some implementations, the non-woven fabric can comprise synthetic fibers such as polypropylene or polyester or fiber glass.

The support can be coated with a release layer comprising a release agent. The release agent can be soluble in solvent or water. The release layer can be polyvinyl alcohol, which is water soluble or an acrylate which is soluble in a solvent. The release layer can comprise a coating, such as, for example, salt (NaCl) or cryolite ($Na_3AlF_6$) deposited by evaporation before the layers of the optical structure are deposited/formed.

In some implementations of the support configured as a non-woven fabric, the non-woven fabric can be coated with a release layer. Such implementations can be dipped or immersed in a solvent or water that acts as a release agent to dissolve or remove the release layer. The release agent (e.g., the solvent or water) is configured to penetrate from a side of the non-woven fabric opposite the side on which the optical structure is disposed to facilitate release of the optical structure instead of having to penetrate through the optical structure. The optical structure is recovered from the solvent or water after dissolution of the release layer. In some manufacturing approaches, the recovered optical structure can then be processed into a pigment.

In one method of fabrication, the optical structure 10 can be fabricated, for example, deposited or formed on a coated web, a coated base layer, a coated carrier or a coated substrate. The coating on the web, the base layer, the substrate or the carrier can be configured as a release layer to facilitate easy removal of the optical structure 10.

The optical structure 10 can be configured as a film or a foil by disposing over a substrate or other support layer having a thickness, for example, greater than or equal to about 10 microns and less than or equal to about 25 microns. For example, a substrate or support layer such as a polyester substrate or support layer can have a thickness greater than or equal to 12 microns and less than or equal to 22.5 microns, greater than or equal to 15 microns and less than or equal to about 20 microns. The substrate or support layer can comprise materials, such as, for example, polyethylene terphthalate (PET), acrylate, polyester, polyethylene, polypropylene, or polycarbonate. The support or support layer itself can be dissolvable. The support or support layer, for example, can also comprise polyvinyl alcohol, which can be dissolved, for example, in water. Accordingly, instead of using a release layer on a insoluble support web, the support web itself may comprise soluble material. Accordingly, the support or support layer can be dissolved leaving the optical coating remaining. The optical structure 10 configured as a film or a foil can be encapsulated with a polymer, such as, for example a UV cured polymer.

The optical structure 10 can comprises additional layers. For example, a thin protective layer may be disposed between the metal layer 13 and the dielectric layer 12 and/or between the metal layer 15 and the dielectric layer 16. The protective layer can comprise materials, such as, for example, $NiCrO_x$, $Si_3N_4$, $CeSnO_4$ and $ZnSnO_4$. The protective layers can have a thickness between about 3-5 nm. The protective layers can advantageously increase the durability of the metal layers 13 and 15.

Instead of a film, the optical structure, 10, may be removed from the substrate, web, carrier, or support layer on which it is fabricated and divided into platelets having a size that is suitable for a pigment or printing ink. Platelets having a size that is suitable for a pigment or printing ink can have an area, length, and/or width that is about 5-10 times the thickness of the platelet, in some implementations. Accordingly, the platelets having a thickness of about 1 micron and/or can have a width and/or a length that is between approximately 5 micron and about 50 microns. For example, the width and/or a length can be greater than or equal to about 5 micron and less than or equal to about 15 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. Platelets having a length and/or width that is less than about 5-10 times the thickness of the platelet, such as, for example having a length and/or width that is equal to the thickness of the platelet can be oriented along their edges in the printing ink or pigment. This can be disadvantageous since pigment or printing ink comprising platelets that are oriented along their edges may not exhibit the desired colors in reflection and transmission modes. Dimensions such as, thicknesses, lengths and/or widths outside these ranges are also possible.

Figures 1, 2A:
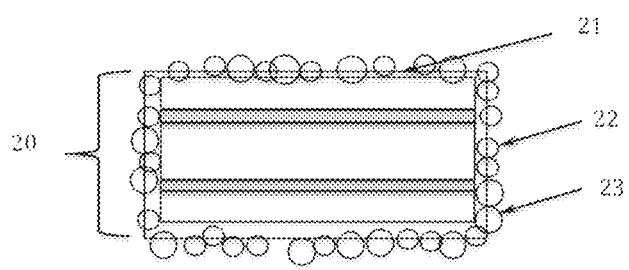

FIG. 2A-1 illustrates an example of a platelet 20. The optical structure, 10 is fractured, cut, diced or otherwise separated to obtain the separate, for example, microns sized, pieces or platelets. In some implementations, the obtained platelets may be surrounded by an encapsulating layer 21. The encapsulating layer 21 can comprise a moisture resistant material, such as, for example silicon dioxide. The encapsulating layer 21 can also comprise silica spheres 22 and 23. The silica spheres 22 and 23 can be of the same size or have different sizes. The encapsulating layer 21 can help protect the at least two metal layers 13 and 15 from corrosion. The encapsulating layer 21 can additionally and/or alternatively reduce the occurrence of delamination of the at least two metal layers 13 and 15 from the other layers of the optical structure 10. The optical structures 10 surrounded by the encapsulating layer 21, and potentially comprising the silica spheres 22 and 23, can be configured as platelets 20 that are suitable for a pigment or printing ink. The silica spheres 22 and 23 of the encapsulating layer 21 can help prevent the platelets from adhering to one another. Without the spheres the platelets may stick together like two microscope slides stick together. The spheres 22 and 23 can also prevent the platelets 20 from sticking to the print rollers in the printing machine. One method of surrounding the optical structure 10 with an encapsulating layer 21 can rely on sol-gel technology using tetraethylorthosilicate (TEOS). In one method of forming the encapsulating layer 21, an alcohol based solution of TEOS can be added in small quantities (e.g., one or more drops at a time) to a dispersion of the platelets in alcohol or water. A catalyst, such as, for example, an acid or sodium hydroxide solution can be added into the a dispersion of the platelets in alcohol or water in small quantities (e.g., one or more drops at a time). The dispersion of the platelets in alcohol or water can be heated to a temperature of about 50-70° C., while stirring to transform TEOS to a silica coating. Other processes, however, may be employed.

In some embodiments, a plurality of platelets 20 can form a pigment. Such a pigment may be color shifting (e.g., the color reflected and/or transmitted changes with angle of view or angle of incidence of light), in some cases. In some embodiments, non-color shifting pigment or dye may be mixed with the pigment. In some embodiments other materials may be included with the platelets 20 to form the pigment. Although some of the pigments discussed herein can provide color shift with change in viewing angle or angle of incidence of light, pigments that do not exhibit color shift with change in viewing angle or angle of incidence of light or that produce very little color shift with change in viewing angle or angle of incidence of light are also contemplated.

Figures 2, 2A:
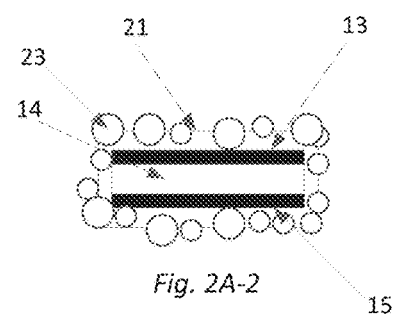
Figures 1, 2B:
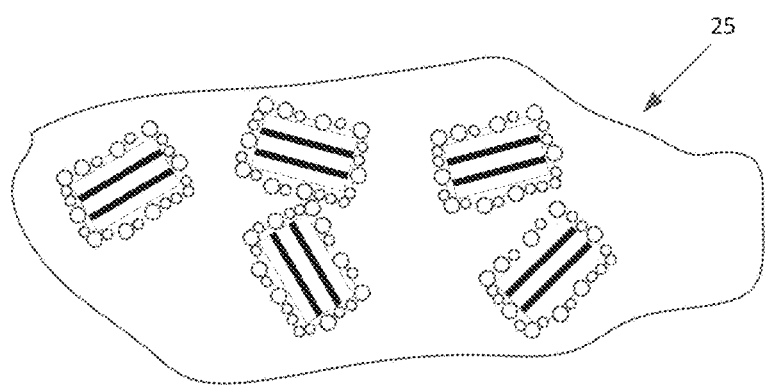
Figures 2, 2B:
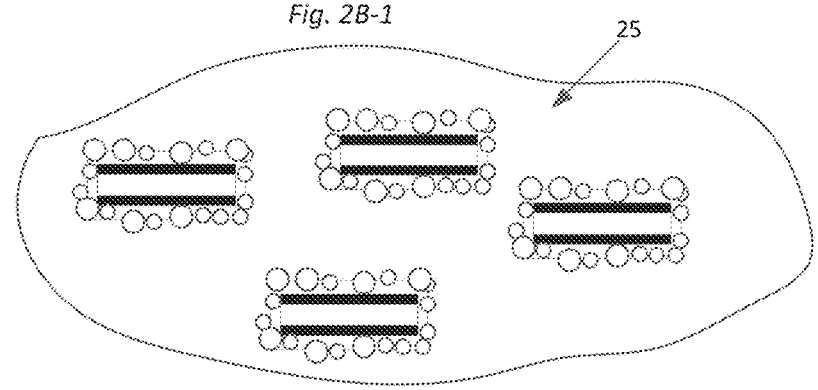

In some embodiments, the platelets 20 can be added to a medium such as a polymer 25 (e.g., a polymeric resin) to form a dichroic ink, a pigment, or paint as shown in FIG. 2B-1. The platelets can be suspended in the medium (e.g., polymer) 25. The platelets can be randomly oriented in the medium (e.g., polymer) 25 as shown in FIG. 2B-1. During the printing process, in some cases, the individual platelets can be oriented parallel to the surface of the object (e.g., paper) to which the pigment, the paint, or the dichroic ink is being applied as a result of, for example, the printing action, gravity, and/or surface tension of the normal drying process of the pigment, the paint, or the dichroic ink as shown in FIG. 2B-2. The medium 25 can comprise material including but not limited to acrylic melamine, urethanes, polyesters, vinyl resins, acrylates, methacrylate, ABS resins, epoxies, styrenes and formulations based on alkyd resins and mixtures thereof. In some implementations, the medium 25, e.g., polymer, can have a refractive index that closely matches the refractive index of the encapsulating silica layer 21 and/or silica balls such that the encapsulating layer and/or the silica balls do not adversely affect the optical performance of the pigment, the paint, or the dichroic ink in the medium.

In various implementations, the platelets 20 need not be surrounded by an encapsulating layer. In such implementations, one or more platelets 20 that are not encapsulated by an encapsulating layer can be added or mixed with an ink or a pigment medium (e.g., varnish, polymeric resin, etc.) to obtain a dichroic ink or pigment as discussed above. In various implementations, the dichroic ink or pigment can comprise a plurality of platelets 20. The optical structures 10 that are configured as the plurality of platelets 20 can have different distributions of shapes, sizes, thicknesses and/or aspect ratios. The optical structures 10 that are configured as the plurality of platelets 20 can also have different optical properties. For example, the optical structures 10 that are configured as the plurality of platelets 20 can also have different color properties.

In some implementations, an optical structure comprising only the metal layers 13 and 15 and the transparent dielectric layer 14 without the high refractive index dielectric layers 12 and 16 as depicted in FIG. 2A-2 can be configured as platelets as discussed above and dispersed in the medium 25 as shown in FIG. 2B-2 to manufacture a dichroic printing ink, paint or pigment as discussed above. In some implementations, the platelets including an optical structure comprising only the metal layers 13 and 15 and the transparent dielectric layer 14 without the high refractive index dielectric layers 12 and 16 need not be encapsulated in an encapsulating layer as discussed above.

Figure 3:
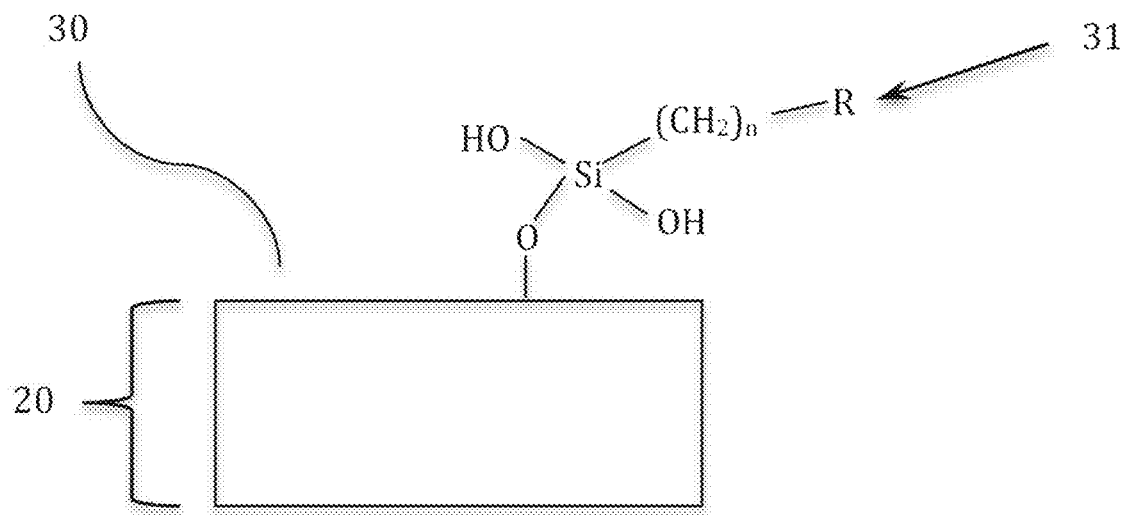
FIG. 3 illustrates the silane coupling agent bonded to an exposed surface of the encapsulation layer of a platelet. Another side of the silane coupling agent can also bond to a medium such as a polymer in which the platelets are dispersed.

A silane coupling agent can be bonded to the encapsulating layer 21 to form a functionalized platelet 30 as shown in FIG. 3. Bonding of the silane coupling agent to the encapsulating layer can occur through a hydrolyzing reaction. The silane coupling agent can bind to the polymer (e.g., polymeric resin) of the printing ink or paint medium so that the heterogeneous mixture of pigment and the polymer do not separate during the printing process and substantially function in much the same way as a homogeneous medium would function. The printing ink or paint medium can comprise material including but not limited to acrylic melamine, urethanes, polyesters, vinyl resins, acrylates, methacrylate, ABS resins, epoxies, styrenes and formulations based on alkyd resins and mixtures thereof. The silane coupling agents used can be similar to the silane coupling agents sold by Gelest Company (Morristown, Pa. USA). In some implementations, the silane coupling agent can comprise a hydrolyzable group, such as, for example, an alkoxy, an acyloxy, a halogen or an amine. Following a hydrolyzing reaction (e.g., hydrolysis), a reactive silanol group is formed, which can condense with other silanol groups, for example, with the silica spheres of the encapsulating layer 21 or the encapsulating layer of silica to form siloxane linkages. The other end of the silane coupling agent comprises the R-group 31. The R-group 31 can comprise various reactive compounds including but not limited to compounds with double bonds, isocyanate or amino acid moieties. Reaction of the double bond via free radical chemistry can form bonds with the ink polymer(s) such as those based on acrylates, methacrylates or polyesters based resins. For example, isocyanate functional silanes, alkanolamine functional silanes and aminosilanes can form urethane linkages.

Without any loss of generality, in various implementations of the optical structure 10 configured as a platelet that do not comprise the encapsulating layer, the silane coupling agent can be bonded to one or both of the high refractive index dielectric layers 12 and 16 comprising a dielectric material (e.g., $TiO_2$) suitable to be bonded with the silane coupling agent.

Figure 4:
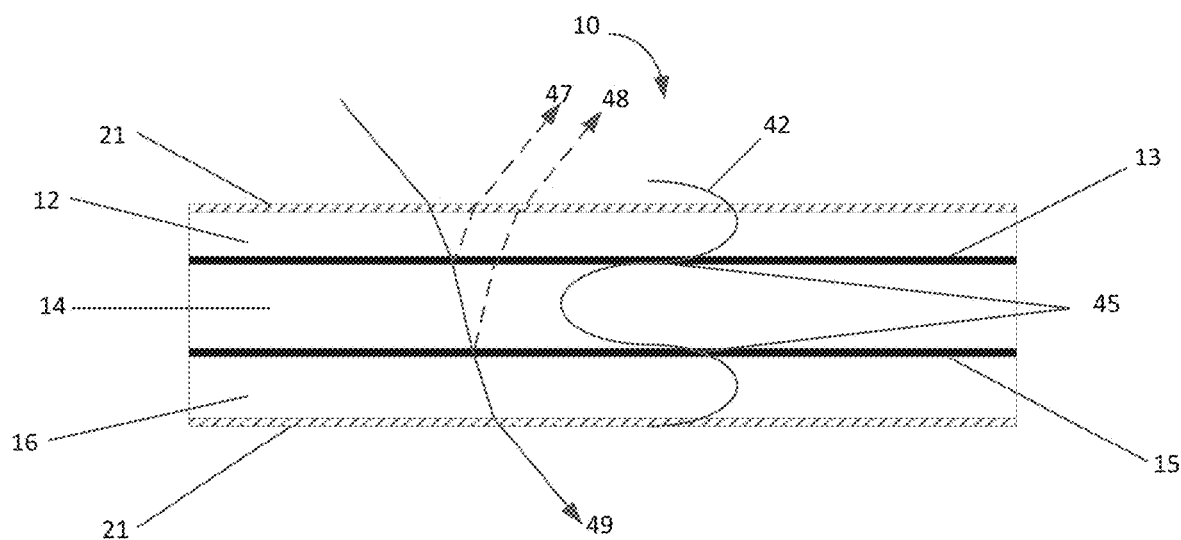
FIG. 4 is a schematic illustration showing propagation light incident on the optical structure and the resultant nodes in field strength at the metal layers.

Without any loss of generality, the optical structure 10 can be considered as an interference stack or cavity. Ambient light incident on the surface of the optical structure 10 is partially reflected from the various layers of the optical structure 10 as shown by rays 47 and 48 in FIG. 4 and partially transmitted through the various layers of the optical structure 10 as shown by ray 49 in FIG. 4. FIG. 4 illustrates an embodiment of an optical structure 10 comprising the high refractive index dielectric layer 12 and 16, metal layers 13 and 15 and a dielectric layer 14 encapsulated in the encapsulating layer 21. Some wavelengths of the ambient light reflected from the various layers may interfere constructively and some other wavelengths of the ambient light reflected from the various layers may interfere destructively. Similarly, some wavelengths of light transmitted through the various layers may interfere constructively and some other wavelengths of the ambient light transmitted through the various layers may interfere destructively. As a result of which, the optical structure 10 appears colored when viewed in transmission and reflection mode. In general, the color and the intensity of light reflected by and transmitted through the optical structure 10 can depend on the thickness and the material of the various layers of the optical structure 10. By changing the material and the thickness of the various layers, the color and intensity of light reflected by and transmitted through the optical structure 10 can be varied. Without subscribing to any particular scientific theory about the operation of the optical structures 10, in general, the material and the thickness of the various layers can be configured such that some or all of the ambient light reflected by the various layers interfere such that a node 45 in the field 42 occurs at the two metal layer 13 and 15. Without subscribing to any particular scientific theory, it is noted that in some cases those wavelengths that are substantially equal to the thickness of the spacer layer (e.g., wavelengths within about ±10% of the thickness of the spacer layer) will interfere such that a node 45 in the field 42 occurs at the two metal layer 13 and 15. For other wavelengths, a node 45 might not occur. Accordingly, in some implementations, the two metal layers 13 and 15 might not be visible in the reflection mode. Again, without subscribing to a particular scientific theory, based on the thickness of the two metal layers 13 and 15 and the transparent dielectric layer 14, a portion of the incident light may be transmitted through the optical structure 10 as a result of the phenomenon of "induced transmittance" or "induced transmission". The reflection and transmission spectral characteristics are discussed below.

Figure 5A:
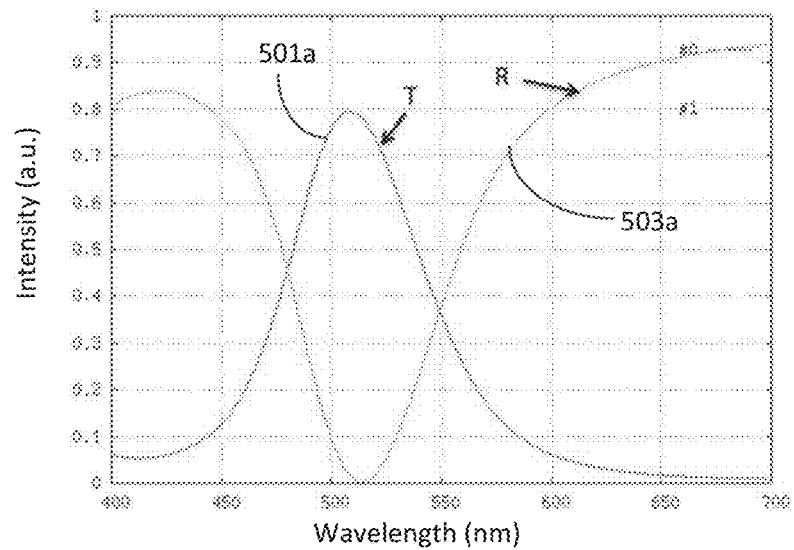
FIGS. 5A and 5B illustrate transmission and reflection spectra of examples of optical structures.

FIG. 5A shows a spectral plot in both transmission (curve 501a) and reflection (curve 503a) for a first example of the optical structure 10. The materials of the various layers of the first example of the optical structure 10 and the thickness of the various layers of the first example of the optical structure 10 are provided in Table 1 below. As indicated in Table 1, the first example of the optical structure 10 comprises two metal layers comprising silver. The two silver layers correspond to the at least two metal layer 13 and 15 of the optical structure 10 shown in FIG. 1. Both the silver layers have the same thickness of 25 nm. A dielectric layer having a thickness of 300 nm is sandwiched between the two silver layers. The dielectric layer comprises $SiO_2$ which has a refractive index of 1.47011. The dielectric layer comprising $SiO_2$ corresponds to the transparent layer 14 having a low refractive index (i.e., refractive index less than 1.65). A layer of $ZrO_2$ is disposed on the side of each of the two silver layers that is opposite the side facing the $SiO_2$ layer. Each of the two layers comprising $ZrO_2$ has a thickness of 150 nm. As noted from Table 1 below, $ZrO_2$ has a refractive index of 2.27413. The two layers comprising $ZrO_2$ corresponds to the transparent layers 12 and 16 having a high refractive index (i.e., refractive index greater than or equal to 1.65). The first example of the optical structure 10 is encapsulated in a $SiO_2$ matrix as indicated in Table 1. The $SiO_2$ matrix is used to simulate the printing medium or ink which has a similar refractive index.

The transmission and reflection of light observed at an angle of 0 degrees with respect to a normal to the first example of the optical structure 10 is shown in FIG. 5A. The reflection spectrum 503a (indicated as curve #1 in FIG. 5A) and the transmission spectrum 501a (indicated as curve #0 in FIG. 5A) in the spectral range between about 400 nm and about 700 nm which includes the visible spectral range were obtained using a simulation software from http://thinfilm.hansteen.net.

TABLE 1

Parameters of a first example of the optical structure that has the reflection and transmission spectra as shown in FIG. 5A.
Parameters Curve #0

```

#   Slab:

#   SIO2                           N = (1.47011, 0)         mynkdb/SIO2.NK
#   ZRO2       d = 1.5e-07         N = (2.27413, 0)         mynkdb/ZRO2.NK
#   AG         d—2.5e-08           N = (0.173038, 1.94942)  mynkdb/AG.NK
#   SIO2       d = 3e-07           N = (1.47011, 0)         mynkdb/SIO2.NK
#   AG         d = 2.5e-08         N = (0.173038, 1.94942)  mynkdb/AG.NK
#   ZRO2       d = 1.5e-07         N = (2.27413, 0)         mynkdb/ZRO2.NK
#   SIO2                           N = (1.47011, 0)         mynkdb/SIO2.NK

#   Beam:

#   Wavelength = (4e-07, 0) Angle = 0.0174533 Polarization = 1 N = (1.47011, 0)

#   Supported spectral range: 2.5e-07m-8.5e-07m.
#   --------------------------------------------------------------------------
#   Lambda[nm] R[ ]
#   --------------------------------------------------------------------------
```

Curve #1

```

#   Slab:

#   SIO2                           N = (1.47011, 0)         mynkdb/SIO2.NK
#   ZRO2       d = 1.5e-07         N = (2.27413, 0)         mynkdb/ZRO2.NK
#   AG         d = 2.5e-08         N = (0.173038, 1.94942)  mynkdb/AG.NK
#   SIO2       d = 3e-07           N = (1.47011, 0)         mynkdb/SIO2.NK
#   AG         d = 2.5e-08         N = (0.173038, 1.94942)  mynkdb/AG.NK
#   ZRO2       d = 1.5e-07         N = (2.27413, 0)         mynkdb/ZRO2.NK
#   SIO2                           N = (1.47011, 0)         mynkdb/SIO2.NK

#   Beam:

#   Wavelength = (4e-07, 0) Angle = 0.0174533 Polarization = 1 N = (1.47011, 0)

#   Supported spectral range: 2.5e-07m-8.5e-07m.
#   --------------------------------------------------------------------------
#   Lambda[nm] T[ ]
#   --------------------------------------------------------------------------
```

It can be seen from FIG. 5A that the transmission curve 501a (curve #0) has a peak with a maximum value occurring at a wavelength of about 520 nm and the reflection curve 503a has two peaks with a first maximum value occurring at a wavelength of 420 nm and a second maximum value occurring at a wavelength of about 650 nm. The maximum value of the transmission and reflection peaks is greater than 0.5 which indicates that the transmission and reflection peaks have high intensities. Furthermore, the transmission and reflection peaks have a bandwidth as measured at 50% of the maximum value of the peak greater than about 20 nm. The bandwidth as measured at 50% of the maximum value of the peak is referred to as full width at half maximum (FWHM). It is observed from FIG. 5A that the FWHM of the transmission peak is about 75 nm.

Based on the position of the transmission and reflection peaks and the bandwidth of the transmission and reflection peaks, the optical structure 10 can be perceived as having a first color in the reflection mode and a second color in the transmission mode by an average human eye. In some cases, the first color and the second color can be complementary colors. In some cases, the transmission and reflection peaks comprising a range of wavelengths of the visible spectral range can have a high intensity and a FWHM greater than 2 nm (e.g., FWHM greater than or equal to about 10 nm, FWHM greater than or equal to about 20 nm, FWHM greater than or equal to about 30 nm, FWHM greater than or equal to about 40 nm, FWHM greater than or equal to about 50 nm, FWHM greater than or equal to about 60 nm, FWHM greater than or equal to about 70 nm, FWHM greater than or equal to about 100 nm, FWHM greater than or equal to about 200 nm, FWHM less than or equal to about 300 nm, FWHM less than or equal to about 250 nm, or any value in a range/sub-range defined by these values).

The one or more reflection peaks can be considered to have a high intensity if the reflectivity or reflectance of the peak in a range of visible wavelengths is greater than or equal to about 50% and less than or equal to about 100%. For example, the one or more reflection peaks can be considered to have a high intensity if the amount of light reflected or reflectivity or reflectance in a range of visible wavelengths is greater than or equal to about 55% and less than or equal to about 99%, greater than or equal to about 60% and less than or equal to about 95%, greater than or equal to about 70% and less than or equal to about 90%, greater than or equal to about 75% and less than or equal to about 85%, or any value in a range/sub-range defined by these values.

The one or more transmission peaks can be considered to have a high intensity if the transmissivity or transmittance of the peak in a range of visible wavelengths is greater than or equal to about 50% and less than or equal to about 100%. For example, the one or more transmission peaks can be considered to have a high intensity if the amount of light transmitted or transmissivity or transmittance in a range of visible wavelengths is greater than or equal to about 55% and less than or equal to about 99%, greater than or equal to about 60% and less than or equal to about 95%, greater than or equal to about 70% and less than or equal to about 90%, greater than or equal to about 75% and less than or equal to about 85%, or any value in a range/sub-range defined by these values.

Figure 5B:
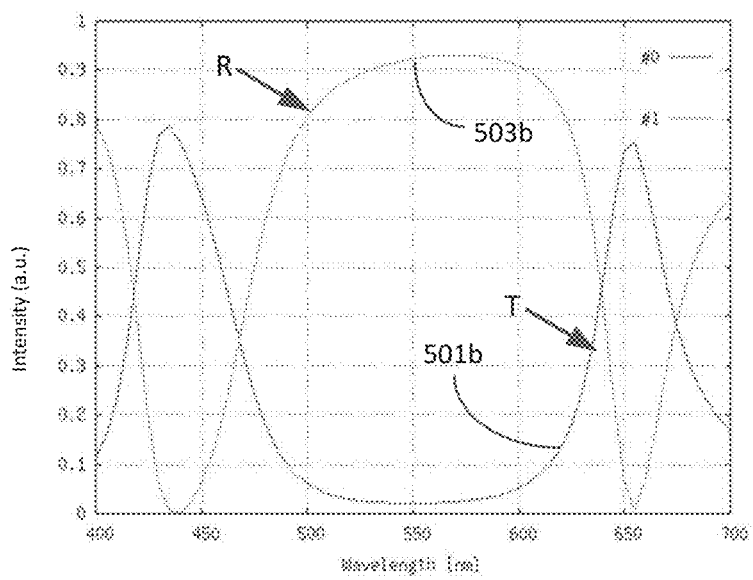

The first example of the optical structure 10 having a design as depicted in Table 1 and having a reflection spectrum and a transmission spectrum as shown in FIG. 5A appears green in transmission mode and as magenta in reflection mode to an average human eye. Without any loss of generality, it can be advantageous, in various implementations, for the peaks in the reflection and transmission spectra to be non-overlapping as shown in FIGS. 5A and 5B such that a reflection peak having a highest possible reflectance or reflectivity can be obtained in one region of the visible spectral range and a transmission peak having a highest possible transmittance or transmissivity can be obtained in a non-overlapping region of the visible spectral range. Accordingly, the reflected color and the transmitted color can be different and potentially complementary to each other, such as, for example, red and green, yellow and violet, blue and orange, green and magenta, etc.

The shape of the transmission and reflection peaks, the position of the maximum of the transmission and reflection peaks, the FWHM of the transmission and reflection peaks, etc. can be varied by varying the materials and/or thickness of the various layers of the optical structure 10. This can be observed from FIG. 5B which depicts the reflection spectrum 503b and transmission spectrum 501b of a second example of the optical structure 10 which has the same material composition as the first example of the optical structure 10 but different thickness for the various layers. The parameters of the second example of the optical structure 10 are provided in Table 2 below. As noted from Table 2, the thickness of the dielectric layer comprising $SiO_2$ and having a refractive index of 1.47011 in the second example of the optical structure 10 is 400 nm instead of 300 nm in the first example of the optical structure 10. Furthermore, the thickness of the two $ZrO_2$ disposed on either side of each of the two silver layers is 225 nm in the second example of the optical structure 10 instead of 150 nm in the first example of the optical structure 10.

TABLE 2

Parameters of a second example of the optical structure that has the reflection and transmission spectra as shown in FIG. 5B.

Parameters

Curve #0

| # | | | | |
|---|---|---|---|---|
| # | Slab: | | | |
| # | SIO2 | | N = (1.47011, 0) | mynkdb/SIO2.NK |
| # | ZRO2 | d = 2.25e−07 | N = (2.27413, 0) | mynkdb/ZRO2.NK |
| # | AG | d = 2.5e−08 | N = (0.173038, 1.94942) | mynkdb/AG.NK |
| # | SIO2 | d = 4e−07 | N = (1.47011, 0) | mynkdb/SIO2.NK |
| # | AG | d = 2.5e−08 | N = (0.173038, 1.94942) | mynkdb/AG.NK |
| # | ZRO2 | d = 2.25e−07 | N = (2.27413, 0) | mynkdb/ZRO2.NK |
| # | SIO2 | | N = (1.47011, 0) | mynkdb/SIO2.NK |
| # | | | | |
| # | Beam: | | | |

Wavelength = (4e−07, 0) Angle = 0.0174533 Polarization = 1 N = (1.47011, 0)

Supported spectral range: 2.5e−07m-8.5e−07m.
------------------------------------------------------------------------------------

TABLE 2-continued

Parameters of a second example of the optical structure that has the reflection and transmission spectra as shown in FIG. 5B.
Parameters

```
# Lambda[nm] R[ ]
# ---------------------------------------------------------------------------
                                    Curve #1

# Slab:

#  SIO2                       N = (1.47011, 0)        mynkdb/SIO2.NK
#  ZRO2    d = 2.25e−07       N = (2.27413, 0)        mynkdb/ZRO2.NK
#  AG      d = 2.5e−08        N = (0.173038, 1.94942) mynkdb/AG.NK
#  SIO2    d = 4e−07          N = (1.47011, 0)        mynkdb/SIO2.NK
#  AG      d = 2.5e−08        N = (0.173038, 1.94942) mynkdb/AG.NK
#  ZRO2    d = 2.25e−07       N = (2.27413, 0)        mynkdb/ZRO2.NK
#  SIO2                       N = (1.47011, 0)        mynkdb/SIO2.NK

# Beam:

# Wavelength = (4e−07, 0) Angle = 0.0174533 Polarization = 1 N = (1.47011, 0)

Supported spectral range: 2.5e−07m-8.5e−07m.

# Lambda[nm] T[ ]
# ---------------------------------------------------------------------------
```

As a result of the change in the thickness of the dielectric layers comprising $SiO_2$ and $ZrO_2$ between the second example of the optical structure and the first example of the optical structure, an average eye would perceive the second example of the optical structure to appear green in reflection mode and a magenta in transmission mode when viewed along a direction normal to the surface of the second example of the optical structure.

The color of the first example and the second example of the optical structure 10 as perceived by the average human eye in reflection mode and transmission mode can shift from the above described magenta and green colors at different viewing angles with respect to the normal to the surface of the first example and the second example of the optical structure 10. For example, the first example of the optical structure 10 can appear yellowish green in reflection mode and blue in transmission mode when viewed at an angle of about 35 degrees with respect to the normal to the surface of the first example of the optical structure 10. As another example, the second example of the optical structure 10 can appear pale purple in reflection mode and yellowish in transmission mode when viewed at an angle of about 35 degrees with respect to the normal to the surface of the second example of the optical structure 10. Without any loss of generality, the reflection and the transmission peaks can exhibit a blue shift towards shorter wavelengths as the viewing angle with respect to the normal to the surface of the first example and the second example of the optical structure 10 increases.

TABLE 3

CIELab values for transmission mode when the first example of the optical structure having parameters as described in Table 1 is viewed at different viewing angles in the presence of a D65 light source.

| Incident Angle | L* | a* | b* | |
|---|---|---|---|---|
| 0.0 | 66.0433 | −91.9989 | 11.4335 | Design: First Example of |
| 5.0 | 65.5578 | −91.5328 | 9.3070 | the Optical Structure |

TABLE 3-continued

CIELab values for transmission mode when the first example of the optical structure having parameters as described in Table 1 is viewed at different viewing angles in the presence of a D65 light source.

| Incident Angle | L* | a* | b* | |
|---|---|---|---|---|
| 10.0 | 64.0035 | −89.0283 | 2.6936 | Polarization: P |
| 15.0 | 61.1497 | −81.1844 | −8.9303 | Source: D65 |
| 20.0 | 56.8304 | −63.3282 | −25.7758 | Observer: CIE 1931 |
| 25.0 | 51.2146 | −32.8229 | −46.6651 | Mode: Transmittance |
| 30.0 | 44.8902 | 5.7777 | −67.7337 | |
| 35.0 | 38.6590 | 39.5335 | −81.9630 | |
| 40.0 | 33.4474 | 53.5162 | −81.6652 | |
| 45.0 | 30.4059 | 43.0007 | −64.1869 | |

TABLE 4

CIELab values for reflection mode when the first example of the optical structure having parameters as described in Table 1 is viewed at different viewing angles in the presence of a D65 light source.

| Incident Angle | L* | a* | b* | |
|---|---|---|---|---|
| 0.0 | 79.2753 | 51.6407 | −11.0765 | Design: First Example of |
| 5.0 | 79.6541 | 50.6966 | −9.6957 | the Optical Structure |
| 10.0 | 80.8290 | 47.4222 | −5.3025 | Polarisation: P |
| 15.0 | 82.8379 | 40.8204 | 2.7687 | Source: D65 |
| 20.0 | 85.5358 | 30.2258 | 15.3945 | Observer: CIE 1931 |
| 25.0 | 88.5026 | 16.2157 | 33.3659 | Mode: Reflectance |
| 30.0 | 91.2316 | 1.0176 | 55.5312 | |
| 35.0 | 93.4068 | −11.0169 | 70.1468 | |
| 40.0 | 94.9289 | −14.7597 | 57.7563 | |
| 45.0 | 95.7892 | −10.6419 | 32.4479 | |

Tables 3 and 4 above provide the CIELa*b* values for transmission mode and reflection mode respectively when the first example of the optical structure having parameters as described in Table 1 is viewed at different viewing angles in the presence of a D65 light source. Tables 5 and 6 below provide the CIELa*b* values for transmission mode and reflection mode respectively when the second example of the optical structure having parameters as described in Table 2 is viewed at different viewing angles in the presence of a D65 light source. The CIELab color closely represent the colors perceived by an average human eye. The CIELab color space mathematically describe various colors perceived by an average human eye in the three dimensions L for lightness, a for the color component green-red, and b for the color component from blue-yellow. The a-axis extends longitudinally in a plane from green (represented by −a) to red (represented by +a). The b-axis extends along a transverse direction in the plane perpendicular to the a-axis from blue (represented by −b) to yellow (represented by +b). The brightness is represented by the L-axis which is perpendicular to the a-b plane. The brightness increases from black represented by L=0 to white represented by L=100. The CIELab values for different viewing angles using a D65 illuminant were calculated using Essential Macleod Thin Film Software.

TABLE 5

CIELab values for transmission mode when the second example of the optical structure having parameters as described in Table 2 is viewed at different viewing angles in the presence of a D65 light source.

| Incident Angle | L* | a* | b* | |
|---|---|---|---|---|
| 0.0 | 35.3624 | 87.7761 | −73.0966 | Design: Second Example of |
| 5.0 | 35.9375 | 88.1214 | −71.4170 | the Optical Structure |
| 10.0 | 37.8504 | 88.3232 | −65.5105 | Polarization: P |
| 15.0 | 41.5481 | 86.2320 | −53.1339 | Source: D65 |
| 20.0 | 47.3489 | 79.0290 | −32.0276 | Observer: CIE 1931 |
| 25.0 | 54.8227 | 62.6584 | −2.6495 | Mode: Transmittance |
| 30.0 | 62.6567 | 31.6730 | 29.2861 | |
| 35.0 | 68.8117 | −13.6155 | 53.1104 | |

TABLE 5-continued

CIELab values for transmission mode when the second example of the optical structure having parameters as described in Table 2 is viewed at different viewing angles in the presence of a D65 light source.

| Incident Angle | L* | a* | b* |
|---|---|---|---|
| 40.0 | 70.1939 | −60.8762 | 56.3246 |
| 45.0 | 63.8734 | −83.2865 | 29.4710 |

TABLE 6

CIELab values for reflection mode when the second example of the optical structure having parameters as described in Table 2 is viewed at different viewing angles in the presence of a D65 light source.

| Incident Angle | L* | a* | b* | |
|---|---|---|---|---|
| 0.0 | 95.0631 | −31.7647 | 48.4548 | Design: Second Example of |
| 5.0 | 94.9402 | −32.7902 | 47.4892 | the Optical Structure |
| 10.0 | 94.5010 | −35.8118 | 43.8268 | Polarisation: P |
| 15.0 | 93.5195 | −40.5801 | 35.7606 | Source: D65 |
| 20.0 | 91.6012 | −45.9635 | 22.4005 | Observer: CIE 1931 |
| 25.0 | 88.3120 | −46.8681 | 5.3389 | Mode: Reflectance |
| 30.0 | 83.5384 | −31.2961 | −12.0407 | |
| 35.0 | 78.2978 | 5.6475 | −26.1375 | |
| 40.0 | 76.3297 | 41.2278 | −30.5320 | |
| 45.0 | 81.1875 | 43.5513 | −17.6926 | |

The optical performance of two additional examples of optical structures having parameters provided in Tables 7 and 8 were analyzed. The additional examples of optical structures were designed using Essential Macleod Thin Film Software. The material composition and the thickness of the various layers for the third example of the optical structure are provided in Table 7 and the material composition and the thickness of the various layers for the fourth example of the optical structure are provided in Table 8.

TABLE 7

Material Composition and thickness of the various layers of the third example of the optical structure 10.

| Layer | Material | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | ZrO2 | 1.00000 2.06577 | 0.00004 | 1.00000000 | 246.88 |
| 2 | Ag | 1.00000 0.05100 | 2.96000 | 0.00250000 | 25.00 |
| 3 | SiO2 | 1.00000 1.46180 | 0.00000 | 0.50000000 | 174.44 |
| 4 | Ag | 1.00000 0.05100 | 2.96000 | 0.00250000 | 25.00 |
| 5 | ZrO2 | 1.00000 2.06577 | 0.00004 | 1.00000000 | 246.88 |
| Substrate | Glass | 1.52083 | 0.00000 | | |
| Total Thickness | | | | 2.50500000 | 718.21 |

TABLE 8

Material Composition and thickness of the various layers of the fourth example of the optical structure 10.

| | Medium Material | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | ZrO2 | 1.00000 2.06577 | 0.00004 | 0.50000000 | 123.44 |
| 2 | Ag | 1.00000 0.05100 | 2.96000 | 0.00250000 | 25.00 |

TABLE 8-continued

Material Composition and thickness of the various layers of the fourth example of the optical structure 10.

| | Medium Material | Refractive Index | Extinction Coefficient | Optical Physical Thickness (Full Wavelength Optical Thickness) | Thickness (nm) |
|---|---|---|---|---|---|
| 3 | SiO2 1.00000 | 1.46180 | 0.00000 | 0.75000000 | 261.66 |
| 4 | Ag 1.00000 | 0.05100 | 2.96000 | 0.00250000 | 25.00 |
| 5 | ZrO2 1.00000 | 2.06577 | 0.00004 | 0.50000000 | 123.44 |
| Substrate | Glass | 1.52083 | 0.00000 | | |
| Total Thickness | | | | 1.75500000 | 558.55 |

The material composition of the various layers of the third and the fourth example of the optical structure 10 is the same as the material composition of the various layers of the first and the second example of the optical structure 10. For example, similar to the first and the second example of the optical structure 10, the third and the fourth examples of the optical structure 10 comprise a $SiO_2$ layer sandwiched by two silver layers with $ZrO_2$ layers disposed on the side of the two silver layers opposite the side facing the $SiO_2$ layer. However, the thickness of the various layers is different for each of the first, second, third and fourth examples of the optical structure 10.

The third example of the optical structure 10 comprises two silver layers having a thickness of 25 nm each sandwiching a dielectric layer having a thickness of 174.44 nm and comprising $SiO_2$. The third example of the optical structure 10 comprises a layer of $ZrO_2$ on the side of the silver layers opposite the side facing the $SiO_2$ layer. Each $ZrO_2$ layer has a thickness of 246.88 nm. The total thickness of the third example of the optical structure 10 is 718.21 nm.

The fourth example of the optical structure 10 comprises two silver layers having a thickness of 25 nm each sandwiching a dielectric layer having a thickness of 261.66 nm and comprising $SiO_2$. The fourth example of the optical structure 10 comprises a layer of $ZrO_2$ on the side of the silver layers opposite the side facing the $SiO_2$ layer. Each $ZrO_2$ layer has a thickness of 123.44 nm. The total thickness of the fourth example of the optical structure 10 is 558.55 nm.

Figure 6A:
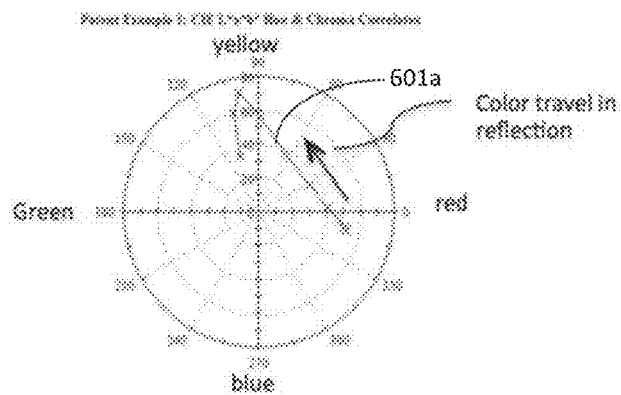
FIGS. 6A-6D and 7A-7D are a*b* plots showing the color travel or change in reflection and transmission respectively for four different example optical structures.

FIG. 6A illustrates the a*b* values in the CIELa*b* color space for the first example of the optical structure 10 having parameters as described in Table 1 for different viewing angles between 0 degrees and 45 degrees with respect to the normal to the surface of the first example of the optical structure 10 in reflection mode. It is observed from FIG. 6A that at a viewing angle of 0 degrees with respect to the normal to the surface of the first example of the optical structure 10, the first example of the optical structure 10 appears magenta to an average human eye in reflection mode. As the viewing angle increases the color reflected by the first example of the optical structure 10 shifts along the curve 601a in the direction of the arrow towards yellow.

Figure 6B:
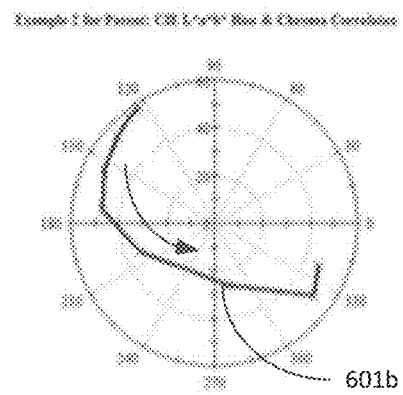

FIG. 6B illustrates the a*b* values in the CIELa*b* color space for the second example of the optical structure 10 having parameters as described in Table 2 for different viewing angles between 0 degrees and 45 degrees with respect to the normal to the surface of the second example of the optical structure 10 in reflection mode. It is observed from FIG. 6B that at a viewing angle of 0 degrees with respect to the normal to the surface of the second example of the optical structure 10, the second example of the optical structure 10 appears yellowish green to an average human eye in reflection mode. As the viewing angle increases the color reflected by the second example of the optical structure 10 shifts along the curve 601b in the direction of the arrow towards magenta.

Figure 6C:
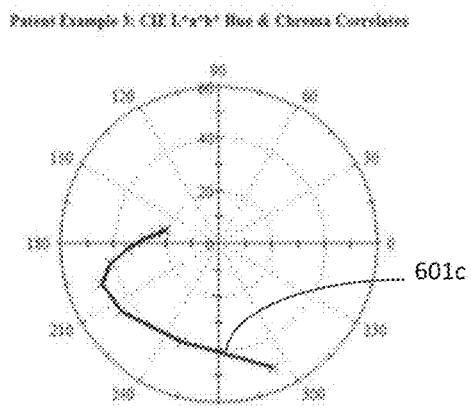

FIG. 6C illustrates the a*b* values in the CIELa*b* color space for the third example of the optical structure 10 having parameters as described in Table 7 for different viewing angles between 0 degrees and 45 degrees with respect to the normal to the surface of the third example of the optical structure 10 in reflection mode. It is observed from FIG. 6C that at a viewing angle of 0 degrees with respect to the normal to the surface of the third example of the optical structure 10, the third example of the optical structure 10 appears green to an average human eye in reflection mode. As the viewing angle increases the color reflected by the third example of the optical structure 10 shifts along the curve 601c in the direction of the arrow towards blue at 35°. The transmission color moves from red to orange as the viewing angle increases to 35°. It is noted that the various reflection and transmission color curves move counterclockwise in the various a*b* plots of FIGS. 6A-6D and 7A-7D.

Figure 6D:
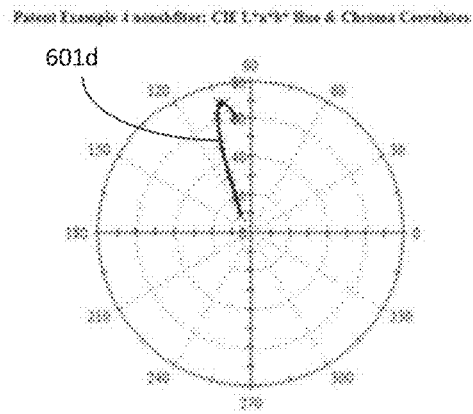

FIG. 6D illustrates the a*b* values in the CIELa*b* color space for the fourth example of the optical structure 10 having parameters as described in Table 8 for different viewing angles between 0 degrees and 45 degrees with respect to the normal to the surface of the fourth example of the optical structure 10 in reflection mode. It is observed from FIG. 6D that at a viewing angle of 0 degrees with respect to the normal to the surface of the fourth example of the optical structure 10, the fourth example of the optical structure 10 appears yellow to an average human eye in reflection mode. As the viewing angle increases the color reflected by the fourth example of the optical structure 10 shifts along the curve 601d in the direction of the arrow towards grey. In transmission the color seen at zero degrees is blue moving to magenta at 35°. This sample is configured as a dichroic film/pigment that has a very small color shift as the angle of view changes.

Figure 7A:
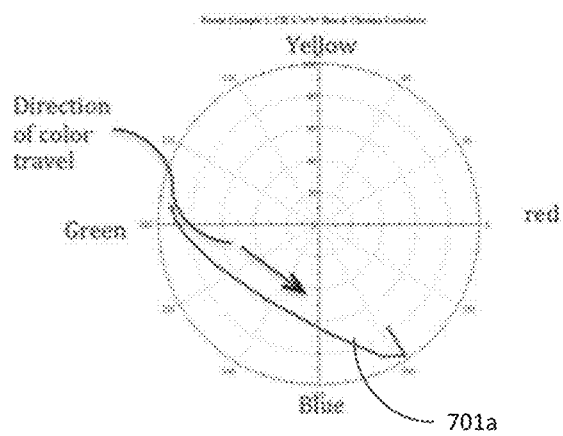

FIG. 7A illustrates the a*b* values in the CIELa*b* color space for the first example of the optical structure 10 having parameters as described in Table 1 for different viewing angles between 0 degrees and 45 degrees with respect to the normal to the surface of the first example of the optical structure 10 in transmission mode. It is observed from FIG. 7A that at a viewing angle of 0 degrees with respect to the normal to the surface of the first example of the optical structure 10, the first example of the optical structure 10 appears green to an average human eye in transmission mode. As the viewing angle increases the color transmitted by the first example of the optical structure 10 shifts along the curve 701a in the direction of the arrow towards violet.

Figure 7B:
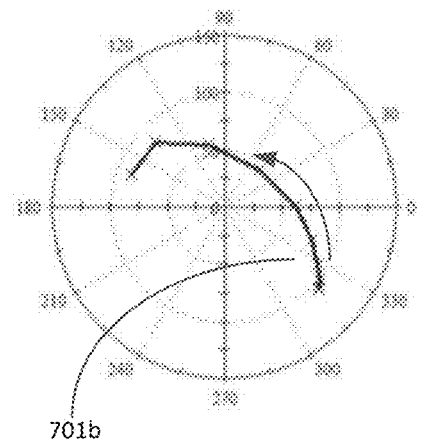

FIG. 7B illustrates the a*b* values in the CIELa*b* color space for the second example of the optical structure 10 having parameters as described in Table 2 for different viewing angles between 0 degrees and 45 degrees with respect to the normal to the surface of the second example of the optical structure 10 in transmission mode. It is observed from FIG. 7B that at a viewing angle of 0 degrees with respect to the normal to the surface of the second example of the optical structure 10, the second example of the optical structure 10 appears purple to an average human eye in transmission mode. As the viewing angle increases the color reflected by the second example of the optical structure 10 shifts along the curve 701b in the direction of the arrow towards green.

Figure 7C:
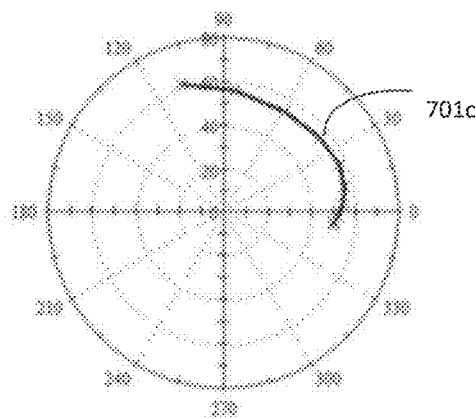

FIG. 7C illustrates the a*b* values in the CIELa*b* color space for the third example of the optical structure 10 having parameters as described in Table 7 for different viewing angles between 0 degrees and 45 degrees with respect to the normal to the surface of the third example of the optical structure 10 in transmission mode. It is observed from FIG. 7C that at a viewing angle of 0 degrees with respect to the normal to the surface of the third example of the optical structure 10, the third example of the optical structure 10 appears red to an average human eye in transmission mode. As the viewing angle increases the color reflected by the third example of the optical structure 10 shifts along the curve 701c in the direction of the arrow towards orange.

Figure 7D:
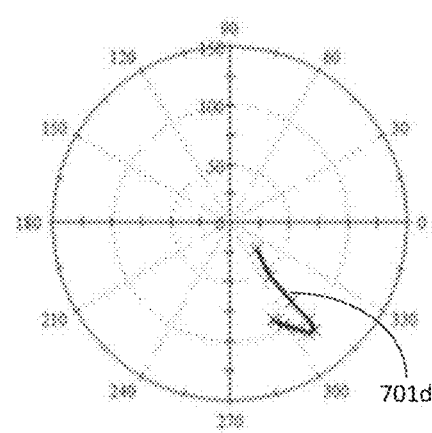

FIG. 7D illustrates the a*b* values in the CIELa*b* color space for the fourth example of the optical structure 10 having parameters as described in Table 8 for different viewing angles between 0 degrees and 45 degrees with respect to the normal to the surface of the fourth example of the optical structure 10 in transmission mode. It is observed from FIG. 7D that at a viewing angle of 0 degrees with respect to the normal to the surface of the fourth example of the optical structure 10, the fourth example of the optical structure 10 appears blue to an average human eye in transmission mode. As the viewing angle increases the color reflected by the fourth example of the optical structure 10 shifts along the curve 701d in the direction of the arrow towards magenta.

The optical structures 10 are considered to be illuminated by D65 illumination for generating the curves of FIGS. 6A-6D and 7A-7D.

Figure 8A:
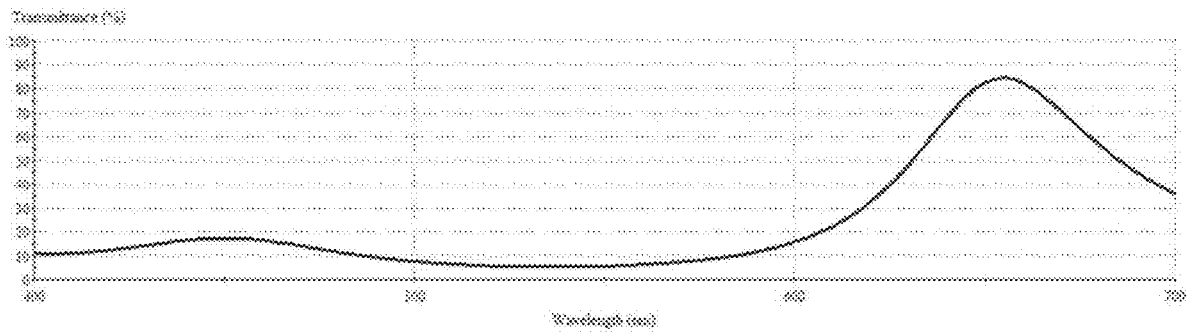
FIGS. 8A and 8B respectively illustrate the transmittance and reflectance spectra for an example of the optical structure.
Figure 8B:
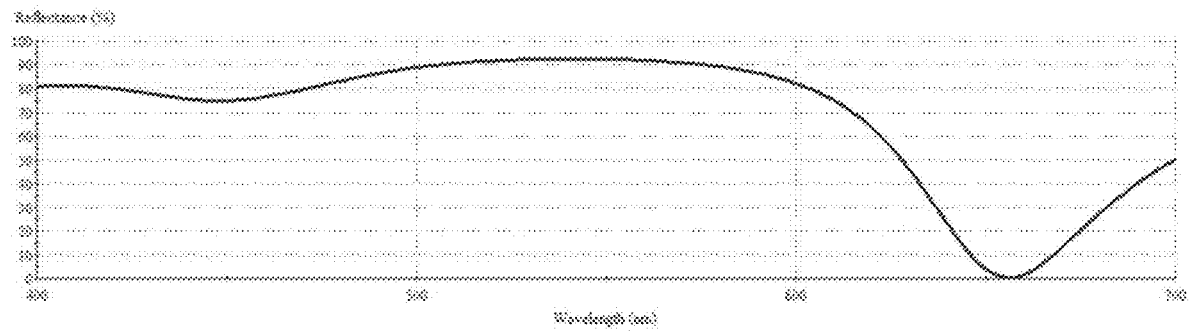

FIGS. 8A and 8B respectively illustrate the transmittance and reflectance spectra for the third example of the optical structure 10 having parameters as described in Table 7. As noted, from FIGS. 8A and 8B, the third example of the optical structure 10 has a peak transmittance at about 650 nm while the reflectance is substantially uniform in the spectral region between about 400 nm and about 600 nm and a dip around 650 nm.

Figure 8C:
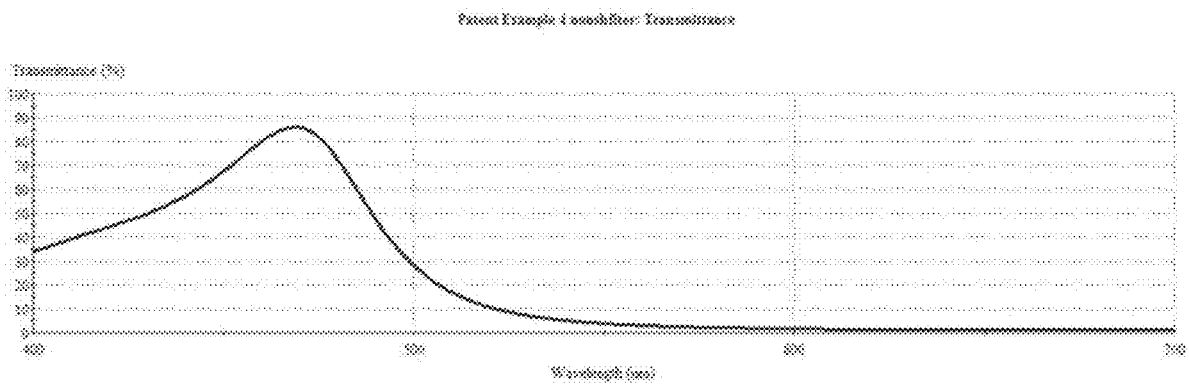
FIGS. 8C and 8D respectively illustrate the transmittance and reflectance spectrum for an example of the optical structure.
Figure 8D:
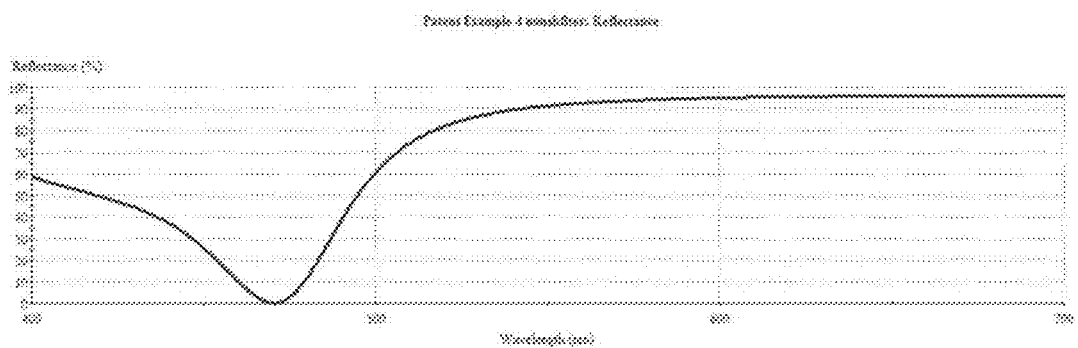

FIGS. 8C and 8D respectively illustrate the transmittance and reflectance spectrum for the fourth example of the optical structure 10 having parameters as described in Table 8. As noted, from FIGS. 8C and 8D, the fourth example of the optical structure 10 has a peak transmittance between about 470 nm and about 480 nm while the reflectance is substantially uniform in the spectral region between about 520 nm and about 700 nm and a dip around 470 nm.

The optical performance of an additional fifth example of the optical structure 10 are analyzed. The fifth example of the optical structure 10 comprised a glass substrate, a first dielectric layer comprising $CeO_2$ over the substrate, a first metal layer comprising aluminum over the first dielectric layer, a second dielectric layer comprising $CeO_2$ over the first metal layer, a second metal layer comprising aluminum over the second dielectric layer, and a third dielectric layer comprising $CeO_2$ over the second metal layer. The thickness of various metal and dielectric layers can be configured to appear blue/violet in transmission at a viewing angle between about 0 degrees and about 40 degrees with respect to a normal to the surface of the fifth example of the optical structure 10 and yellow/green in reflection at viewing angles between 0 degrees and about 40 degrees with respect to a normal to the surface of the fifth example of the optical structure 10.

Figure 8E:
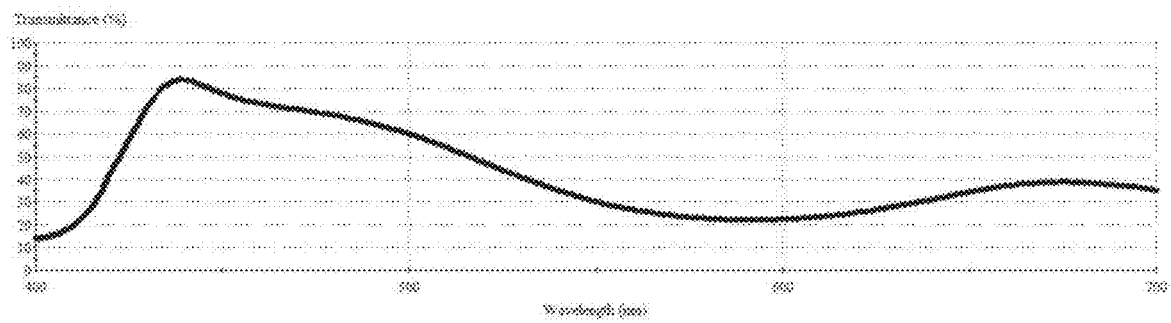
FIGS. 8E and 8F respectively illustrate the transmittance and reflectance spectrum for an example of the optical structure.
Figure 8F:
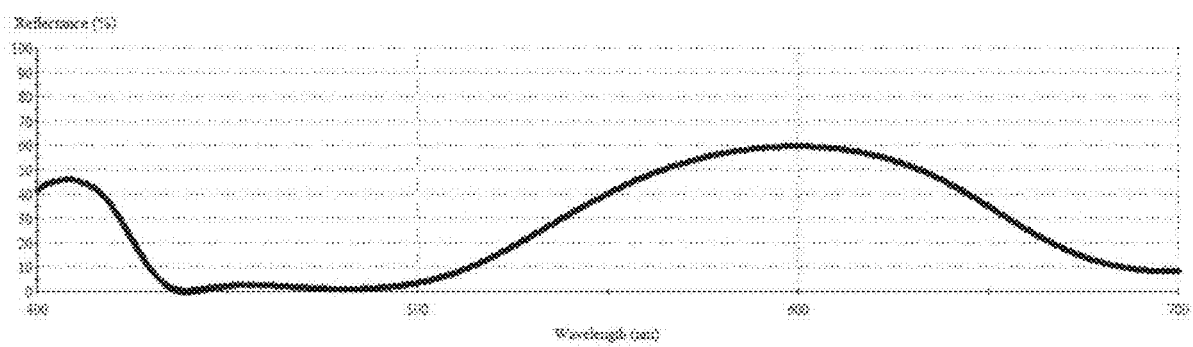
Figure 8G:
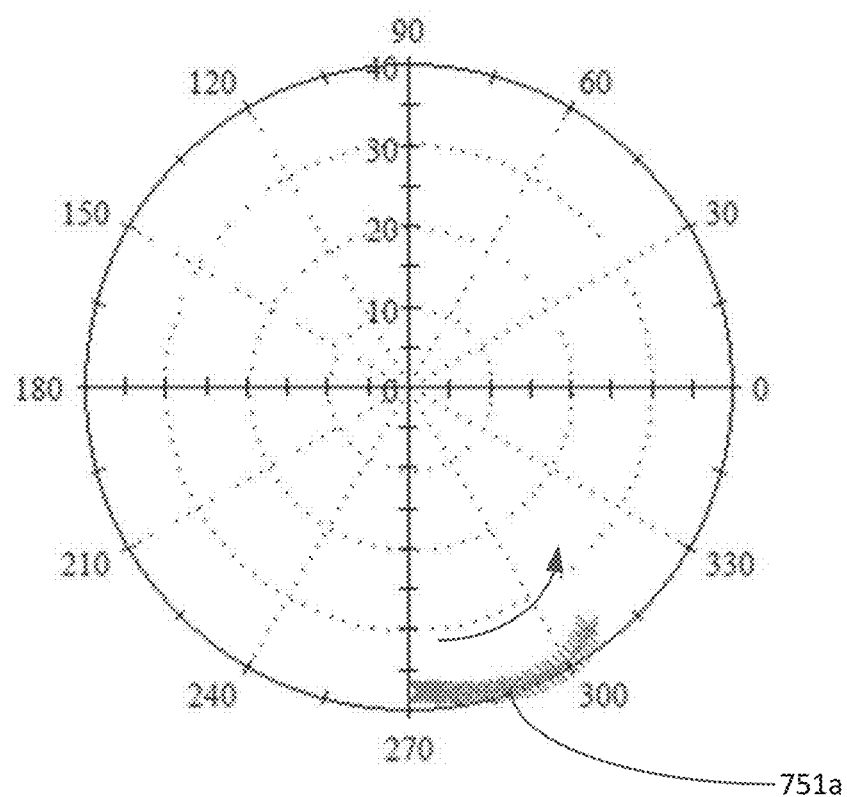
FIG. 8G illustrates the a*b* values in the CIE L*a*b* color space for an example of the optical structure for different viewing angles between 0 degrees and 40 degrees with respect to the normal to the surface of the example of the optical structure in transmission mode.

FIGS. 8E and 8F respectively illustrate the transmittance and reflectance spectrum for the fifth example of the optical structure 10 discussed above. FIG. 8G illustrates the a*b* values in the CIELa*b* color space for the fifth example of the optical structure 10 for different viewing angles between 0 degrees and 40 degrees with respect to the normal to the surface of the fourth example of the optical structure 10 in transmission mode. It is observed from FIG. 8G that at a viewing angle of 0 degrees with respect to the normal to the surface of the fifth example of the optical structure 10, the fifth example of the optical structure 10 appears blue to an average human eye in transmission mode. As the viewing angle increases the color reflected by the fifth example of the optical structure 10 shifts along the curve 751a in the direction of the arrow towards violet.

Figure 8H:
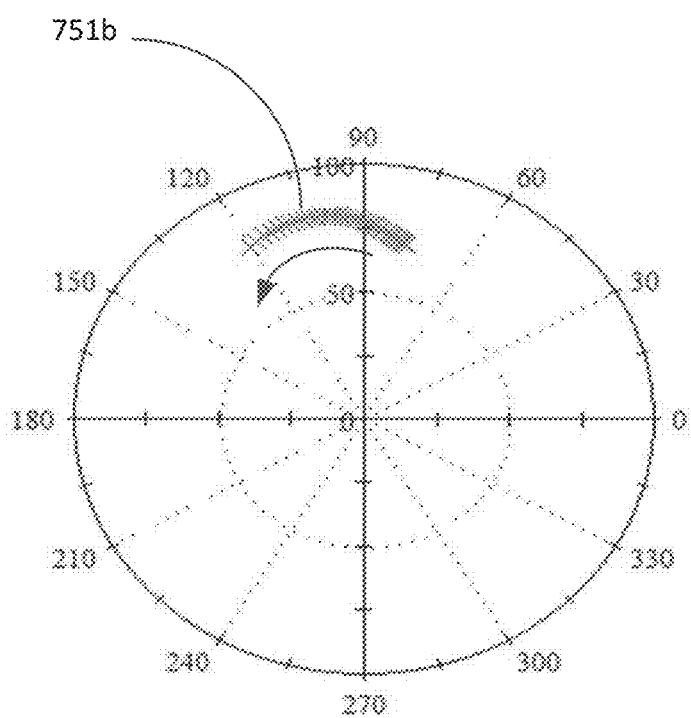
FIG. 8H illustrates the a*b* values in the CIE L*a*b* color space for an example of the optical structure for different viewing angles between 0 degrees and 40 degrees with respect to the normal to the surface of the example of the optical structure in reflection mode.

FIG. 8H illustrates the a*b* values in the CIELa*b* color space for the fifth example of the optical structure 10 for different viewing angles between 0 degrees and 40 degrees with respect to the normal to the surface of the fifth example of the optical structure 10 in reflection mode. It is observed from FIG. 8H that at a viewing angle of 0 degrees with respect to the normal to the surface of the fifth example of the optical structure 10, the fifth example of the optical structure 10 appears yellow to an average human eye in reflection mode. As the viewing angle increases the color reflected by the fifth example of the optical structure 10 shifts along the curve 751b in the direction of the arrow towards green.

Various implementations of an optical structure that can be used as a security feature can comprise a dielectric region comprising one or more dielectric materials surrounded by a partially optically transmissive or partially reflective metal layer (e.g., partially reflective and partially transmissive metal layer). For example, the optical structure can comprise a dielectric region having first and second major surfaces (e.g., top and bottom) and edges (or sides) therebetween. The partially reflective and partially transmissive metal layer can be disposed on the edges (or sides) in addition to being disposed on the first and second major surfaces (e.g., top and bottom). In various implementations, the dielectric region comprising the one or more dielectric materials is optical transmissive and in some configurations may be optically transparent. In certain implementations, the region comprising the one or more dielectric materials is surrounded by a partially optically transmissive and partially reflective metal layer. In various implementations, the one or more dielectric materials can comprise polymer, glass, oxides (e.g., $SiO_2$, $TiO_2$) or other dielectric materials. In various implementations, the dielectric region can comprise a dielectric substrate coated with a one or more dielectric materials (e.g., layers) having a refractive index equal to, less than or greater than the refractive index of the dielectric substrate. In various implementations, the dielectric region can comprise a first dielectric material (e.g., first dielectric layer) having a first refractive index surrounded by a second dielectric material (e.g., second dielectric layer) having a second refractive index. The second refractive index can be equal to, less than or greater than the first refractive index.

Figure 9A:
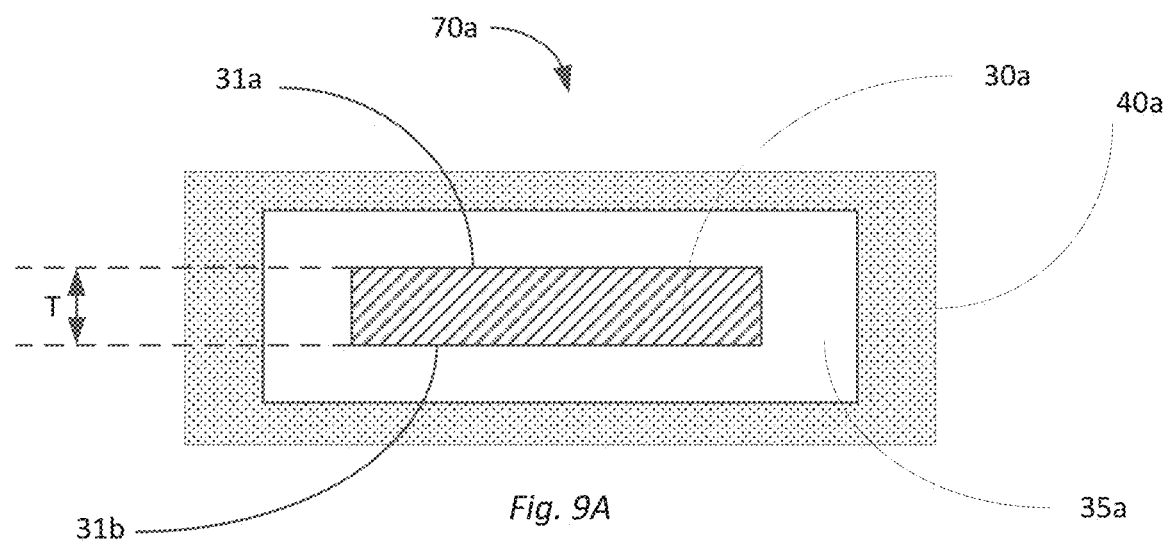
FIG. 9A schematically illustrates a cross-sectional view of an embodiment of an optical structure configured to be used as a security feature.
Figure 9B:
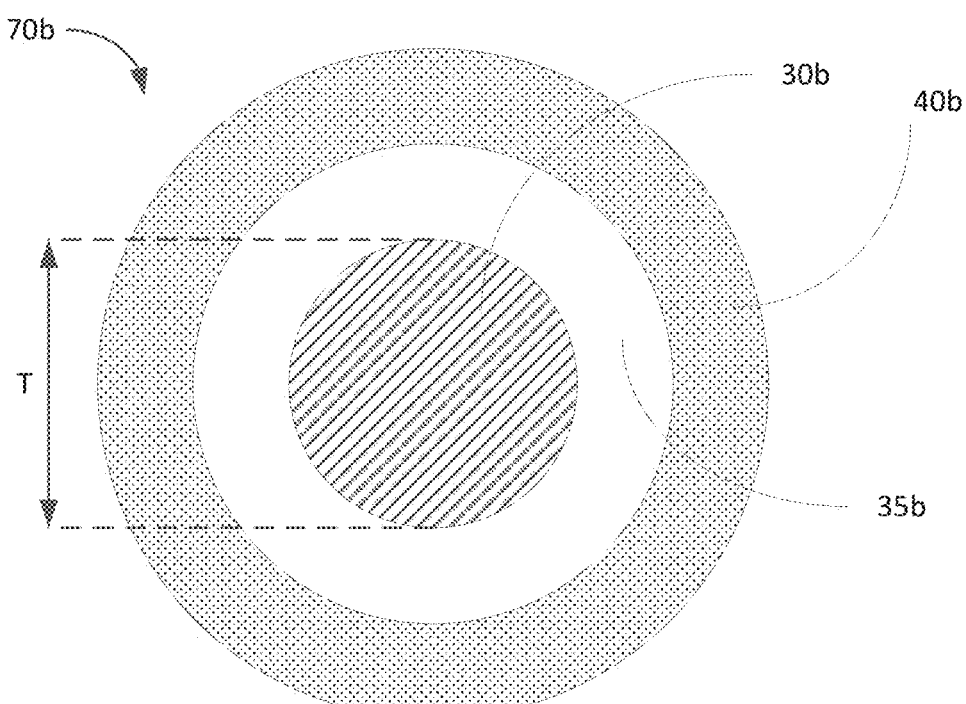
FIG. 9B schematically illustrates a cross-sectional view of another embodiment of an optical structure configured to be used as a security feature.

FIGS. 9A and 9B illustrate different embodiments of such optical structures. FIG. 9A schematically illustrates a cross-sectional view of an embodiment of an optical structure 70a comprising a dielectric region 30a surrounded by a partially reflective and partially transmissive metal layer 35a. The optical structure 70a shown in FIG. 9A has a rectilinear (e.g., rectangular) cross-section. FIG. 9B schematically illustrates a cross-sectional view of another embodiment of an optical structure 70b comprising a dielectric region 30b surrounded by a partially reflective and partially transmissive metal layer 35b. The optical structure 70b shown in FIG. 9B has a circular cross-section.

The dielectric region 30a and/or 30b can comprise one or more dielectric materials such as, for example, polymer, magnesium fluoride, silicon dioxide, aluminum oxide, titanium oxide, cerium oxide, any transparent oxide material, any transparent nitride material, any transparent sulfide material, glass, combinations of any of these materials or any other inorganic or organic material. The refractive index of the one or more dielectric materials in the dielectric region 30a and/or 30b can have a value between about 1.35 and about 2.5. For example, the refractive index of the one or more dielectric materials in the dielectric region 30a and/or 30b can have a value between about 1.38 and 1.48, between about 1.48 and about 1.58, between about 1.58 and about 1.78, between about 1.75 and about 2.0, between about 2.0 and about 2.25, between about 2.25 and about 2.5, or any value in any range/sub-range defined by these values. Values outside these ranges are also possible, in some implementations. The dielectric region 30a and/or 30b can comprise a dielectric substrate coated with a one or more dielectric materials having a refractive index equal to, less than or greater than the refractive index of the dielectric substrate. In various implementations, the dielectric region 30a and/or 30b can comprise a first dielectric material having a first refractive index surrounded by a second dielectric material having a second refractive index. The second refractive index can be equal to, less than or greater than the first refractive index.

In various implementations, the dielectric region 30a and/or 30b can be configured as a slab, flake, a sphere, spheroid, ellipsoid, disc, or any other 3-dimensional shape enclosing a volume. The dielectric region 30a and/or 30b may have a regular or irregular shape. For example, as shown in FIG. 9A, the dielectric region 30a can be configured as a slab having two major surfaces 31a and 31b and one or more edge surfaces disposed between the two major surfaces 31a and 31b. In some implementations, a number of edges surfaces may be disposed between the two major surfaces 31a and 31b. The number of edge surfaces may, for example, be one, two, three, four, five, six, seven, eight, nine, ten, twelve, twenty, thirty, fifty, etc. or in any range between any of these values. Values outside these ranges are also possible. The major surfaces 31a and 31b can have a variety of shapes. For example, one or both of the major surfaces 31a and 31b can have a rectilinear or curvilinear shape in certain implementations. The shape may be regular or irregular in certain implementations. For example, one or both of the major surfaces 31a and 31b can have a square shape, a rectangular shape, a circular shape, an oval shape, an elliptical shape, pentagonal shape, a hexagonal shape, an octagonal shape or any polygonal shape. In various implementations, one or both of the major surface 31a and 31b can have jagged edges such that the lateral dimensions (e.g., length or width) of the one or both of the major surface 31a and 31b varies across the area of the one or both of the major surface 31a and 31b. Other configurations are also possible. Additionally, other shapes are also possible. One or more of the edge surfaces can have a variety of shapes (e.g., as viewed from the side), such as, for example, a square shape, a rectangular shape, an oval shape, an elliptical shape, a pentagonal shape, a hexagonal shape, an octagonal shape or any a polygonal shape.

The shape of the one or more of the edge surfaces (e.g., as viewed from the side) can be rectilinear or curvilinear in certain implementations. The shape may be regular or irregular in certain implementations. Similarly, the cross-section through the dielectric region 30a and/or 30b parallel to one of the major surfaces 31a and 31b, can be rectilinear or curvilinear in certain implementations and can be regular or irregular in certain implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. Likewise, the cross-section through the dielectric material or region 30a and/or 30b perpendicular to one of the surfaces 31a and 31b, can be rectilinear or curvilinear in certain implementations and can be regular or irregular implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. In various implementations, an area, a length and/or a width of the major surfaces 31a and 31b of the dielectric region 30a can be greater than or equal to about 2, 3, 4, 5, 6, 8, or 10 times the thickness of the dielectric region 30a and less than or equal to about 50 times the thickness of the dielectric region 30a, or any value in a range/sub-range between any of these values. Accordingly, the dielectric region 30a can have a large aspect ratio.

In some implementations, a thickness (T) of the dielectric region 30a can correspond to the distance between the two major surfaces 31a and 31b along a vertical direction as shown in FIG. 9A. As another example, as shown in FIG. 9B, the dielectric material 30b can be configured as a sphere. A thickness of the dielectric material 30b configured as a sphere can correspond to the diameter of the sphere. In other implementations, the dielectric material 30a and/or 30b can be configured as a cube, a rectangular cuboid, a cylinder, an ellipsoid, an ovoid or any other three-dimensional shape. The shape may be curvilinear or rectilinear in certain implementations. The shape may be regular or irregular in certain implementations. Accordingly, in some implementations, the dielectric region 30a and/or 30b can be configured as an irregularly shaped object enclosing a volume of one or more dielectric materials.

In various implementations, light can be transmitted through the optical structure 70a or 70b and reflected by surfaces of the optical structure 70a or 70b. Moreover, in various implementations, the dielectric region 30a and/or 30b can have a thickness that allows light incident on one side of the metal layer 35a and/or 35b to constructively or destructively interfere. For example, in various implementations, the thickness of the dielectric region 30a and/or 30b can be approximately a quarter wavelength of light (e.g., visible light) incident thereon or an integer multiple of a quarter wavelength. In various implementations, the thickness of the dielectric region 30a and/or 30b may be, for example, 1/4, 3/4, 5/4, 7/4, 9/4, 10/4, etc. of the wavelength of visible light incident on the dielectric material 30a or 30b.

As a result various wavelengths of incident light can constructively or destructively interfere as it is transmitted through the optical structure 70a or 70b or reflected by the optical structure 70a or 70b. Accordingly, in some configurations, color light is reflected by and/or transmitted through the optical structure when white light is incident thereon. In some implementations, a first color is reflected and a second different color is transmitted when white light is incident on the optical structure. In some case, the first color and the second color can be complementary.

In various implementations, for example, to obtain constructive interference of incident visible light, a thickness (or lateral dimension) of the dielectric region 30a and/or 30b can have a value between about 90 nm and about 2 microns. In various implementations, a thickness (or lateral dimension) of the dielectric region 30a and/or 30b can be greater than or equal to about 90 nm and less than or equal to about 1 microns, greater than or equal to about 100 nm and less than or equal to about 1.0 microns, greater than or equal to about 300 nm and less than or equal to about 1.0 microns, greater than or equal to about 400 nm and less than or equal to about 900 nm, greater than or equal to about 500 nm and less than or equal to about 800 nm, greater than or equal to about 600 nm and less than or equal to about 700 nm, or any thickness in any range/sub-range defined by these values. Values outside these ranges are also possible, in some implementations.

The dielectric material 30a and/or 30b can be purchased from various suppliers (e.g., Tyndall Institute, Glassflake, Ltd., Sigma Technologies) or custom made by synthesizing in a laboratory or a manufacturing facility. In some implementations, the optical structure 70a (or 70b) and/or the dielectric region 30a (or 30b) can comprise flakes (e.g., glass flakes available from Glassflake, Ltd. http://www.glassflake.com/pages/home). In some implementations, the flakes can comprise glass such as, for example, borosilicate flakes having an average thickness between about 90 nm and about 2 microns (e.g., an average thickness of about 1.2 microns) that may or may not be coated with coatings (e.g., high refractive index metal oxides such as $TiO_2$ and/or silica). In various implementations, lateral dimensions (e.g., length and a width) of the flakes can be between about 5 microns and about 20 microns. Values outside these ranges are also possible, in some implementations.

As discussed above, the dielectric region 30a or 30b can be surrounded by a partially reflective and a partially transmissive metal layer 35a or 35b. In some implementations, the metal layer 35a or 35b can comprise a metal having a ratio of the real part (n) of the refractive index to the imaginary part (k) of the refractive index (k) that is less than 1 as discussed above. For example, the metal layer 35a or 35b can comprise metals that have an n/k value between about 0.01 and about 0.6, between about 0.015 and about 0.6, between about 0.01 and about 0.5, between about 0.01 and about 0.2, between about 0.01 and about 0.1, or any value in a range or sub-range defined by these values. Values outside these ranges are also possible, in some implementations. Accordingly, the metal layer 35a or 35b can comprise silver, silver alloys, gold, aluminum or copper and their respective alloys, nickel (Ni) and palladium (Pd).

In various implementations, a thickness of the metal layer 35a or 35b can be configured such that the metal layer 35a or 35b is at least partially transmissive and partially reflective to light in the visible spectral region between about 400 nm and about 800 nm. For example, the thickness of the metal layer 35 can be configured such that the metal layer 35a or 35b is at least partially transmissive to light in a wavelength range between about 400 nm and about 500 nm, between about 430 nm and about 520 nm, between about 450 nm and about 530 nm, between about 520 nm and about 550 nm, between about 540 nm and about 580 nm, between about 550 nm and about 600 nm, between about 600 nm and about 680 nm, between about 630 nm and about 750 nm, or any wavelength in a range/sub-range defined by any of these values. Values outside these ranges are also possible, in some implementations. Alternatively or in addition, the thickness of the metal layer 35a or 35b can be configured such that the metal layer 35a or 35b is at least partially reflective to light in a wavelength range between about 400 nm and about 500 nm, between about 430 nm and about 520 nm, between about 450 nm and about 530 nm, between about 520 nm and about 550 nm, between about 540 nm and about 580 nm, between about 550 nm and about 600 nm, between about 600 nm and about 680 nm, between about 630 nm and about 750 nm, or any wavelength in a range/sub-range defined by any of these values. Values outside these ranges are also possible, in some implementations.

The thickness of the metal layer 35a or 35b can vary depending on the type of metal. For example, in implementations of the optical structure 70a or 70b comprising a metal (e.g., silver) layer 35a or 35b, the thickness of the metal (e.g., silver) layer 35a or 35b can be greater than or equal to about 10 nm and less than or equal to about 35 nm such that the metal (e.g., silver) layer 35a or 35b can be partially transmissive to light in the visible spectral range. In some implementations, the thickness of the metal layer 35a or 35b can be less than about 10 nm or greater than about 35 nm depending possibly on the type of metal used and the wavelength range in which transmissivity or transmittance is desired. Accordingly, in various implementations, the metal layer 35a or 35b can have a thickness greater than or equal to about 3 nm and less than or equal to about 40 nm. Values outside these ranges are also possible, in some implementations. As discussed above, with reference to FIG. 4, the thickness of the metal layer 35a or 35b and the dielectric region 30a or 30b can be configured such that interference of some or all of the incident light reflected by the metal layer 35a or 35b and the one or more layers of the dielectric region 30a or 30b can produce a node at or in the metal layer 35a or 35b. Accordingly, the transmittance through the metal layer 35a or 35b can be greater than the transmittance expected for a certain thickness of the metal layer 35a or 35b. Without subscribing to any particular scientific theory, this effect is known as induced transmittance. As a result of induced transmittance or induced transmission, the optical structure 70a or 70b may in some implementation, be configured to exhibit a first color in reflection mode and a second color in transmission mode.

Depending on the shape of the dielectric region 30a or 30b, the dielectric region 30a or 30b can have one or more outer surfaces. The metal layer 35a or 35b can cover or substantially cover all the outer surfaces of the dielectric region 30a or 30b or a fraction thereof. Accordingly, in various implementations, the metal layer 35a or 35b can be disposed over at least 50% of the one or more outer surfaces of the dielectric region 30a or 30b. For example, metal layer 35a or 35b can be disposed over at least 50%, over at least 60%, at least 75%, at least 80%, at least 85%, at least 90%, at least 95%, at least 99%, 100%, or any range between any of these values of the one or more outer surfaces of the dielectric region 30a or 30b. In some implementations, the metal layer 35a or 35b can be disposed over the entire area (e.g., 100%) of the one or more outer surfaces of the dielectric region 30a or 30b. Without subscribing to any particular theory, the optical properties of the optical structure 70a or 70b can vary based on the amount of outer surface of the dielectric region 30a or 30b that is covered by the metal layer 35a or 35b. For example, the reflectivity or reflectance and/or the transmissivity or transmittance of the optical structure 70a or 70b can vary based on the amount of outer surface of the dielectric region 30a or 30b that is covered by the metal layer 35a or 35b.

In various implementations, the shape of the metal layer 35a or 35b can conform to the shape of the underlying dielectric material 30a or 30b. For example, in the optical structure 70a shown in FIG. 9A, the dielectric material 30a has a rectangular cross-section. Accordingly, the metal layer 35a which is disposed over the major surfaces 31a and 31b and the edge surfaces also has a rectangular cross-section. As another example, in the optical structure 70b shown in FIG. 9B, the dielectric material 30b has a circular cross-section. Accordingly, the metal layer 35b which is disposed over the circumference of the dielectric material 30b also has a circular cross-section. However, in other implementations, the shape of the metal layer 35a or 35b can be different from the shape of the underlying dielectric material 30a or 30b.

In various implementations, the optical structure 70a or 70b comprising a dielectric region 30a or 30b surrounded by a metal layer 35a or 35b can be configured as particles, slabs, filaments, flakes, beads (e.g., spherical beads) or platelets as discussed above. In some implementations, the optical structure 70a or 70b comprising a dielectric region 30a or 30b surrounded by a metal layer 35a or 35b can have the same shape as the shape of the dielectric region 30a or 30b. For example, the optical structure 70a can be configured as a cube or a rectangular cuboid when the dielectric region 30a is configured as a cube or a rectangular cuboid as shown in FIG. 9A. As another example, the optical structure 70b can be configured as a sphere when the dielectric region 30b is configured as a sphere as shown in FIG. 9B. In some cases, the optical structure 70a or 70b configured as a particle, a slab, a flake, a filament, or a platelet can be suitable for a pigment or a printing ink. In some implementations, the optical structure 70a or 70b configured as a particle, a slab, a flake, a filament, or a platelet can have an area (or a lateral dimension) that is about 5 to 10 times or more the thickness of the optical structure 70a or 70b configured as a particle, a slab, a flake, a filament, or a platelet. Accordingly, an optical structure 70a or 70b configured as a particle, a slab, a flake, a filament, or a platelet can have a thickness between about 100 nm and about 1 micron. In some such implementations, the area (or a lateral dimension) can be greater than or equal to about 500 nm and less than or equal to about 1 micron, greater than or equal to about 1 micron and less than or equal to about 5 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. In various embodiments, the optical structure 70a or 70b configured as a particle, a slab, a flake, a filament, or a platelet can be configured such that an area, a length and/or a width of a major surface of the optical structure 70a or 70b is greater than or equal to about 2, 3, 4, 5, 6, 8, or 10 times the thickness of the optical structure 70a or 70b and less than or equal to about 50 times the thickness of the optical structure 70a or 70b or any value in any range formed by any of these values.

In various implementations, surrounding the dielectric region 30a or 30b with the metal layer 35a or 35b can advantageously increase the reflectivity or reflectance of the dielectric material 30a or 30b at one or more wavelengths of the visible spectral range in some implementations. In some implementations, surrounding the dielectric material 30a or 30b with the metal layer 35a or 35b can advantageously enhance or change the color appearance of the dielectric material 30a or 30b at one or more wavelengths of the visible spectral range in reflection and transmission mode.

In various implementations, the optical structure 70a or 70b comprising the dielectric region 30a or 30b surrounded by the metal layer 35a or 35b can have a reflection spectrum with one or more reflection peaks in the visible spectral region and a transmission spectrum with one or more transmission peaks in the visible spectral region. Without any loss of generality, the one or more reflection peaks and the one or more transmission peak do not overlap with each other. Accordingly, the optical structure 70a or 70b comprising the dielectric region 30a or 30b surrounded by the metal layer 35a or 35b can have a first color in the reflection mode and a second color different from the first color in the transmission mode. In certain implementations, the first color and the second color can be complementary colors, such as, for example, red and green, yellow and violet, blue and orange, green and magenta, etc.

In various implementations, there may be little to no shift in the first color in the reflection mode for any viewing angle between a first angle with respect to a normal to the surface of the optical structure 70a or 70b and a second angle with respect to a normal to the surface of the optical structure 70a or 70b. Likewise, in some implementations, there may be little to no shift in the second color in the transmission mode for any viewing angle between a first angle with respect to a normal to the surface of the optical structure 70a or 70b and a second angle with respect to a normal to the surface of the optical structure 70a or 70b. In various implementations, the first angle can have a value between 0 degrees and 10 degrees (e.g., 0 degrees, 1 degree, 2 degrees, 3 degrees, 4 degrees, 5 degrees, 6 degrees, 7 degrees, 8 degrees, 9 degrees or 10 degrees). In various implementations, the second angle can have a value between 20 degrees and 90 degrees (e.g., 20 degrees, 30 degrees, 40 degrees, 50 degrees, 60 degrees, 70 degrees, 80 degrees or 90 degrees). Accordingly, for any viewing angle between a first angle (e.g., 0 degrees, 1 degree, 2 degrees, 3 degrees, 4 degrees, 5 degrees, 6 degrees, 7 degrees, 8 degrees, 9 degrees or 10 degrees) with respect to a normal to the surface of the optical structure 70a or 70b and a second angle (e.g., 20 degrees, 30 degrees, 40 degrees, 50 degrees, 60 degrees, 70 degrees, 80 degrees or 90 degrees) with respect to a normal to the surface of the optical structure 70a or 70b, the color of the optical structure 70a or 70b in the reflection mode and/or the transmission mode may remain substantially the same. Likewise, in some implementations, there may be little to no shift color shift in the color of the optical structure 70a or 70b in the reflection mode and/or the transmission mode for tilt of 10 degrees, 20 degrees, 30 degrees, 40 degrees, 50 degrees, 60 degrees, 70 degrees, 80 degrees or 90 degrees or any value in a range/sub-range defined by any of these values.

In some implementations, it may be desirable to have a color shift in the first color in the reflection mode as the viewing angle changes from a first angle with respect to a normal to the surface of the optical structure 70a or 70b to a second angle with respect to a normal to the surface of the optical structure 70a or 70b. Similarly, in various implementations, it may be desirable to have a color shift in the second color in the transmission mode as the viewing angle changes from a first angle with respect to a normal to the surface of the optical structure 70a or 70b to a second angle with respect to a normal to the surface of the optical structure 70a or 70b. In various implementations, the first angle can have a value between 0 degrees and 10 degrees (e.g., 0 degrees, 1 degree, 2 degrees, 3 degrees, 4 degrees, 5 degrees, 6 degrees, 7 degrees, 8 degrees, 9 degrees or 10 degrees). In various implementations, the second angle can have a value between 20 degrees and 90 degrees (e.g., 20 degrees, 30 degrees, 40 degrees, 50 degrees, 60 degrees, 70 degrees, 80 degrees or 90 degrees) depending on the design. Accordingly, as the viewing angle changes from a first angle (e.g., 0 degrees, 1 degree, 2 degrees, 3 degrees, 4 degrees, 5 degrees, 6 degrees, 7 degrees, 8 degrees, 9 degrees or 10 degrees) with respect to a normal to the surface of the optical structure 70a or 70b to a second angle with respect to a normal to the surface of the optical structure 70a or 70b and a second angle (e.g., 20 degrees, 30 degrees, 40 degrees, 50 degrees, 60 degrees, 70 degrees, 80 degrees or 90 degrees) with respect to a normal to the surface of the optical structure 70a or 70b, the color of the optical structure 70a or 70b in the reflection mode and/or the transmission mode may change (e.g., dark blue to light blue, purple to pink, dark green to light green, etc) Likewise, in some implementations, there may be a shift in the color of the optical structure 70a or 70b in the reflection mode and/or the transmission mode for tilt of 10 degrees, 20 degrees, 30 degrees, 40 degrees, 50 degrees, 60 degrees, 70 degrees, 80 degrees or 90 degrees or any value in a range/sub-range defined by any of these values.

Without subscribing to any particular theory, the one or more reflection peaks of the reflection spectrum of the optical structure 70a or 70b comprising the dielectric region 30a or 30b surrounded by the metal layer 35a or 35b can have high reflectivity or reflectance. For example, the reflectivity or reflectance of the one or more reflection peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Without subscribing to any particular theory, the one or more transmission peaks of the transmission spectrum of the optical structure 70a or 70b comprising the dielectric region 30a or 30b surrounded by the metal layer 35a or 35b can have high transmissivity or transmittance. For example, the transmissivity or transmittance of the one or more transmission peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

The optical structures 70a and 70b comprising the dielectric region 30a or 30b surrounded by the metal layer 35a or 35b can produce many or all the optical effects that are described above with reference to optical structure 10 where the two metal layers 13 and 15 do not surround the dielectric layer 14 (e.g., as shown in FIG. 1).

The metal layer 35a or 35b can be disposed around the dielectric material 30a or 30b using a variety of chemical methods. For example, metal layer 35a or 35b can be disposed around the dielectric region 30a or 30b using electroless method. Various implementations of an electroless method of depositing the metal layer 35a or 35b can comprise depositing the metal layer 35a or 35b without applying electrical current or voltage. Various metals such as, for example, gold, silver, or nickel can be deposited using electroless methods. An example of depositing metal layer 35a or 35b comprising silver around the dielectric region 30a or 30b using an electroless method is discussed below. The electroless method of depositing silver can also be referred to as electroless silver plating. Electroless silver plating comprises immersing the dielectric region 30a or 30b in a silvering bath comprising chemical compounds of silver (e.g., silver nitrate, silver-ammonia compounds, sodium argento cyanide, etc.) and at least one of ammonia, water, potassium hydroxide or sodium hydroxide. The chemical compounds of silver are reduced to metallic silver using a reducing agent which is added to the silvering bath. The metallic silver adheres to the exposed surfaces of the dielectric region 30a or 30b. The reducing agent can comprise glucose, sucrose, invert sugar, stannous chloride, hydrazine, Rochelle salt, formaldehyde, or organic borane (e.g., dimethylamine borane in various implementations). In certain implementations, the silvering bath and the reducing agent can be sprayed on the dielectric region 30a or 30b. In some implementations, the outer surface of the dielectric region 30a or 30b can be activated using stannous chloride ($SnCl_2$) in preparation for the electroless deposition of the metal layer. Other methods of depositing the metal layer 35a or 35b on the outer surface of the dielectric region 30a or 30b can also be used. For example, the metal layer 35a or 35b can be disposed around the dielectric region 30a or 30b using methods such as, for example, chemical vapor deposition (CVD), sputtering or electroplating. In some implementations, the metal layer 35a or 35b can be patterned around the dielectric region 30a or 30b.

In various implementation, a second dielectric region 40a or 40b comprising one or more dielectric materials may be disposed around the metal coated dielectric region 30a or 30b. The second dielectric region 40a or 40b may comprise high refractive index materials such as $ZrO_2$, $TiO_2$, ZnS, ITO (indium tin oxide), $CeO_2$ or $Ta_2O_3$. In various implementations, the second dielectric region 40a or 40b may comprise dielectric materials having refractive index greater than 1.65 and less than or equal to 2.5. For example, the refractive index of the one or more dielectric material in the second dielectric region 40a or 40b can be greater than or equal to 1.65 and less than or equal to 1.75, greater than or equal to 1.75 and less than or equal to 1.85, greater than or equal to 1.85 and less than or equal to 1.95, greater than or equal to 1.95 and less than or equal to 2.05, greater than or equal to 2.0 and less than or equal to 2.2, greater than or equal to 2.1 and less than or equal to 2.3, greater than or equal to 2.25 and less than or equal to 2.5, or any value in any range/sub-range defined by these values. Other values outside these ranges are also possible in some implementations. In various implementations, the refractive index of the one or more materials of the second dielectric region 40a or 40b can be greater than the refractive index of the one or more materials of the dielectric region 30a or 30b. The thickness of the second dielectric region 40a or 40b can be between 75 nm and 700 nm. For example, the thickness of the second dielectric region 40a or 40b can be greater than or equal to 75 nm and less than or equal to 100 nm, greater than or equal to 100 nm and less than or equal to 150 nm, greater than or equal to 150 nm and less than or equal to 200 nm, greater than or equal to 200 nm and less than or equal to 250 nm, greater than or equal to 300 nm and less than or equal to 350 nm, greater than or equal to 400 nm and less than or equal to 450 nm, greater than or equal to 450 nm and less than or equal to 500 nm, greater than or equal to about 500 nm and less than or equal to 650 nm, greater than or equal to 650 nm and less than or equal to 700 nm, or any value in any range/sub-range defined by these values. The second dielectric region 40a or 40b can be disposed to cover at least 50% of the outer surface of the metal layer 35a or 35b. For example, the second dielectric region 40a or 40b can be disposed to cover at least 80%, at least 90%, at least 95%, or 100% of the outer surface of the metal layer 35a or 35b, or any value in a range/sub-range defined by these values.

The reflected color and/or the transmitted color of the optical structure 70a or 70b comprising the second dielectric region 40a or 40b surrounding the metal coated dielectric region 30a or 30b can be different from the reflected color and/or the transmitted color of the optical structure 70a or 70b comprising only the metal coated dielectric region 30a or 30b. For example, the reflected color and/or the transmitted color of the optical structure 70a or 70b comprising the second dielectric region 40a or 40b surrounding the metal coated dielectric region 30a or 30b can be more vibrant than the reflected color and/or the transmitted color of the optical structure 70a or 70b comprising the metal coated dielectric region 30a or 30b without the second dielectric region 40a or 40b having suitable thickness and/or materials with suitable refractive index. The shape of the transmission and/or reflection peaks, the position of the maximum of the transmission and/or reflection peaks and/or the width (e.g., full width at half maximum (FWHM)) of the transmission and/or reflection peaks of the optical structure 70a or 70b comprising the second dielectric region 40a or 40b surrounding the metal coated dielectric region 30a or 30b can be different from the shape of the transmission and/or reflection peaks, the position of the maximum of the transmission and/or reflection peaks and/or the width of the transmission and reflection peaks of the optical structure 70a or 70b comprising the metal coated dielectric region 30a or 30b without the second dielectric region 40a or 40b having suitable thickness and/or materials with suitable refractive index. For example, the width of one or more of the reflection peaks of the optical structure 70a or 70b comprising the second dielectric region 40a or 40b surrounding the metal coated dielectric region 30a or 30b can be broader than the width of a corresponding reflection peak of the optical structure 70a or 70b comprising the metal coated dielectric region 30a or 30b without the second dielectric region 40a or 40b having suitable thickness and/or materials with suitable refractive index. As another example, the width (e.g., FWHM) of one or more of the reflection peaks of the optical structure 70a or 70b comprising the second dielectric region 40a or 40b surrounding the metal coated dielectric region 30a or 30b can be greater than or equal to about 50 nm and less than or equal to about 300 nm, in some implementations.

Various implementations of the of the optical structure 70a or 70b comprising the second dielectric region 40a or 40b surrounding the metal coated dielectric region 30a or 30b can have a reflection spectrum with one or more reflection peaks having a width (e.g., FWHM) greater than or equal to about 10 nm, greater than or equal to about 20 nm, greater than or equal to about 30 nm, greater than or equal to about 40 nm, greater than or equal to about 50 nm, greater than or equal to about 60 nm, greater than or equal to about 70 nm, greater than or equal to about 100 nm, greater than or equal to about 200 nm, less than or equal to about 300 nm, less than or equal to about 250 nm, or any value in a range/sub-range defined by these values. Various implementations of the optical structure 70a or 70b comprising the second dielectric region 40a or 40b surrounding the metal coated dielectric region 30a or 30b can have higher reflectivity or reflectance at one or more wavelengths in the visible spectral range as compared to the reflectivity or reflectance of the optical structure 70a or 70b comprising the metal coated dielectric region 30a or 30b without the second dielectric region 40a or 40b having suitable thickness and/or materials with suitable refractive index at those one or more wavelengths in the visible spectral range.

Various implementations of the of the optical structure 70a or 70b comprising the second dielectric region 40a or 40b surrounding the metal coated dielectric region 30a or 30b can have a transmission spectrum with one or more transmission peaks having a width (e.g., FWHM) greater than or equal to about 10 nm, greater than or equal to about 20 nm, greater than or equal to about 30 nm, greater than or equal to about 40 nm, greater than or equal to about 50 nm, greater than or equal to about 60 nm, greater than or equal to about 70 nm, greater than or equal to about 100 nm, greater than or equal to about 200 nm, less than or equal to about 300 nm, less than or equal to about 250 nm, or any value in a range/sub-range defined by these values.

Without subscribing to any particular theory, the one or more reflection peaks of the reflection spectrum of the optical structure 70a or 70b comprising the second dielectric region 40a or 40b surrounding the metal coated dielectric region 30a or 30b can have high reflectivity or reflectance. For example, the reflectivity or reflectance of the one or more reflection peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Without subscribing to any particular theory, the one or more transmission peaks of the transmission spectrum of the optical structure 70a or 70b comprising the second dielectric region 40a or 40b surrounding the metal coated dielectric region 30a or 30b can have high transmissivity or transmittance. For example, the transmissivity or transmittance of the one or more transmission peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Additionally, the second dielectric region 40a or 40b can advantageously insulate the metal layer 35a or 35b from the ink varnish when the optical structures 70a or 70b are configured as pigments.

In some implementations, the second dielectric region 40a or 40b can be disposed around the metal coated dielectric materials 30a or 30b using a sol-gel process. For example, the metal coated dielectric materials 30a or 30b can be coated with a dielectric material comprising titanium di-oxide ($TiO_2$) using a sol-gel process, involving the hydrolysis of titanium(IV) isopropoxide. As another example, a precursor comprising the dielectric material 40a or 40b is transformed to form a colloidal suspension (or a "sol") by a series of hydrolysis and polymerization reactions. In some implementations, the colloidal suspension comprising the dielectric material of the second dielectric region 40a or 40b can be disposed on the metal coated first dielectric region 30a or 30b by a coating, gelling or precipitation. The metal coated first dielectric region 30a or 30b comprising the colloidal suspension comprising the dielectric material of the second dielectric region 40a or 40b can be heated or dried to obtain the metal coated first dielectric region 30a or 30b coated with second dielectric region 40a or 40b. In some implementations, the one or more materials of the second dielectric region 40a or 40b can be disposed around the metal coated first dielectric region 30a or 30b using deposition methods such as, for example, chemical vapor deposition method, e-beam, sputtering. In some implementations, the various deposition methods can be combined with vibrating the metal coated first dielectric region 30a or 30b.

As discussed above, various embodiments of the optical structures 10, 70a or 70b are configured to partially reflect light and partially transmit light. In various implementations, the reflectivity or reflectance of the optical structures 10, 70a or 70b at one or more wavelengths in the visible spectral range can be greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95% and/or less than or equal to 100%, or any value in any range/sub-range defined by these value. In various implementations, the transmissivity or transmittance of the optical structures 10, 70a or 70b at one or more wavelengths in the visible spectral range can be greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95% and/or less than or equal to 100%, or any value in any range/sub-range defined by these value. In various implementations, the reflectivity or reflectance of the optical structures 10, 70a or 70b at one or more first set of wavelengths can be approximately equal to the transmissivity or transmittance of the optical structures 10, 70a or 70b at one or more second set of wavelengths different from the first set of wavelengths.

The optical structures 10, 70a or 70b can have a size, such as, for example, a lateral dimension, an area, a length or a width of the optical structure (e.g., a length, a width or an area of a major surface of the optical structure) greater than or equal to about 1 micron and less than or equal to about 50 microns. For example, the size of the optical structures 10, 70a or 70b can be greater than or equal to about 1 micron and less than or equal to 10 microns, greater than or equal to 2 microns and less than or equal to 12 microns, greater than or equal to 3 microns and less than or equal to 15 microns, greater than or equal to 4 microns and less than or equal to 18 microns, greater than or equal to 5 microns and less than or equal to 20 microns, greater than or equal to 10 microns and less than or equal to 20 microns, greater than or equal to 15 microns and less than or equal to 25 microns, greater than or equal to 20 microns and less than or equal to about 30 microns, greater than or equal to 25 microns and less than or equal to 35 microns, greater than or equal to 30 microns and less than or equal to 40 microns, greater than or equal to 35 microns and less than or equal to 45 microns, greater than or equal to 40 microns and less than or equal to 50 microns, or a value in any range/sub-range defined by these values.

The optical structures 10, 70a or 70b can have a size, such as, for example, a lateral dimension, an area, a length or a width of the optical structure (e.g., a length, a width or an area of a major surface of the optical structure) greater than or equal to about 1 micron and less than or equal to about 50 microns can be between 0.1 microns and 2.0 microns. For example, the thickness of the optical structures 10, 70a or 70b having a size, such as, for example, a lateral dimension, an area, a length or a width of the optical structure (e.g., a length, a width or an area of a major surface of the optical structure) greater than or equal to 0.1 micron and less than or equal to 0.3 microns, greater than or equal to 0.2 microns and less than or equal to 0.5 microns, greater than or equal to 0.3 microns and less than or equal to 0.6 microns, greater than or equal to 0.4 microns and less than or equal to 0.7 microns, greater than or equal to 0.5 microns and less than or equal to 0.8 microns, greater than or equal to 0.6 microns and less than or equal to 0.9 microns, greater than or equal to 0.7 microns and less than or equal to 1.0 micron, greater than or equal to 1.0 micron and less than or equal to 1.2 microns, greater than or equal to 1.2 microns and less than or equal to 1.5 microns, greater than or equal to 1.5 microns and less than or equal to 2.0 microns, or a value in any range/sub-range defined by these values.

One or more of the optical structures 10, 70a or 70b discussed above can be incorporated with or in a document (e.g., a banknote), package, product, or other item. Optical products such as a film, a thread, a laminate, a foil, a pigment, or an ink comprising one or more of the optical structures 10, 70a or 70b discussed above can be incorporated with or in documents such as banknotes or other documents to verify authenticity of the documents, packaging materials, etc. For example, the optical structures 70a or 70b can be configured as an ink or a pigment which is disposed on a base comprising at least one of a polymer, a plastic, a paper or a fabric. The base may be flexible in some implementations. The base comprising the ink or a pigment or pigment comprising the optical structures 70a or 70b can be cut or diced to obtain a thread or a foil. A plurality of optical structures 10, 70a or 70b discussed above can be incorporated in a particular optical product (e.g., ink, pigment, thread, filament, paper, security ink, security pigment, security thread, security filament, security paper, etc.). The shapes, sizes and/or aspect ratios of the plurality of optical structures 10, 70a or 70b discussed above that are incorporated in a particular optical product (e.g., ink, pigment, thread, filament, paper, security ink, security pigment, security thread, security filament, security paper, etc.) can vary. Accordingly, a particular optical product (e.g., ink, pigment, thread, filament, paper, security ink, security pigment, security thread, security filament, security paper, etc.) can comprise optical structures 10, 70a or 70b with different distributions of shapes, sizes and/or aspect ratios of the optical structures. For example, a particular optical product (e.g., ink, pigment, thread, filament, paper, security ink, security pigment, security thread, security filament, security paper, etc.) can comprise optical structures 10, 70a or 70b with sizes distributed around one or more mean sizes. As another example, a particular optical product (e.g., ink, pigment, thread, filament, paper, security ink, security pigment, security thread, security filament, security paper, etc.) can comprise optical structures 10, 70a or 70b with aspect ratios distributed around one or more aspect ratios.

Figure 10:
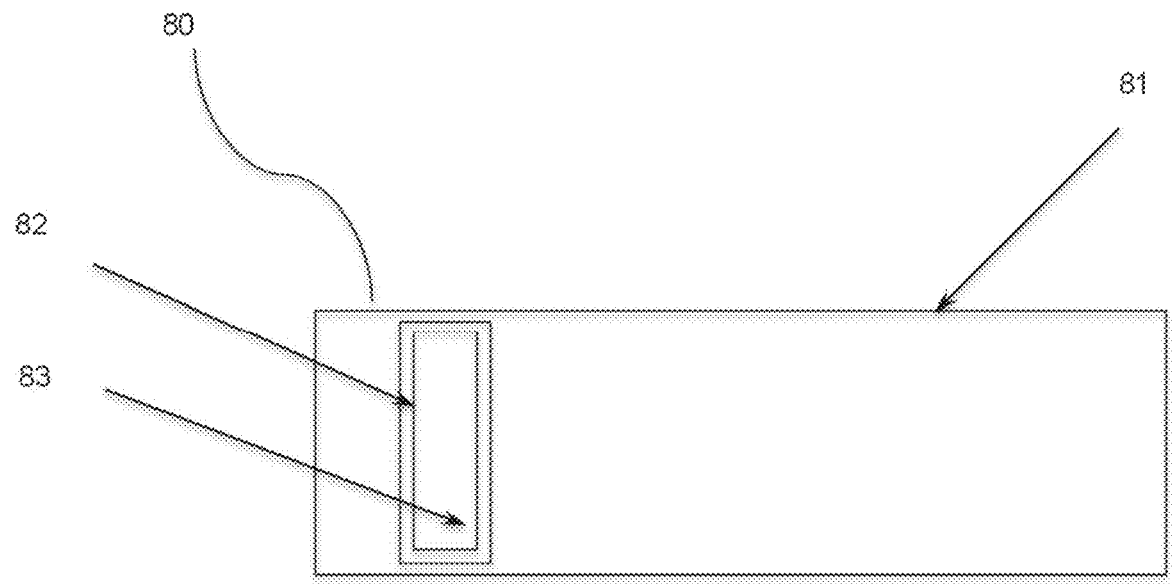
FIG. 10 is a schematic illustration of a laminate structure comprising an optical structure that is affixed to a banknote.

FIG. 10 shows, for example, a banknote 80 comprising a laminated film 83. The laminated film 83 comprises the optical structure 10, 70a or 70b. The laminated film 83 can be fabricated by disposing the optical structure 10, 70a or 70b over a base or support layer or substrate such as polymer base layer (e.g., a polyester film). The optical structure 10, 70a or 70b can be disposed over the polymer base layer by a variety of methods including but not limited to coating methods, vacuum deposition on a surface of the polymer base layer, etc. The optical structure 10, 70a or 70b may be disposed over a first side of the surface of the polymer base layer (e.g., polyester film). The laminated film 83 can be adhered to the "paper" (e.g., cellulose, cotton/linen, polymer or fabric) 81 of the banknote 80, for example, by a transparent and/or an optically clear adhesive. In various cases, a second surface of the polymer base layer opposite the first surface of the base layer is disposed closer to the banknote paper 81 comprising the banknote and may be in contact with the adhesive. In some cases, the adhesive can be a two component adhesive with one component disposed onto the banknote paper and the other component disposed on the second surface of the polymer base layer opposite the first surface of the base layer on which the optical structure 10, 70a or 70b is disposed. The banknote 80 and the laminated film 83 can be brought together for bonding. The laminated film 83 can also be attached to the banknote 80 using a cross-linking thermoset adhesive. A transparent protective barrier coating 82 (e.g., UV curable cross-linked resin) can be disposed over the laminated film 83. The protective barrier coating 82 can extend over the edges of the laminated film 83 onto the paper (e.g., fabric) 81 of the banknote. The protective barrier coating 82 can be configured to protect the laminated film 83 against corrosion, abrasive wear and liquids that may commonly come in contact with the banknote 80 without sacrificing the optical effects provided by the laminated film 83. The optical structure 10 can be disposed facing the protective barrier coating 82 or the adhesive layer between the laminated film 83 and the "paper" 81.

In some embodiments, the optical structure 10, 70a or 70b can be configured as a thread (e.g., a windowed thread) instead of a laminated film. A windowed thread can be manufactured by a variety of methods. For example, the thread can be woven up and down within the paper and to the surface of the paper during the papermaking process. As another example, the windowed thread can be disposed within the paper itself so that no part of the thread reaches the surface of the banknote. As yet another example, open spaces within the paper can be provided in the regions of the paper comprising the thread.

The thread can be fabricated by cutting a strip of the optical structure 10, for example the web, sheet, or base layer on which the layers comprising the optical structure 10 are formed and passing the strip through a bath of UV curable resin. The rate at which the strip is passed through the UV curable resin bath can be controlled to coat the sides and the edges of the strip uniformly. The strip coated with the UV curable resin can be cured to obtain the thread. The obtained thread comprising the optical structure 10 can be inserted (e.g., weaved) in the banknote. In some implementations, any fringe (e.g., the jagged or ragged edge of the thread) of the thread (due to hot stamping or chatter from any cutting operation) can be hidden from an observer by printing an opaque border around the hot stamp patch. Another way to affix the optical structure 10, 70a or 70b to the banknote can include die cutting a portion of the optical structure, for example, the web, sheet, or base layer on which the layers comprising the optical structure 10, 70a or 70b are formed and applying the portion to the banknote using an adhesive. Various implementations of the examples of optical structure described above can be configured as a thread, a hot stamp, or a laminate and incorporated with or in a document (e.g., a banknote), package, product, or other item.

Without any loss of generality, the optical structure 10, 70a or 70b or a material (e.g., an ink, a paint or a pigment, a varnish) comprising the optical structure 10, 70a or 70b can be disposed on a base comprising at least one of a polymer, a plastic, a paper or a fabric. The base comprising the optical structure 10, 70a or 70b or the material comprising the optical structure 10, 70a or 70b can be cut or diced into a smaller portions having a variety of shapes and/or sizes. The smaller portions can be disposed on or inserted into or onto a substrate (e.g., a bank note, paper, packaging material, fabric, etc.) using various methods. For example, the smaller portions can be configured as strips or threads which can be woven into the substrate. As another example, the smaller portions can be configured as foils which can be hot stamped on the substrate. As yet another example, the smaller portions can be laminated to the substrate using adhesives.

Figure 11A:
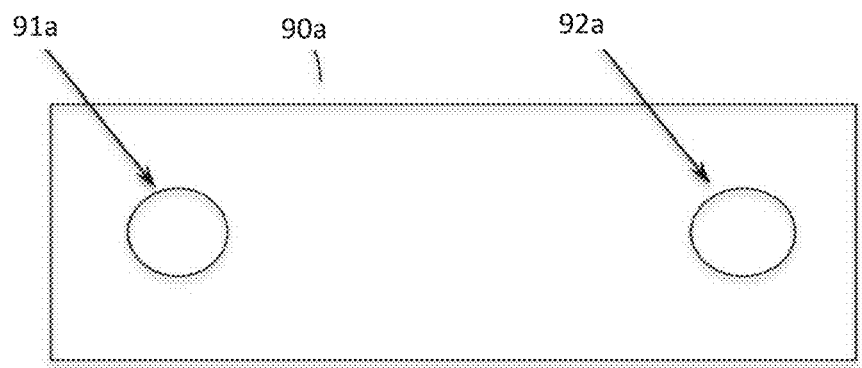
FIG. 11A shows a banknote with two windows, each window including a different optical structure.

FIG. 11A depicts a banknote 90a having two transparent windows 91a and 92a inserted into or attached on the paper (e.g., fabric) of the banknote. Each window comprises the optical structure 10, 70a or 70b. In some implementations, the reflection and/or transmission spectra of the optical structure 10 of the window 91a may be configured to be different from the reflection and/or transmission spectra of the optical structure 10, 70a or 70b of the window 92a. Thus, a person viewing the banknote 90a will perceive a first reflected color when viewing the window 91a along a viewing direction (e.g., normal to the surface of the banknote 90a) and a second reflected color different from the first reflected color when viewing the window 92a along the viewing direction. The person may also perceive a third transmitted color different from the first reflected color when viewing through the window 91a along the viewing direction. The person may additionally perceive a fourth transmitted color different from the first, second and third colors when viewing through the window 92a along the viewing direction. Furthermore, upon folding the banknote 90a over itself so that the two windows 91a and 92a are at least partially aligned with respect to one another, the person will perceive a different color, different from the first, second, third and/or fourth colors in reflection and transmission modes when viewing the banknote 90a along the viewing direction. For example, upon folding the banknote 90a over itself so that the two windows 91a and 92a are at least partially aligned with respect to one another, the person will perceive a reflected color that is a combination of the effects of the reflectivity or reflectance spectrums of the two windows 91a and 92a and a transmitted color that is a combination of the effects of the transmission spectrums of the two windows 91a and 92a. Additionally, the person can perceive color shift of the various colors seen in the reflection and transmission modes as the viewing angle changes. The amount of color shift may be different from the different windows as well as for the combination of the two windows.

Figure 11B:
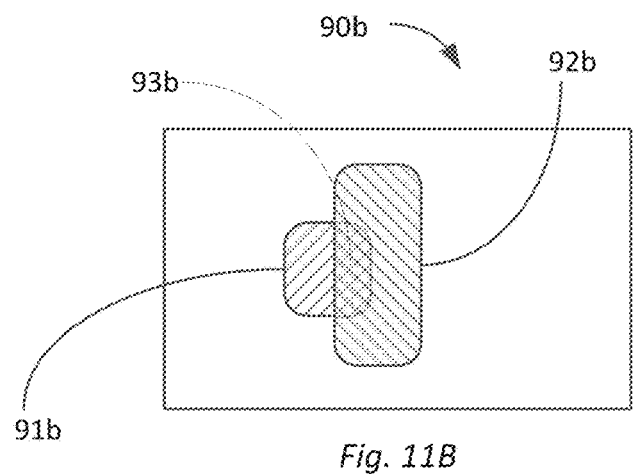
FIG. 11B shows a security device with two at least partially overlapping windows, each window comprising a different optical structure.

FIG. 11B depicts an implementation of a security device 90b (e.g., a banknote) comprising two windows 91b and 92b (a first and a second) inserted into or attached to the surface of the security device 90b. The two windows 91b and 92b at least partially overlap in the overlapping region 93b. The two windows 91b and 92b are transparent and comprise the optical structure 10, 70a or 70b. The configuration (e.g., thickness or other design parameters) of the optical structures 10, 70a or 70b in the respective windows 91a and 91b can be such that the reflection and/or transmission spectra of the optical structure 10, 70a or 70b of the window 91b is different from the reflection and/or transmission spectra of the optical structure 10 of the window 92b.

Thus, a person viewing the security device 90b along a viewing direction (e.g., normal to the surface of the security device 90b) will perceive (i) a first reflected color when viewing the portion of the window 91b that does not overlap with the window 92b, (ii) a second reflected color different from the first color when viewing the portion of the window 92b that does not overlap with the window 91b; and (iii) a third second reflected color that is a combination of the effects of the reflectivity or reflectance spectrums of the two windows 91b and 92b when viewing the overlapping region 93b.

A person viewing the security device 90b along a viewing direction (e.g., normal to the surface of the security device 90b) will perceive (i) a fourth transmitted color different from the first color when viewing through the portion of the window 91b that does not overlap with the window 92b, (ii) a fifth transmitted color different from the second and the fourth color when viewing through the portion of the window 92b that does not overlap with the window 91b; and (iii) a sixth transmitted color that is a combination of the effects of the transmission spectrums of the two windows 91b and 92b when viewing through the overlapping region 93b.

Additionally, in various embodiments, a person viewing the security device 90b can perceive color shift of the various colors seen in the reflection and transmission modes as the viewing angle changes. The amount of color shift may be different from the different windows.

Although, the two windows 91b and 92b are shown as partially overlapping in FIG. 11B, the two windows 91b and 92b can be completely overlapping. Various implementations of the security device 90b can comprise two or more different pigments. The two or more different pigments can comprise optical structures 10. A respective optical structure of one of the two or more different pigments can have reflectance and transmittance characteristics that are different from the respective optical structure of another of the two or more different pigments. The two or more different pigments can partially or completely overlap with each other. As discussed above, the color perceived by a person viewing an overlapping region of the two or more different pigments can depend on a combination of the effects of the reflection/transmission spectra of the different optical structures of the two or more different pigments. Some implementations of the security device 90b can comprise two or more at least partially overlapping foils, films, threads or laminates comprising different optical structures. The color perceived by a person viewing an overlapping region of the two or more at least partially overlapping foils, films, threads or laminates can depend on a combination of the effects of the reflection/transmission spectra of the different optical structures of the two or more foils, films, threads or laminates.

Figure 12:
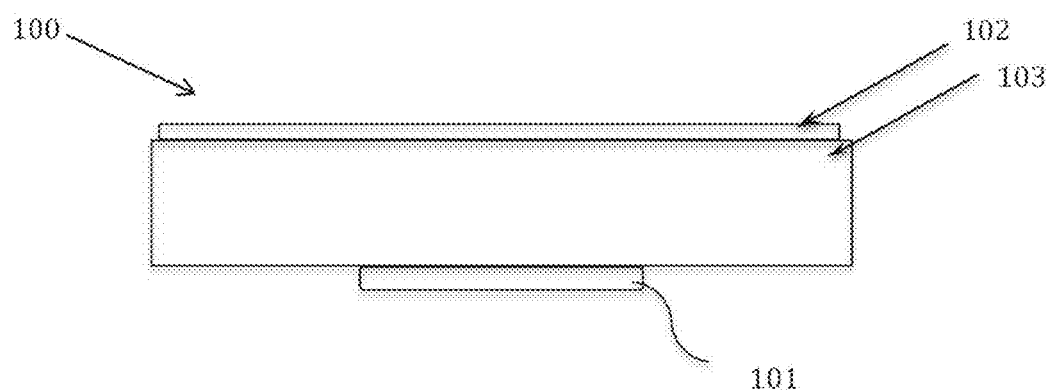
FIGS. 12 and 13 illustrate examples of a security device comprising an optical structure disposed under or over a text, symbol or number. The text, symbol or number becomes visible when the viewing angle is changed.

FIG. 12 illustrates a side view of an object 100 with a security device comprising a main body 103 of the object and a layer 102 comprising the optical structure 10, 70a or 70b. The object can be a banknote. The main body may comprise paper comprising the banknote. The layer 102 can be a laminate, a thread, or a label. When the layer 102 is configured as a label, an adhesive (e.g., a varnish) can be applied to the main body 103 and the layer 102 can be adhered to the adhesive of the main body 103 using a polymeric adhesive. Alternatively, the adhesive can be applied to the layer 102 before being affixed to the main body 103. When the layer 102 is configured as a laminate, the layer 102 can be adhered to the main body 103 using a polymer.

The layer 102 can be adhered to the main body 103 using adhesives, such as, for example optical clear adhesive and/or a cross-linking thermoset adhesive. The security device 100 further comprises a layer 101 comprising a message that is composed using a text, a symbol, a number or any combination thereof that is disposed on the side of the main body (e.g., paper/fabric) 103 of the object (e.g., banknote) opposite the side on which the layer 102 as shown in FIG. 12. Alternately, the layer 101 can be disposed between the main body (e.g., paper/fabric) 103 and the layer 102 or over the layer 102. The layer 101 can comprise, for example, a dye, a pigment or a phosphorescent material that has the same color characteristics as the color reflected or transmitted by the optical structure 10 when viewed along a direction normal to the surface of the layer 102. Accordingly, the message is not visible to an observer (or hidden) when the security device 100 is viewed along a direction normal to the surface of the layer 102. However, when the security device 100 is tilted such that viewing angle changes, the color reflected by and/or transmitted through the optical structure 10 changes such that the message become visible to the observer. In certain cases, the layer 101 comprising a message printed with a phosphorescent material can be made visible when illuminated by UV. The resultant color of the phosphorescent material can be the combined color of the fluorescence and the dichroic color.

Figure 13:
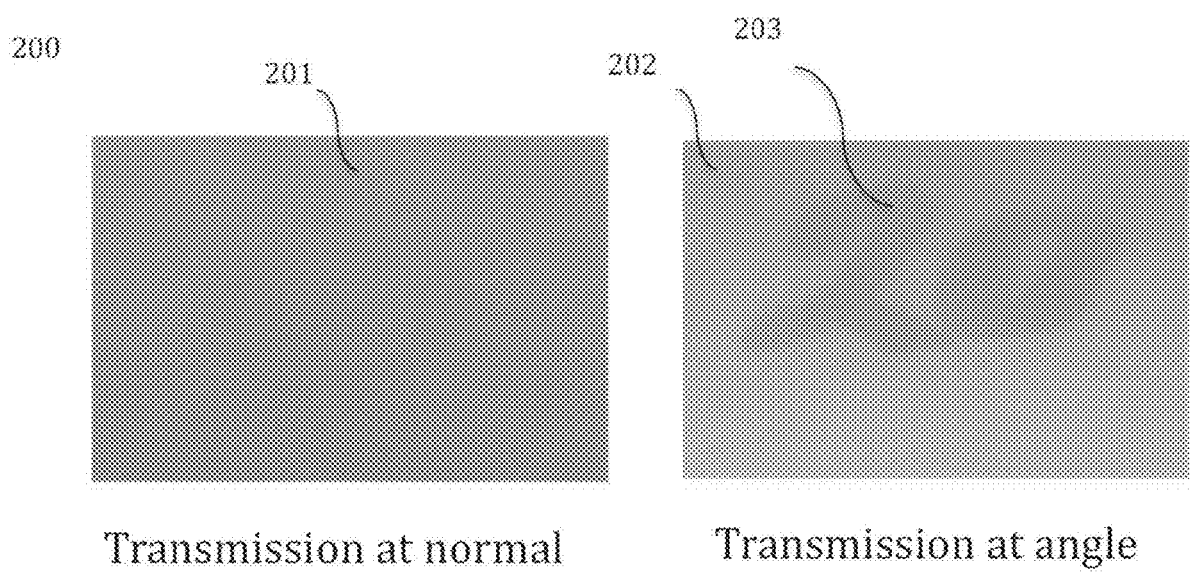

FIG. 13 shows the effect of changing the viewing angle in transmission of the security device 100 from 0 to about 45 degrees. When the viewing angle is 0 degrees, the message comprising a combination of a number, text or a symbol is not visible in the transmission mode because the color of the text is the same as the color of the optical structure in transmission mode (e.g., orange). However, as the viewing angle increases, the color of the optical structure in transmission mode shifts. For example, the message 203 becomes visible as the color of the optical structure in transmission mode shifts from orange to yellow as the angle of observation increases. The color of the message has sufficient contrast with respect to the transmitted color of the optical structure 10 so as to be visible to the observer.

In other embodiments, the security device 100 can be configured to operate in reverse to that described above such that for example the message is visible at normal incidence and not visible when the security device is tilted. Other variations are possible.

As describe above, the optical structures 10, 70a or 70b may be used in different forms, such as a laminate, a foil, a film, a hot stamp, a thread, pigment, ink, or paint. In some implementations, a laminate, a foil, a film, or a thread can comprise a pigment, ink or paint comprising the optical structures 10, 70a or 70b. A laminate may be adhered to a document, product or package using adhesive. A thread may be threaded or woven through an opening, for example, in the document. A foil can be hot stamped on the document, product or package. Pigment, ink, or paint may be deposited on the document, product or package or the material (e.g., paper, cardboard, or fabric) used to form the document, product, or package. For example, the document, product, or package may be exposed to (e.g., contacted with) the pigment, ink, or paint to color the document, product or packages in process similar to those used for non-color shifting pigments, dyes, paints and inks.

A plurality of optical structures 10, 70a or 70b such as described herein collected together as a pigment (as well as inks, and paints) can have similar optical characteristics as the optical structure 10, 70a or 70b configured as a film/laminate. As described above, optical structures 10, 70a or 70b collected together to form a pigments can exhibit as a collection of platelets or separate pieces the same optical characteristics as the bulk optical film from which the platelets were made. An added advantage of the optical structures 10, 70a or 70b configured as a pigment is that color can be blended according to desired specification. The color of the optical structure 10 can be designed by using computer software to calculate the thickness of the various layers of the optical structure 10, 70a or 70b that would provide a desired reflection and/or transmission characteristics. Optical structures 10, 70a or 70b that can provide specific colors can be designed using the computer software and then fabricated. Additionally, different color shifting optical structures 10, 70a or 70b that produce different colors can be included together and/or color shifting optical structures such as described herein can be combined with non-color shifting pigments or dyes to produce different colors.

The optical structure 10, 70a or 70b can be fabricated using a variety of methods including but not limited to vacuum deposition, coating methods, etc. One method of fabrication of the optical structures 10 described herein uses a vacuum coater that employs batch or roll coating. In one method of fabricating the optical structure 10, a first transparent high index layer (e.g., layer 12 or layer 16 of FIG. 1) is deposited onto carrier or base layer such as a sheet or web or other substrate. The carrier, web, base layer or substrate can comprise materials such as, for example, polyester or a polyester with release characteristics such that the optical structure can be readily separated from the web or base layer. A release layer between the base layer and the plurality of other optical layers the form the optical structure may be used to permit separation of the optical layers comprising the optical structure from the base layer or web. A first metal layer (e.g., layer 13 or layer 15), a transparent dielectric layer comprising high or low refractive index material (e.g., layer 14), a second metal layer (e.g., layer 15 or layer 13), and a second transparent high index layer (e.g., layer 16 or layer 12) is deposited over the first transparent high index layer in sequence (e.g., layer 12 or layer 16 of FIG. 1). The various layers can be deposited in sequence in some embodiments. However, in other embodiments, one or more intervening layers can be disposed between any of the first metal layer, the transparent dielectric layer comprising high or low refractive index material, the second metal layer, and the second transparent high index layer. As examples, in some cases the transparent high index layers and the dielectric layer can be deposited using electron gun while the first and the second metal layers can be deposited by using electron gun or sputtering.

Some materials, like ZnS or MgF$_2$, can be evaporated from a resistance source. In instances wherein the transparent dielectric layer comprising high or low refractive index material comprises a polymer, a process known as PML (Polymer Multi-Layer) as described in U.S. Pat. No. 5,877,895 can be used. The disclosure of U.S. Pat. No. 5,877,895 is incorporated by reference herein in its entirety.

Optical Structures Comprising Dielectric Layers Surrounded by Metal Layers

Figure 14A:
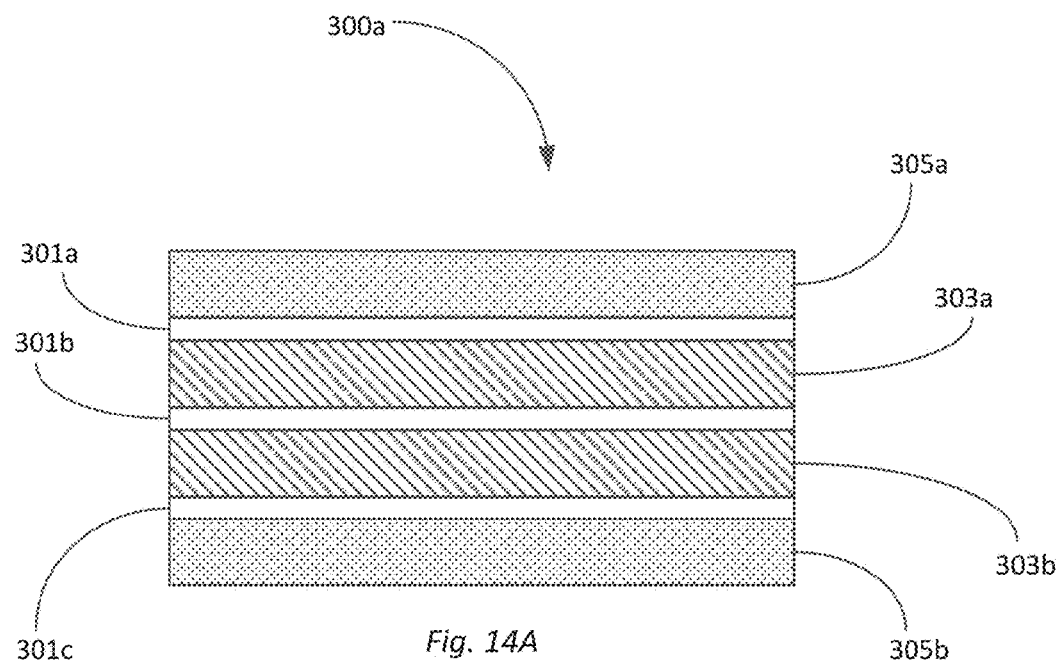
FIG. 14A schematically illustrates a side view of an implementation of an optical structure comprising a stack of layers that can be used as a security feature.

FIG. 14A schematically illustrates an implementation of an optical structure 300a comprising a stack of layers that can be used as a security feature. The optical structure 300a comprises at least two dielectric layers 303a and 303b and at least three metal layers 301a, 301b, and 301c. In various implementations, the at least three metal layers 301a, 301b, and 301c can comprise a material selected from a group consisting of silver (Ag), silver alloys, gold (Au), and gold alloys. In some implementations, the at least three metal layers 301a, 301b, and 301c can comprise palladium (Pd). For example, the at least three metal layers 301a, 301b, and 301c can comprise silver alloys with palladium. The amount of palladium in some such implementations can be less than or equal to about 10% by weight.

In various implementations, different metal layers (e.g. metal layers 301a, 301b, and 301c) can have a thickness in a range between about 3 nm and about 120 nm. For example, the thickness of the different metal layers (e.g. metal layers 301a, 301b, and 301c) can be greater than or equal to about 3 nm and less than or equal to about 20 nm, greater than or equal to about 7.5 nm and less than or equal to about 25 nm, greater than or equal to about 10 nm and less than or equal to about 27.5 nm, greater than or equal to about 12.5 nm and less than or equal to about 30 nm, greater than or equal to about 15 nm and less than or equal to about 35 nm, greater than or equal to about 17.5 nm and less than or equal to about 37.5 nm, greater than or equal to about 20 nm and less than or equal to about 40 nm, greater than or equal to about 25 nm and less than or equal to about 50 nm, greater than or equal to about 30 nm and less than or equal to about 60 nm, greater than or equal to about 35 nm and less than or equal to about 55 nm, greater than or equal to about 45 nm and less than or equal to about 75 nm, greater than or equal to about 60 nm and less than or equal to about 80 nm, greater than or equal to about 75 nm and less than or equal to about 100 nm, greater than or equal to about 90 nm and less than about 120 nm, or any thickness in a range/sub-range defined by any of these values.

In various implementations, the different metal layers 301a, 301b and 301c can have the same thickness. However, in some implementations, the different metal layers 301a, 301b and 301c can have different thickness. In some implementations, two of the three metal layers 301a, 301b and 301c have different thicknesses while in others all three metal layers have different thicknesses. In some implementations, the metal layer 301b can have a thickness greater than the thickness of the metal layer 301a and/or metal layer 301c. For example, the thickness of the metal layer 301b can be in a range between about 1.1 times and about 2 times the thickness of the metal layer 301a and/or the metal layer 301c.

In various implementations, one or more of the metal layers 301a, 301b and 301c can be configured as a continuous layer. However, in some implementations, one or more of the metal layers 301a, 301b and 301c can be discontinuous. Accordingly, any of the metal layers 301a, 301b and 301c can comprise separate regions comprising the metallic material separated by regions comprising a non-metallic material. For example, any of the metal layers 301a, 301b and 301c can comprise one or more islands comprising the metallic material spaced apart by regions comprising dielectric material such as the dielectric material of one or both of the layers 303a and 303b. In various implementations, one or more of the metal layers 301a, 301b and 301c need not be a continuous layer or film. Instead, any of the metal layers 301a, 301b and 301c can be configured in the form of spheres or half-domes. In some implementations, one or more of the metal layers 301a, 301b and 301c configured in the form of spheres or half-domes can coalesce into a continuous film during or following the fabrication process.

In various implementations, the different metal layers 301a, 301b, and 301c can have a ratio of the real part (n) of the refractive index of the different metal layers 301a, 301b, and 301c to the imaginary part (k) of the refractive index that is greater than or equal to about 0.01 and less than or equal to about 0.2. For example, the different metal layers 301a, 301b, and 301c can comprise metals that have an n/k value between about 0.01 and about 0.2, between about 0.015 and about 0.2, between about 0.01 and about 0.15, between about 0.01 and about 0.1, between about 0.1 and about 0.2, or any value in a range or sub-range defined by any these values. As another example, the different metal layers 301a, 301b, and 301c can comprise metals that have an n/k value of about 0.0166. As yet another example, the different metal layers 301a, 301b, and 301c can comprise metals that have an n/k value of about 0.158.

The different dielectric layers 303a and 303b can have a thickness between about 40 nm and about 850 nm. For example, the different dielectric layers 303a and 303b can have a thickness greater than or equal to about 50 nm and less than or equal to about 800 nm, greater than or equal to about 75 nm and less than or equal to about 750 nm, greater than or equal to about 100 nm and less than or equal to about 700 nm, greater than or equal to about 150 nm and less than or equal to about 650 nm, greater than or equal to about 200 nm and less than or equal to about 600 nm, greater than or equal to about 250 nm and less than or equal to about 550 nm, greater than or equal to about 300 nm and less than or equal to about 500 nm, greater than or equal to about 350 nm and less than or equal to about 450 nm, or a thickness having a value in any range/sub-range defined by any of these values.

In various implementations, the different dielectric layers 303a and 303b can have the same thickness. However, in some implementations, the different dielectric layers 303a and 303b can have different thickness. For example, the thickness of one of the dielectric layers 303a or 303b can be in a range between about 1.5 times-10 times the thickness of another one of the dielectric layers 303a or 303b.

The different dielectric layers 303a and 303b can have a refractive index between about 1.38 and about 2.4. For example, the refractive index of the different dielectric layers 303a and 303b can be greater than or equal to about 1.38 and less than or equal to about 2.4, greater than or equal to about 1.5 and less than or equal to about 2.3, greater than or equal to about 1.6 and less than or equal to about 2.2, greater than or equal to about 1.7 and less than or equal to about 2.1, greater than or equal to about 1.8 and less than or equal to about 2.1, greater than or equal to about 1.9 and less than or equal to about 2.0, or any values in a range/sub-range defined by any of these values.

The imaginary part (k) of the refractive index of the different dielectric layers 303a and 303b can be sufficiently low such that the different dielectric layers 303a and 303b are substantially transparent to light in the visible spectral range. For example the imaginary part (k) of the refractive index of the different dielectric layers 303a and 303b can be equal to zero (0) or be close to zero (0). In various implementations, the imaginary part (k) of the refractive index of the different dielectric layers 303a and 303b can be sufficiently low such that very little of the incident visible light is absorbed by the different dielectric layers 303a and 303b. For example, in various implementations the composition and the thickness of the different dielectric layers 303a and 303b can be configured such that less than about 5% of the incident visible light is absorbed by the different dielectric layers 303a and 303b. In various implementations, the different dielectric layers can comprise a material that is water white.

In some implementations, the dielectric layers 303a and 303b can comprise materials including but not limited to silicon dioxide ($SiO_2$), magnesium fluoride ($MgF_2$), zirconium dioxide ($ZrO_2$), ceric oxide ($CeO_2$), titanium dioxide ($TiO_2$), tantalum pentoxide ($Ta_2O_5$), yttrium oxide ($Y_2O_3$), indium oxide ($In_2O_3$), tin oxide ($SnO_2$), indium tin oxide (ITO), aluminum oxide ($Al_2O_3$), or tungsten trioxide ($WO_3$), organic polymer layers or combinations thereof.

Various implementations of the optical structure 300a can comprise optional passivation layers (or protective layers or "flash" layers) 305a and 305b disposed on a side of the metal layers 301a and 301c that is opposite to the side facing the dielectric layers 303a and 303b. Metal surfaces can oxidize and/or corrode, which may affect optical performance. As an example, when exposed silver oxidizes and corrodes, silver sulfide can form and compromise optical performance. Finely divided metal particles, particulates, or pieces may also spontaneously combust under the right conditions. For example, fires may occur in a coating machine when the machine is brought up to atmosphere. Explosions can also occur during the milling process, e.g., when milling is performed in air, using a cyclone type classifier. The passivation layers 305a and 305b can provide protective layers to enhance durability, potentially reduce or prevent oxidation and/or corrosion of the metal layers 301a and 301b, and allow possibly for safer processing.

Various embodiments of the optical structure 300a can be configured as platelets that are suspended in an ink medium to form a pigment. In some such embodiments, the passivation layers 305a and 305b can comprise a material having a refractive index that is matched (e.g., substantially equal or equal) to the refractive index of the ink medium. By choosing the material of the passivation layers 305a and 305b to have a refractive index that is matched (e.g., substantially equal or equal) to the refractive index of the ink medium, the passivation layers 305a and 305b can be configured to reduce or prevent oxidation or corrosion of the metal layers 301a and 301b without affecting or substantially affecting the overall optical properties of the optical structure 300a. For example, silicon dioxide can be used to closely or substantially optically match the ink medium (e.g., a medium comprising resin).

Various implementations of the optical structure 300a can be configured as films, foils, threads, laminates, hot stamps, window patches, labels, etc. In some instances, the passivation layers 305a and 305b can comprise a material having a high refractive index (e.g., greater than or equal to about 1.65). In some implementations, zinc sulfide can be used outside of a non-shifting optical stack with negligible effect on the optical performance in either reflection or transmission.

The passivation layers 305a and 305b can have a thickness in a range from about 2 nm to about 500 nm. For example, the thickness of the passivation layers 305a and 305b can be greater than or equal to about 2 nm and less than or equal to about 10 nm, greater than or equal to about 2 nm and less than or equal to about 20 nm, greater than or equal to about 5 nm and less than or equal to about 10 nm, greater than or equal to about 5 nm and less than or equal to about 20 nm, greater than or equal to about 10 nm and less than or equal to about 20 nm, greater than or equal to about 20 nm and less than or equal to about 40 nm, greater than or equal to about 30 nm and less than or equal to about 50 nm, greater than or equal to about 40 nm and less than or equal to about 60 nm, greater than or equal to about 50 nm and less than or equal to about 70 nm, greater than or equal to about 60 nm and less than or equal to about 80 nm, greater than or equal to about 70 nm and less than or equal to about 90 nm, greater than or equal to about 80 nm and less than or equal to about 100 nm, greater than or equal to about 90 nm and less than or equal to about 110 nm, greater than or equal to about 100 nm and less than or equal to about 150 nm. greater than or equal to about 125 nm and less than or equal to about 175 nm, greater than or equal to about 150 nm and less than or equal to about 200 nm, greater than or equal to about 175 nm and less than or equal to about 225 nm, greater than or equal to about 200 nm and less than or equal to about 250 nm, greater than or equal to about 225 nm and less than or equal to about 275 nm, greater than or equal to about 300 nm and less than or equal to about 350 nm, greater than or equal to about 325 nm and less than or equal to about 375 nm, greater than or equal to about 350 nm and less than or equal to about 400 nm, greater than or equal to about 400 nm and less than or equal to about 450 nm, greater than or equal to about 450 nm and less than or equal to about 500 nm, or any thickness in any range/sub-range defined by any of these values.

In some instances, the passivation layers 305a and 305b can comprise a material having a refractive index between about 1.45 and about 1.6. For example, the passivation layers 305a and 305b can comprise a material having a refractive index greater than or equal to about 1.45 and less than or equal to about 1.55, greater than or equal to about 1.48 and less than or equal to about 1.57, greater than or equal to about 1.5 and less than or equal to about 1.58, greater than or equal to about 1.53 and less than or equal to about 1.6, or any value in any range/sub-range defined by any of these values. In various implementations, the passivation layers 305a and 305b can comprise silicon dioxide, a transparent dielectric material or a ultraviolet (UV) curable polymer.

In some instances, the passivation layers 305a and 305b can comprise a material having an refractive index greater than or equal to about 1.65. In various implementations, the passivation layers 305a and 305b can comprise $ZrO_2$, $TiO_2$, ZnS, ITO (indium tin oxide), $CeO_2$ or $Ta_2O_3$.

Many implementations of the optical structure 300a may comprise no more than three metal layers 301a, 301b, and 301c and no more than two dielectric layers 303a and 303b. For example, various implementations of the optical structure 300a may comprise exactly three metal layers 301a, 301b, and 301c and exactly two dielectric layers 303a and 303b. Some such implementations of the optical structure 300a can have a thickness that is less than or equal to about 2.5 microns.

Fabricating the optical structure 300a can include providing a first layer 303a comprising dielectric material and depositing a layer of metal 301b on one side of the first dielectric layer 303a. A second layer 303b comprising dielectric material can be disposed over the metal layer 301b. A layer of metal 301a can be further disposed over the side of the first dielectric layer 303a that is opposite the side of the metal layer 301b. A layer of metal 301c can be further disposed over the side of the second dielectric layer 303b that is opposite the side of the metal layer 301b. The metal layers 301a, 301b, and 301c can be deposited as a continuous thin film, as small spheres, metallic clusters or island like structures. The first dielectric layer 303a can be disposed and/or formed over a support. The support is also referred to herein as a base layer. The support can comprise a carrier. The support can comprise a sheet such as a web. The support can comprise a substrate. The substrate can be a continuous sheet of PET, acrylate, or other polymeric web structure. The support can comprise a non-woven fabric. Non-woven fabrics can be flat, porous sheets comprising fibers. In some implementations, the non-woven fabric can be configured as a sheet or a web structure that is bonded together by entangling fiber or filaments mechanically, thermally, or chemically. In some implementations, the non-woven fabric can comprise perforated films. In some implementations, the non-woven fabric can comprise synthetic fibers such as polypropylene or polyester or fiber glass.

The support can be coated with a release layer comprising a release agent. The release agent can be soluble in solvent or water. The release layer can be polyvinyl alcohol, which is water soluble or an acrylate which is soluble in a solvent. The release layer can comprise a coating, such as, for example, salt (NaCl) or cryolite ($Na_3AlF_6$) deposited by evaporation before the layers of the optical structure are deposited/formed.

In some implementations using a support configured as a non-woven fabric, the non-woven fabric can be coated with a release layer. Such implementations can be dipped or immersed in a solvent or water that acts as a release agent to dissolve or remove the release layer. The release agent (e.g., the solvent or water) is configured to penetrate from a side of the non-woven fabric opposite the side on which the optical structure is disposed to facilitate release of the optical structure instead of having to penetrate through the optical structure.

One method of fabricating the optical structure 300a shown in FIG. 14A utilizes a vacuum roll coater. In this method, the optical structure 300a is fabricated by depositing the metallic and dielectric materials of the various layers on a web using vacuum deposition methods, such as, for example, electron beam (e-beam) deposition, sputtering and/or resistive heating. The web can comprise a polymeric material, such as for example polyethylene terephthalate (PET) or acrylate. If the optical structure is configured to be used as a foil or a film, then the various layers of the optical structure 300a can be deposited directly on a surface of the web. However, in other implementations, a release coating can be applied to the surface of the web prior to the vacuum deposition of the various layers. For example, if the optical structure 300a is configured to be used as a pigment, then the optical structure can be applied on the release coating. In some implementations, the various layers of the optical stack 300a can be deposited in series. For example, in certain implementations, the metal layer 301c can be deposited first followed by the dielectric layer 303b, followed by the metal layer 301b, followed by the dielectric layer 303a, followed by the metal layer 301a. In various implementations of the optical structure can include the passivation layers 305a and 305b, for example, the passivation layer 305b can be deposited prior to the deposition metal layer 301c and the passivation layer 305a can be deposited over the metal layer 301a.

In some implementations, the optical structure 300a fabricated using the vacuum roll coater can be released from the web by immersing the web comprising the release layer and the deposited optical structure in a bath of a solvent comprising salt (NaCl) or cryolite ($Na_3AlF_6$) to remove or dissolve the release layer and release the optical structure 300a. In some cases, the optical structure 300a can break or shatter in pieces having various shapes and sizes when released from the web. The solvent can be removed and the various pieces of the optical structure 300a can be dried and subsequently milled to form platelets having desired size and thickness for use as a pigment (e.g., in Intaglio ink).

Figure 14B:
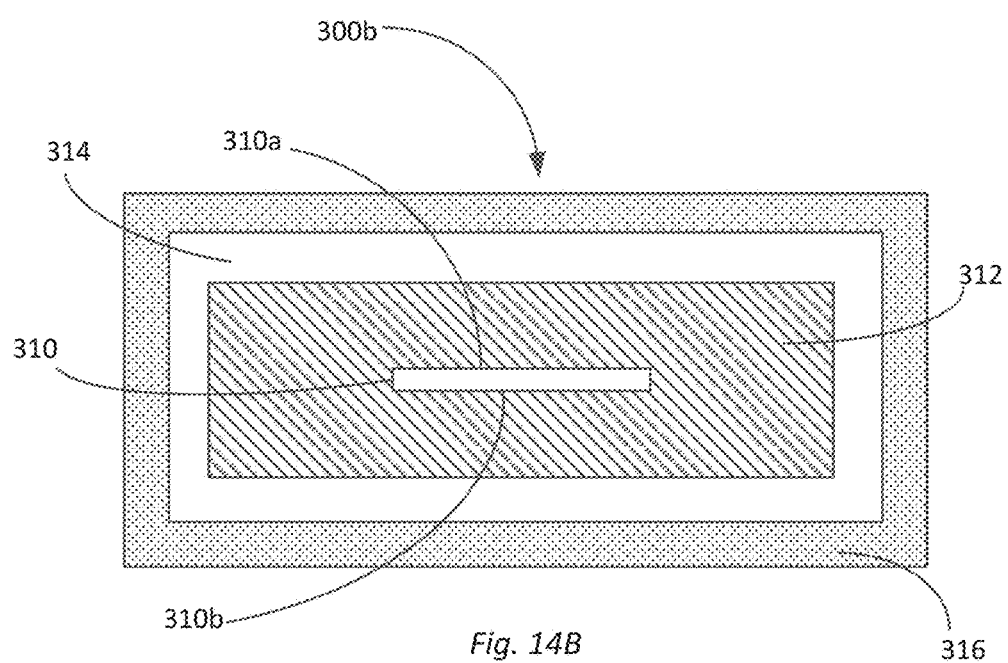
FIG. 14B illustrates a cross-sectional view of an implementation of an optical structure including a first region comprising a first metallic material which is surrounded by a second region comprising a dielectric material which in turn is surrounded by a third region comprising a second metallic material.

FIG. 14B illustrates a cross-sectional view of an implementation of an optical structure 300b including a first region 310 comprising a first metallic material which is surrounded by a second region 312 comprising a dielectric material. The second region 312 comprising the dielectric material can be surrounded by a third region 314 comprising a second metallic material. The third region 314 can be optionally surrounded by a fourth region 316 comprising a dielectric material having a refractive index between about 1.45 and about 1.6 configured as a passivation region to reduce or prevent oxidation of the second metallic material. Such a structure can be considered to have three metal layers, two dielectric layers and two optional passivation layers as noted from the cross-sectional view shown in FIG. 14B. The optical structure 300b can be fabricated by providing a substrate comprising the first metallic material and disposing the dielectric material on the exposed surfaces of the substrate using physical and/or chemical deposition methods. The exposed surfaces of the dielectric material can be covered by the second metallic material using physical and/or chemical deposition methods. For example, the optical structure 300b can be fabricated using various methods described in U.S. Pat. No. 6,524,381 which is incorporated herein by reference in its entirety.

The chemical composition and various physical characteristics (e.g., thickness) of the first region 310 can be similar to the chemical composition and various physical characteristics (e.g., thickness) of the metal layer 301b discussed above. The chemical composition and various physical characteristics (e.g., thickness) of the second region 312 can be similar to the chemical composition and various physical characteristics (e.g., thickness) of the dielectric layers 303a and 303b discussed above. The chemical composition and various physical characteristics (e.g., thickness) of the third region 314 can be similar to the chemical composition and various physical characteristics (e.g., thickness) of the metal layers 301a and 301c discussed above. The chemical composition and various physical characteristics (e.g., thickness) of the fourth region 316 can be similar to the chemical composition and various physical characteristics (e.g., thickness) of the passivation layers 305a and 305b discussed above.

Accordingly, in various implementations, the first region 310 can comprise silver, silver alloys, gold and/or gold alloys. The thickness of the first region 310 can be between about 3 nm and about 100 nm. The second region 312 can comprise materials including but not limited to silicon dioxide ($SiO_2$), magnesium fluoride ($MgF_2$), zirconium dioxide ($ZrO_2$), ceric oxide ($CeO_2$), titanium dioxide ($TiO_2$), tantalum pentoxide ($Ta_2O_5$), yttrium oxide ($Y_2O_3$), indium oxide ($In_2O_3$), tin oxide ($SnO_2$), indium tin oxide (ITO), aluminum oxide ($Al_2O_3$), or tungsten trioxide ($WO_3$), or organic polymer layers. or combinations thereof. The second region 312 can extend to a height between about 50 nm and 800 nm from an outermost surface of the first region 310. The third region 314 can comprise silver, silver alloys, gold and/or gold alloys and extend to a height between about 3 nm and about 100 nm from an outermost surface of the first region 310. The fourth region 316 can comprise a dielectric material having a refractive index between about 1.45 and about 1.6 and extend to a height between about 10 nm and about 100 nm from an outermost surface of the third region 314.

In various implementations, the first region 310 can be configured as a slab, flake, a sphere, spheroid, ellipsoid, disc, or any other 3-dimensional shape enclosing a volume. The first region 310 may have a regular or irregular shape. For example, as shown in FIG. 14B, the first region 310 can be configured as a slab (e.g., a slab having nanometer scale thickness and micrometer scale lateral dimensions) having two major surfaces and one or more edge surfaces disposed between the two major surfaces. In some implementations, a number of edge surfaces may be disposed between the two major surfaces of the slab. The number of edge surfaces may, for example, be one, two, three, four, five, six, seven, eight, nine, ten, twelve, twenty, thirty, fifty, etc. or in any range between any of these values. Values outside these ranges are also possible. The major surfaces of the slab can have a variety of shapes. For example, one or both of the major surfaces 310a and 310b can have a rectilinear or curvilinear shape in certain implementations. The shape may be regular or irregular in certain implementations. For example, one or both of the major surfaces can have a square shape, a rectangular shape, a circular shape, an oval shape, an elliptical shape, pentagonal shape, a hexagonal shape, an octagonal shape or any polygonal shape. In various implementations, one or both of the major surface can have jagged edges such that the lateral dimensions (e.g., length or width) of the one or both of the major surface varies across the area of the one or both of the major surface. Other configurations are also possible. Additionally, other shapes are also possible. One or more of the edge surfaces can have a variety of shapes (e.g., as viewed from the side), such as, for example, a square shape, a rectangular shape, an oval shape, an elliptical shape, a pentagonal shape, a hexagonal shape, an octagonal shape or any a polygonal shape.

The shape of the one or more of the edge surfaces (e.g., as viewed from the side) can be rectilinear or curvilinear in certain implementations. The shape may be regular or irregular in certain implementations. Similarly, the cross-section through the first region 310 parallel to one of the major surfaces, can be rectilinear or curvilinear in certain implementations and can be regular or irregular in certain implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. Likewise, the cross-section through the first region 310 perpendicular to one of the major surfaces, can be rectilinear or curvilinear in certain implementations and can be regular or irregular implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. In various implementations, an area, a length and/or a width of the major surfaces of the first region 310 can be greater than or equal to about 2, 3, 4, 5, 6, 8, or 10 times the thickness of the first region 310 and less than or equal to about 50 times the thickness of the first region 310, or any value in a range/sub-range between any of these values. Accordingly, the first region 310 can have a large aspect ratio. Other sizes and shapes, however, are possible.

The optical structure 300a and 300b can be configured as a film or a foil by disposing over a substrate or other support layer having a thickness, for example, greater than or equal to about 10 microns and less than or equal to about 25 microns. For example, a substrate or support layer can have a thickness greater than or equal to 12 microns and less than or equal to 22.5 microns, greater than or equal to 15 microns and less than or equal to about 20 microns. The substrate or support layer can comprise materials, such as, for example, polyethylene terephthalate (PET), acrylate, polyester, polyethylene, polypropylene, or polycarbonate. The support or support layer itself can be dissolvable. The support or support layer, for example, can also comprise polyvinyl alcohol, which can be dissolved, for example, in water. Accordingly, instead of using a release layer on a insoluble support web, the support web itself may comprise soluble material. Accordingly, the support or support layer can be dissolved leaving the optical coating remaining. The optical structure 300a configured as a film or a foil can be encapsulated with a polymer, such as, for example a UV cured polymer.

Instead of a film or a foil, the optical structure 300a or 300b can be divided into platelets having a size that is suitable for a pigment or printing ink. Platelets having a size that is suitable for a pigment or printing ink can have an length, and/or width that is about 5-10 times, 10-20 times or 30-40 times the thickness of the platelet, in some implementations. Accordingly, the platelets can have a thickness of about 1 micron, and/or can have a width and/or a length that is between approximately 5 micron and about 50 microns. For example, the width and/or a length can be greater than or equal to about 5 micron and less than or equal to about 15 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. Platelets having a length and/or width that is less than about 5-10 times the thickness of the platelet, such as, for example having a length and/or width that is equal to the thickness of the platelet can be oriented along their edges in the printing ink or pigment. This can be disadvantageous in some implementations since pigment or printing ink comprising platelets that are oriented along their edges may not exhibit the desired colors in reflection and transmission modes. Dimensions such as, thicknesses, lengths and/or widths outside these ranges, however, are also possible.

In some implementations, the optical structure 300a or 300b can be fractured, cut, diced or otherwise separated to obtain the separate, for example, pieces or platelets. These pieces or platelets can have micron scale sizes in certain embodiments. In some implementations, the obtained platelets may be surrounded by an encapsulating layer similar to the encapsulating layer 21 discussed above. For example, the optical structures 300a and 300b including the passivation layers 305a and 305b can further comprise an encapsulating layer similar to the encapsulating layer 21 discussed above. In some implementations, the encapsulating layer can comprise a moisture resistant material, such as, for example silicon dioxide. The encapsulating layer can also comprise silica spheres similar to silica spheres 22 and 23 discussed above. The encapsulating layer can additionally and/or alternatively reduce the occurrence of delamination of the different layers of the optical structure 300a/300b. The optical structures 300a/300b with the surrounding encapsulating layer, which may potentially comprise the silica spheres, can be configured as platelets that are suitable for a pigment or printing ink. The silica spheres of the encapsulating layer can help prevent the platelets from adhering to one another. For example, in some cases, without the spheres the platelets may stick together. The silica spheres can also prevent or reduce the likelihood of the platelets sticking to the print rollers in the printing machine. One method of surrounding the optical structure 300a/300b with the encapsulating layer comprising silica spheres can rely on sol-gel technology using tetraethylorthosilicate (TEOS) discussed above. Other processes, however, may be employed.

The pigment can be formed by a plurality of optical structures 300a/300b configured as platelets. Such a pigment may be color shifting (e.g., the color reflected and/or transmitted changes with angle of view or angle of incidence of light), in some cases. In some embodiments, non-color shifting pigment or dye may be mixed with the pigment. In some embodiments other materials may be included with the plurality of optical structures 300a/300b configured as platelets to form the pigment. Although some of the resultant pigments discussed herein can provide color shift with change in viewing angle or angle of incidence of light, pigments that do not exhibit color shift with change in viewing angle or angle of incidence of light or that produce very little color shift with change in viewing angle or angle of incidence of light are also contemplated.

In some embodiments, the plurality of optical structures 300a/300b configured as platelets can be added to a medium such as a polymer (e.g., a polymeric resin) to form a dichroic ink, a pigment, or paint as discussed above with reference to FIG. 2B-1. In some implementations, the medium can be an organic resin. The refractive index of the medium can be in a range between about 1.4 and about 1.6 (e.g. 1.5). The medium can comprise an optical material that is substantially clear. The medium can be substantially transparent to visible light. The platelets can be suspended in the medium (e.g., polymer). The platelets can be randomly oriented in the medium (e.g., polymer) as discussed above with reference to FIG. 2B-1. During the printing process, in some cases, the individual platelets (e.g., the majority of the platelets) can be oriented parallel to the surface of the object (e.g., paper) to which the pigment, the paint, or the dichroic ink is being applied as a result of, for example, the printing action, gravity, and/or surface tension of the normal drying process of the pigment, the paint, or the dichroic ink as discussed above with reference to FIG. 2B-2. The medium can comprise material including but not limited to acrylic melamine, urethanes, polyesters, vinyl resins, acrylates, methacrylate, ABS resins, epoxies, styrenes and formulations based on alkyd resins and mixtures thereof. In some implementations, the passivation layer 305a and 305b, the encapsulating layer and/or the silica balls can have a refractive index that closely matches the refractive index of the medium, e.g., polymer, in which the optical structures 300a/300b configured as platelets are suspended such that the passivation layers 305a/305b, the encapsulating layer and/or the silica balls do not adversely affect the optical performance of the pigment, the paint, or the dichroic ink in the medium.

In various implementations, the optical structures 300a/300b configured as platelets need not be surrounded by an encapsulating layer. In such implementations, one or more platelets that are not encapsulated by an encapsulating layer can be added or mixed with an ink or a pigment medium (e.g., varnish, polymeric resin, etc.) to obtain a dichroic ink or pigment as discussed above. In various implementations, the dichroic ink or pigment can comprise a plurality of platelets. The optical structures 300a/300b that are configured as the plurality of platelets can have different distributions of shapes, sizes, thicknesses and/or aspect ratios. The optical structures 300a/300b that are configured as the plurality of platelets can also have different optical properties. For example, the optical structures 300a/300b that are configured as the plurality of platelets can also have different color properties.

In various implementations, a silane coupling agent can be bonded to the encapsulating layer of the optical structures 300a/300b as discussed above with reference to FIG. 3. As discussed above, bonding of the silane coupling agent to the encapsulating layer can occur through a hydrolyzing reaction. The silane coupling agent can bind to the polymer (e.g., polymeric resin) of the printing ink or paint medium so that the heterogeneous mixture of pigment and the polymer do not separate during the printing process and substantially function in much the same way as a homogeneous medium would function. The printing ink or paint medium can comprise material including but not limited to acrylic melamine, urethanes, polyesters, vinyl resins, acrylates, methacrylate, ABS resins, epoxies, styrenes and formulations based on alkyd resins and mixtures thereof. The silane coupling agents used can be similar to the silane coupling agents sold by Gelest Company (Morristown, Pa. USA). In some implementations, the silane coupling agent can comprise a hydrolyzable group, such as, for example, an alkoxy, an acyloxy, a halogen or an amine. Following a hydrolyzing reaction (e.g., hydrolysis), a reactive silanol group is formed, which can condense with other silanol groups, for example, with the silica spheres of the encapsulating layer or the encapsulating layer of silica to form siloxane linkages. The other end of the silane coupling agent comprises the R-group. The R-group can comprise various reactive compounds including but not limited to compounds with double bonds, isocyanate or amino acid moieties. Reaction of the double bond via free radical chemistry can form bonds with the ink polymer(s) such as those based on acrylates, methacrylates or polyesters based resins. For example, isocyanate functional silanes, alkanolamine functional silanes and aminosilanes can form urethane linkages.

Without any loss of generality, in various implementations of the optical structure 300a/300b configured as a platelet that do not comprise the encapsulating layer, the silane coupling agent can be bonded to one or both of the passivation layers 305a/305b comprising a dielectric material (e.g., $TiO_2$) suitable to be bonded with the silane coupling agent.

An ink comprising various implementations of the optical structure 300a/300b configured as platelets can be applied to a substrate (e.g., a polyester web) and dried. In some implementations, the substrate comprising the ink can be cut in strips to form a security thread having the optical characteristics of the various implementations of the optical structure 300a/300b. For example, depending on the thickness and composition of the various layers of the various implementations of the optical structure 300a/300b included in the ink, the ink can produce a color in transmission mode and a different color in reflection mode. As discussed above, in some implementations, the color in the transmission mode can be a complementary color of the color in the reflection mode. Additionally, in some implementations, the color in the transmission mode and the reflection mode can vary with viewing angle. The security thread can be integrated with products and/or packaging to improve security of the products and/or packaging. In some implementations, the substrate comprising the ink including various implementations of the optical structure 300a/300b can be configured as a laminate and adhered to a security document (e.g., a banknote). In some implementations, the ink comprising various implementations of the optical structure 300a/300b applied to a releasable carrier web can be configured as a hot stamp having the optical characteristics of the various implementations of the optical structure 300a/300b.

Without any loss of generality, the optical structure 300a/300b can be considered as an interference stack or cavity. Ambient light incident on the surface of the optical structure 300a/300b is partially reflected from the various layers of the optical structure 300a/300b and partially transmitted through the various layers of the optical structure 300a/300b. Some wavelengths of the ambient light reflected from the various layers may interfere constructively and some other wavelengths of the ambient light reflected from the various layers may interfere destructively. Similarly, some wavelengths of light transmitted through the various layers may interfere constructively and some other wavelengths of the ambient light transmitted through the various layers may interfere destructively. As a result of which, the optical structure 300a/300b appears colored when viewed in transmission and reflection mode. In general, the color and the intensity of light reflected by and transmitted through the optical structure 300a/300b can depend on the thickness and the material of the various layers of the optical structure 300a/300b. By changing the material and the thickness of the various layers, the color and intensity of light reflected by and transmitted through the optical structure 300a/300b can be varied.

Without subscribing to any particular scientific theory about the operation of the optical structures 300a/300b, in general, the material and the thickness of the various layers can be configured such that some or all of the ambient light reflected by the various layers interfere such that a node in the field occurs at one or more of the three metal layers 301a, 301b, and 301c for some of the wavelengths of the ambient light. For example, some or all of the ambient light reflected by the various layers interfere such that a node in the field occurs at all the three metal layers 301a, 301b, and 301c for some of the wavelengths of the ambient light. Again, without subscribing to a particular scientific theory, based on the thickness of the three metal layers 301a, 301b, and 301c and the dielectric layers 303a and 303b, a portion of the incident light may be transmitted through the optical structure 300a/300b as a result of the phenomenon of "induced transmittance" or "induced transmission". The reflection and transmission spectral characteristics are discussed below.

Figure 15A:
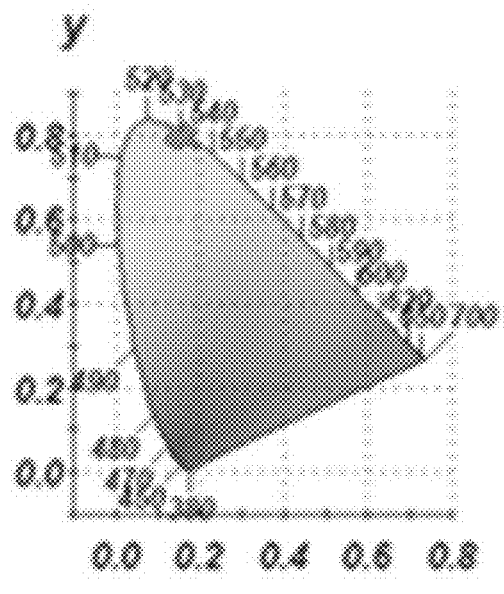
FIG. 15A is a CIE 1931 color space chromaticity diagram showing the x and y chromaticity coordinates of light transmitted through a first example of the optical structure shown in FIG. 14A or 14B for different viewing angles between 0 degrees and 40 degrees with respect to a normal to a surface of the optical structure.
Figure 15B:
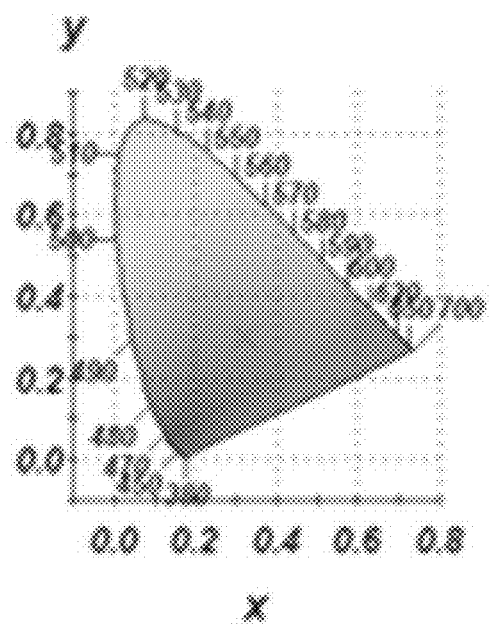
FIG. 15B is a CIE 1931 color space chromaticity diagram showing the x and y chromaticity coordinates of light reflected from the first example of the optical structure shown in FIG. 14A or 14B for different viewing angles between 0 degrees and 40 degrees with respect to a normal to a surface of the optical structure.

FIG. 15A is a CIE 1931 color space chromaticity diagram showing the x and y chromaticity coordinates of light transmitted through a first example of the optical structure 300a or 300b for different viewing angles between 0 degrees and 40 degrees with respect to a normal to a surface of the optical structure 300a or 300b. FIG. 15B is a CIE 1931 color space chromaticity diagram showing the x and y chromaticity coordinates of light reflected from the first example of the optical structure 300a or 300b for different viewing angles between 0 degrees and 40 degrees with respect to a normal to a surface of the optical structure 300a or 300b. The first example of the optical structure 300a or 300b comprises a layer of silver (Ag) (corresponding to the layer 301b of FIG. 14A or the region 310 of FIG. 14B) having a thickness of about 100 nm surrounded by two layers of a dielectric material comprising zinc sulfide (ZnS) (corresponding to the layers 303a and 303b of FIG. 14A or the region 312 of FIG. 14B) having an individual thickness of about 66 nm. The first example further comprises two additional silver layers disposed over the two dielectric layers (corresponding to the layers 301a and 301c of FIG. 14A or the region 314 of FIG. 14B) having an individual thickness of about 50 nm. To obtain the chromaticity of x and y chromaticity coordinates of light reflected from and transmitted through the first example of the optical structure 300a or 300b, the optical structure 300a or 300b is encapsulated in a SiO₂ matrix, which is used to simulate the printing medium or ink which has a similar refractive index.

As noted from FIGS. 15A and 15B, the first example of the optical structure 300a or 300b appears in different shades of green when viewed in the transmission mode at different viewing angles between 0 degrees and 40 degrees with respect to a normal to a surface of the optical structure 300a or 300b and appears greyish purple when viewed in the reflection mode at different viewing angles between 0 degrees and 40 degrees with respect to a normal to a surface of the optical structure 300a or 300b. The color in the transmission mode and the color in the reflection mode are complementary to each other. It is observed from FIG. 15B that the color in the reflection mode does not vary significantly when viewed in the reflection mode at different viewing angles between 0 degrees and 40 degrees with respect to a normal to a surface of the optical structure 300a or 300b. It is observed from FIG. 15A that there is a slight variation of the color in the transmission mode when viewed in the transmission mode at different viewing angles between 0 degrees and 40 degrees with respect to a normal to a surface of the optical structure 300a or 300b.

Figure 15C:
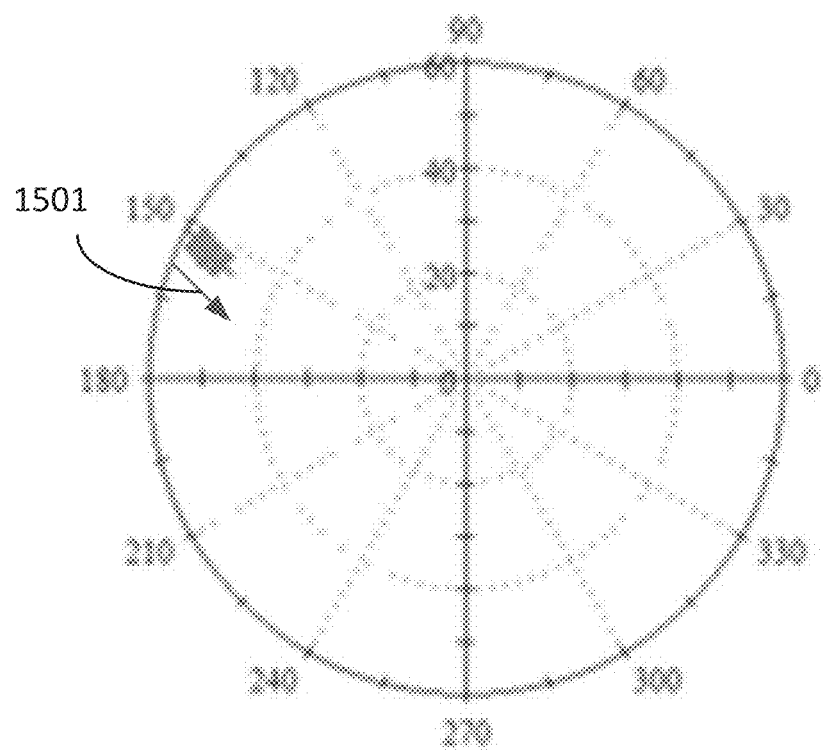
FIG. 15C illustrates the a*b* values in the CIE L*a*b* color space when the first example of the optical structure shown in FIG. 14A or 14B is viewed in the transmission mode at different viewing angles between 0 degrees and 40 degrees with respect to the normal to the surface of the first example of the optical structure.

FIG. 15C illustrates the a*b* values in the CIE L*a*b* color space when the first example of the optical structure 300a/300b is viewed in the transmission mode at different viewing angles between 0 degrees and 40 degrees with respect to the normal to the surface of the first example of the optical structure 300a/300b. As the viewing angle increases the color of the first example of the optical structure 300a/300b in the transmission mode shifts in the direction of the arrow 1501. For example, the color of the first example in the transmission mode can have a lightness (L*) value between approximately 12.5 and approximately 17.0 for different viewing angles between 0 degrees and 40 degrees with respect to the normal to the surface of the first example of the optical structure 300a/300b. The color of the first example in the transmission mode can have an (a*) value between approximately −44.5 and approximately −51.5 for different viewing angles between 0 degrees and 40 degrees with respect to the normal to the surface of the first example of the optical structure 300a/300b. The color of the first example in the transmission mode can have a (b*) value between approximately 20.5 and approximately 27.0 for different viewing angles between 0 degrees and 40 degrees with respect to the normal to the surface of the first example of the optical structure 300a/300b.

Figure 15D:
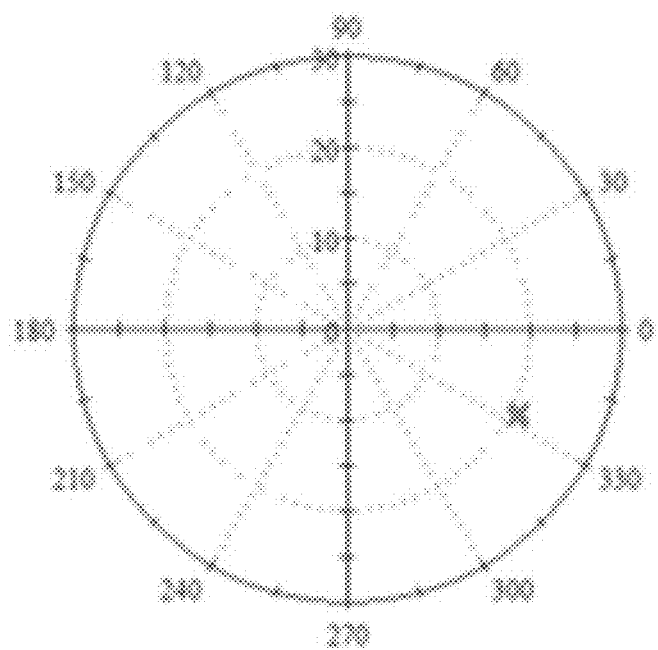
FIG. 15D illustrates the a*b* values in the CIE L*a*b* color space when the first example shown in FIG. 14A or 14B of the optical structure is viewed in the reflection mode at different viewing angles between 0 degrees and 40 degrees with respect to the normal to the surface of the first example of the optical structure.

FIG. 15D illustrates the a*b* values in the CIE L*a*b* color space when the first example of the optical structure 300a/300b is viewed in the reflection mode at different viewing angles between 0 degrees and 40 degrees with respect to the normal to the surface of the first example of the optical structure 300a/300b. It is noted that as the viewing angle increases the color of the first example of the optical structure 300a/300b in the reflection mode does not shift significantly. The color of the first example in the reflection mode can have a lightness (L*) value between approximately 92.7 and approximately 92.8 for different viewing angles between 0 degrees and 40 degrees with respect to the normal to the surface of the first example of the optical structure 300a/300b. The color of the first example in the reflection mode can have an (a*) value between approximately 18.0 and approximately 19.1 for different viewing angles between 0 degrees and 40 degrees with respect to the normal to the surface of the first example of the optical structure 300a/300b. The color of the first example in the reflection mode can have a (b*) value between approximately −8.7 and approximately −9.9 for different viewing angles between 0 degrees and 40 degrees with respect to the normal to the surface of the first example of the optical structure 300a/300b.

Figure 16A:
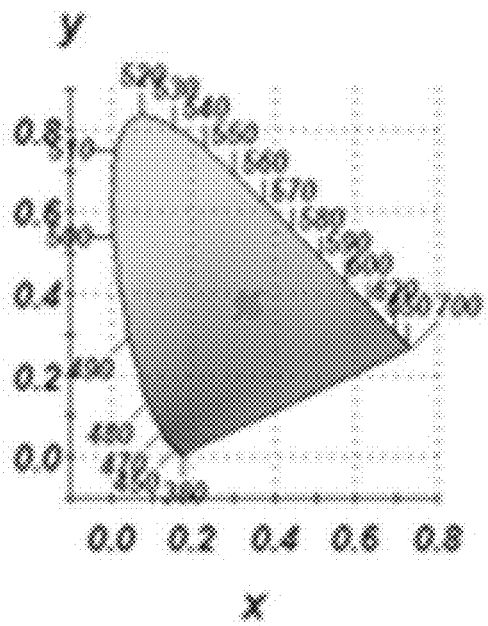
FIG. 16A is a CIE 1931 color space chromaticity diagram showing the x and y chromaticity coordinates of light transmitted through a second example of the optical structure shown in FIG. 14A or 14B for different viewing angles between 0 degrees and 40 degrees with respect to a normal to a surface of the optical structure.
Figure 16B:
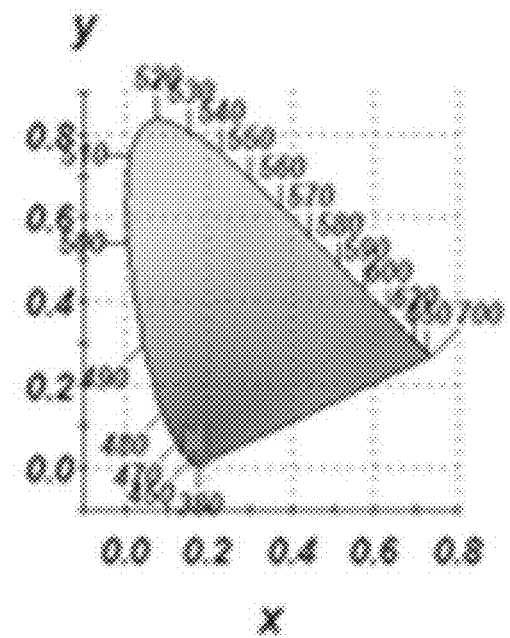
FIG. 16B is a CIE 1931 color space chromaticity diagram showing the x and y chromaticity coordinates of light reflected from the second example of the optical structure shown in FIG. 14A or 14B for different viewing angles between 0 degrees and 40 degrees with respect to a normal to a surface of the optical structure.

FIG. 16A is a CIE 1931 color space chromaticity diagram showing the x and y chromaticity coordinates of light transmitted through a second example of the optical structure 300a or 300b for different viewing angles between 0 degrees and 40 degrees with respect to a normal to a surface of the optical structure 300a or 300b. FIG. 16B is a CIE 1931 color space chromaticity diagram showing the x and y chromaticity coordinates of light reflected from the second example of the optical structure 300a or 300b for different viewing angles between 0 degrees and 40 degrees with respect to a normal to a surface of the optical structure 300a or 300b. The second example of the optical structure 300a or 300b comprises a layer of silver (Ag) (corresponding to the layer 301b of FIG. 14A or the region 310 of FIG. 14B) having a thickness of about 10 nm surrounded by two layers of a dielectric material comprising zinc sulfide (ZnS) (corresponding to the layers 303a and 303b of FIG. 14A or the region 312 of FIG. 14B) having an individual thickness of about 66 nm. The second example further comprises two additional silver layers disposed over the two dielectric layers (corresponding to the layers 301a and 301c of FIG. 14A or the region 314 of FIG. 14B) having an individual thickness of about 5 nm. To obtain the chromaticity of x and y chromaticity coordinates of light reflected from and transmitted through the second example of the optical structure 300a or 300b, the optical structure 300a or 300b is encapsulated in a SiO₂ matrix which is used to simulate the printing medium or ink which has a similar refractive index.

As noted from FIGS. 16A and 16B, the second example of the optical structure 300a or 300b appears greenish grey when viewed in the transmission mode at different viewing angles between 0 degrees and 40 degrees with respect to a normal to a surface of the optical structure 300a or 300b and appears blue or deep purple when viewed in the reflection mode at different viewing angles between 0 degrees and 40 degrees with respect to a normal to a surface of the optical structure 300a or 300b.

Figure 16C:
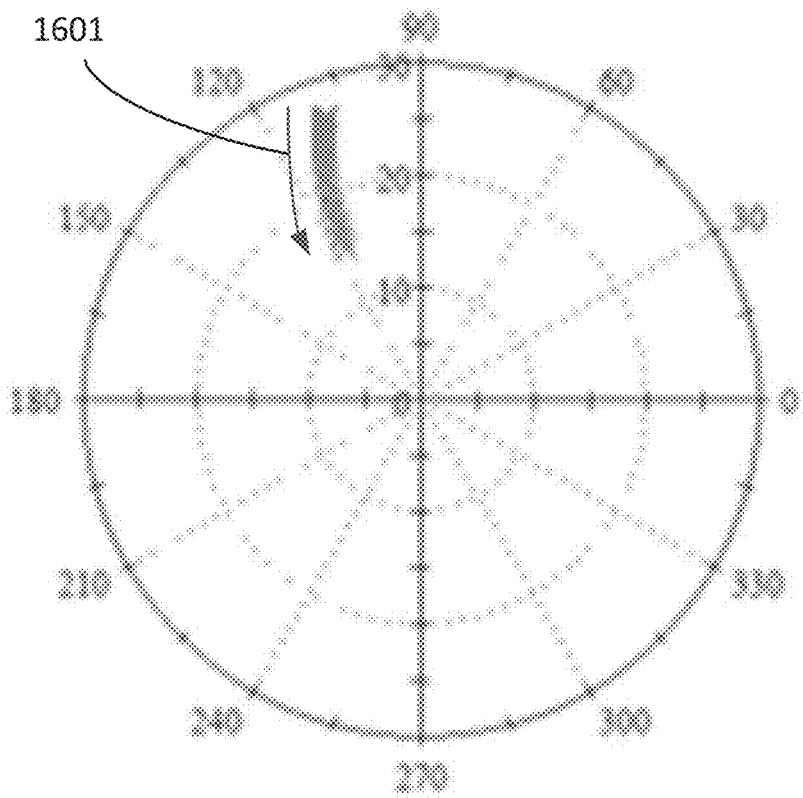
FIG. 16C illustrates the a*b* values in the CIE L*a*b* color space when the second example of the optical structure shown in FIG. 14A or 14B is viewed in the transmission mode at different viewing angles between 0 degrees and 40 degrees with respect to the normal to the surface of the second example of the optical structure.

FIG. 16C illustrates the a*b* values in the CIE L*a*b* color space when the second example of the optical structure 300a/300b is viewed in the transmission mode at different viewing angles between 0 degrees and 40 degrees with respect to the normal to the surface of the second example of the optical structure 300a/300b. As the viewing angle increases the color of the second example of the optical structure 300a/300b in the transmission mode shifts in the direction of the arrow 1601. The color of the second example in the transmission mode can have a lightness (L*) value between approximately 96.0 and approximately 98.5 for different viewing angles between 0 degrees and 40 degrees with respect to the normal to the surface of the second example of the optical structure 300a/300b. The color of the second example in the transmission mode can have an (a*) value between approximately −6.2 and approximately −9.0 for different viewing angles between 0 degrees and 40 degrees with respect to the normal to the surface of the second example of the optical structure 300a/300b. The color of the second example in the transmission mode can have a (b*) value between approximately 12.9 and approximately 25.7 for different viewing angles between 0 degrees and 40 degrees with respect to the normal to the surface of the second example of the optical structure 300a/300b.

Figure 16D:
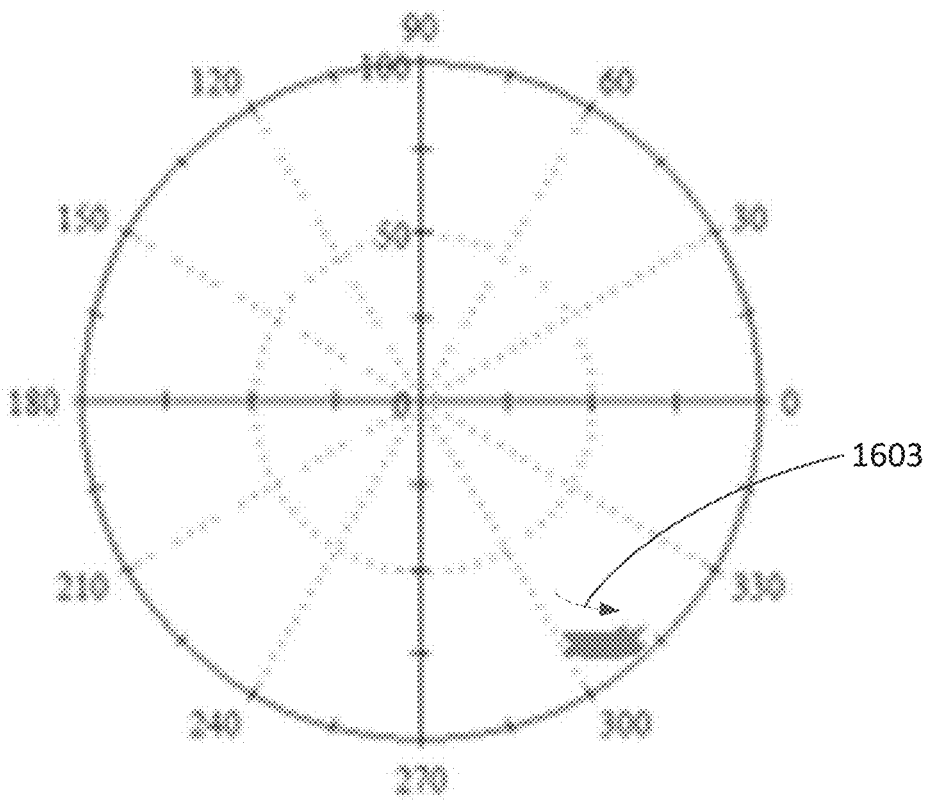
FIG. 16D illustrates the a*b* values in the CIE L*a*b* color space when the second example of the optical structure shown in FIG. 14A or 14B is viewed in the reflection mode at different viewing angles between 0 degrees and 40 degrees with respect to the normal to the surface of the second example of the optical structure.

FIG. 16D illustrates the a*b* values in the CIE L*a*b* color space when the second example of the optical structure 300a/300b is viewed in the reflection mode at different viewing angles between 0 degrees and 40 degrees with respect to the normal to the surface of the second example of the optical structure 300a/300b. As the viewing angle increases the color of the second example of the optical structure 300a/300b in the reflection mode shifts in the direction of the arrow 1603. The color of the second example in the reflection mode can have a lightness (L*) value between approximately 11.0 and approximately 26.5 for different viewing angles between 0 degrees and 40 degrees with respect to the normal to the surface of the second example of the optical structure 300a/300b. The color of the second example in the reflection mode can have an (a*) value between approximately 44.5 and approximately 63.8 for different viewing angles between 0 degrees and 40 degrees with respect to the normal to the surface of the second example of the optical structure 300a/300b. The color of the second example in the reflection mode can have a (b*) value between approximately −69.0 and approximately −72.0 for different viewing angles between 0 degrees and 40 degrees with respect to the normal to the surface of the second example of the optical structure 300a/300b.

Figure 17A:
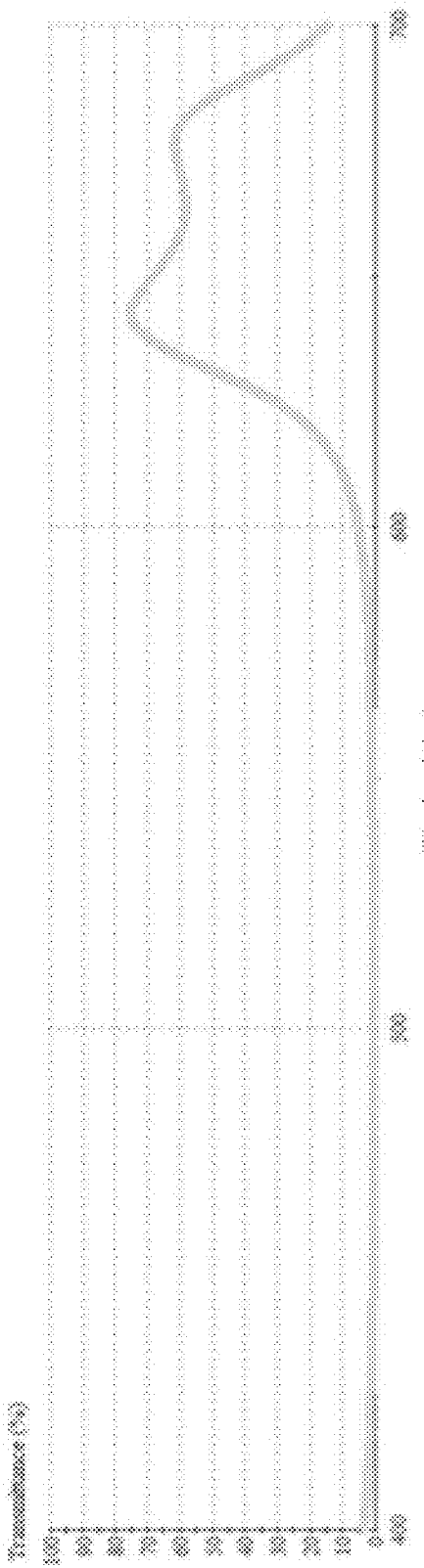
FIG. 17A shows the variation of the transmittance with wavelength for a third example of the optical structure shown in FIG. 14A or 14B at a viewing angle of about 0 degrees with respect to a normal to the surface of the optical structure 300a/300b.
Figure 17B:
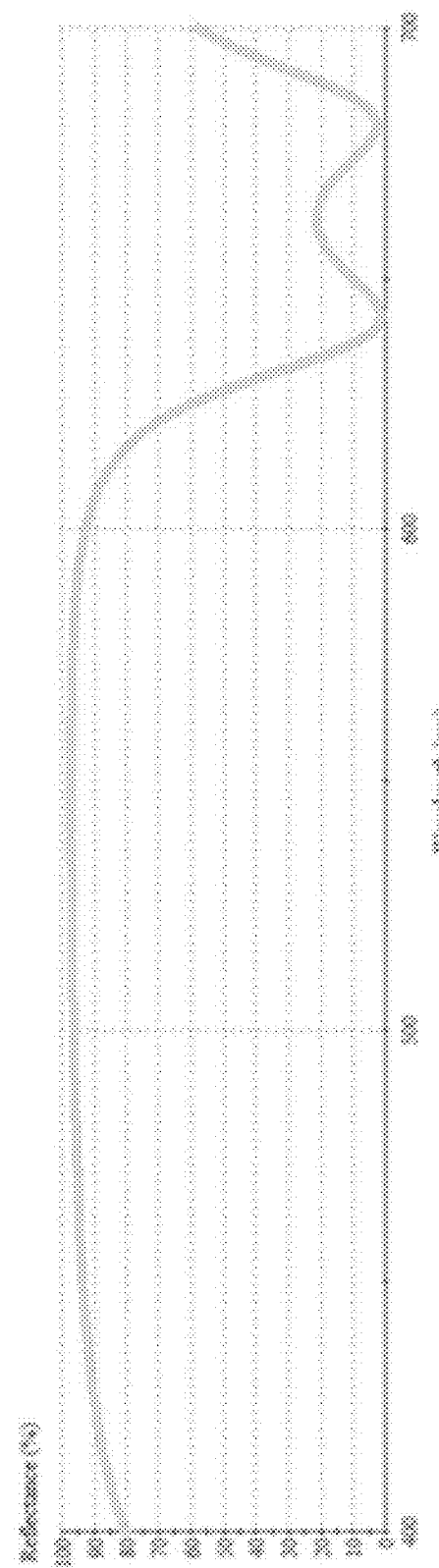
FIG. 17B shows the variation of the reflectance with wavelength for the third example of the optical structure shown in FIG. 14A or 14B at a viewing angle of about 0 degrees with respect to a normal to the surface of the optical structure.

FIG. 17A shows the variation of the transmittance with wavelength for a third example of the optical structure 300a/300b at a viewing angle of 0 degrees with respect to a normal to the surface of the optical structure 300a/300b. FIG. 17B shows the variation of the reflectance with wavelength for the third example of the optical structure 300a/300b at a viewing angle of 0 degrees with respect to a normal to the surface of the optical structure 300a/300b. The third example of the optical structure 300a or 300b comprises a layer of silver (Ag) (corresponding to the layer 301b of FIG. 14A or the region 310 of FIG. 14B) having a thickness of about 40 nm surrounded by two layers of a dielectric material comprising magnesium fluoride ($MgF_2$) (corresponding to the layers 303a and 303b of FIG. 14A or the region 312 of FIG. 14B) having an individual thickness of about 185 nm. The third example further comprises two additional silver layers disposed over the two dielectric layers (corresponding to the layers 301a and 301c of FIG. 14A or the region 314 of FIG. 14B) having an individual thickness of about 23 nm. The third example of the optical structure 300a or 300b is encapsulated in a $SiO_2$ matrix which is used to simulate the printing medium or ink which has a similar refractive index.

It is observed from FIG. 17A that the transmittance through the third example of the optical structure 300a/300b is less than 10% in a wavelength range between about 400 nm and about 600 nm. The transmittance is greater than about 10% for wavelengths greater than about 600 nm and less than about 700 nm. The maximum value of the transmittance occurs at a wavelength between about 630 nm and about 650 nm. It is observed from FIG. 17B that the reflectance from the third example of the optical structure 300a/300b is less than 30% for wavelengths between about 630 nm and about 680 nm. It is observed from the transmittance and the reflectance spectra that the third example of the optical structure 300a/300b will appear red/orange in the transmission mode and grey/blue in the reflection mode.

Figure 17C:
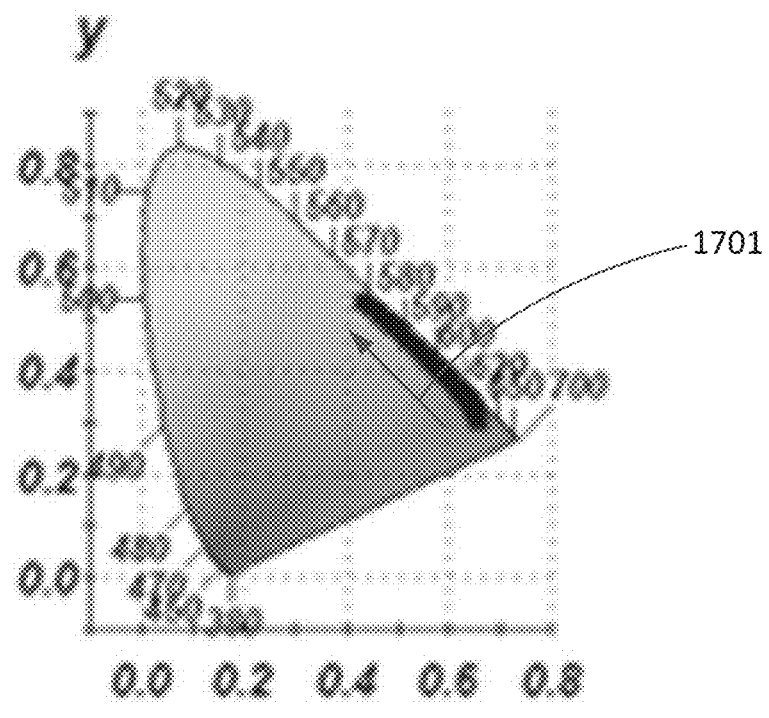
FIG. 17C is a CIE 1931 color space chromaticity diagram showing the x and y chromaticity coordinates of light transmitted through the third example of the optical structure shown in FIG. 14A or 14B for different viewing angles between 0 degrees and 40 degrees with respect to a normal to a surface of the optical structure.
Figure 17D:
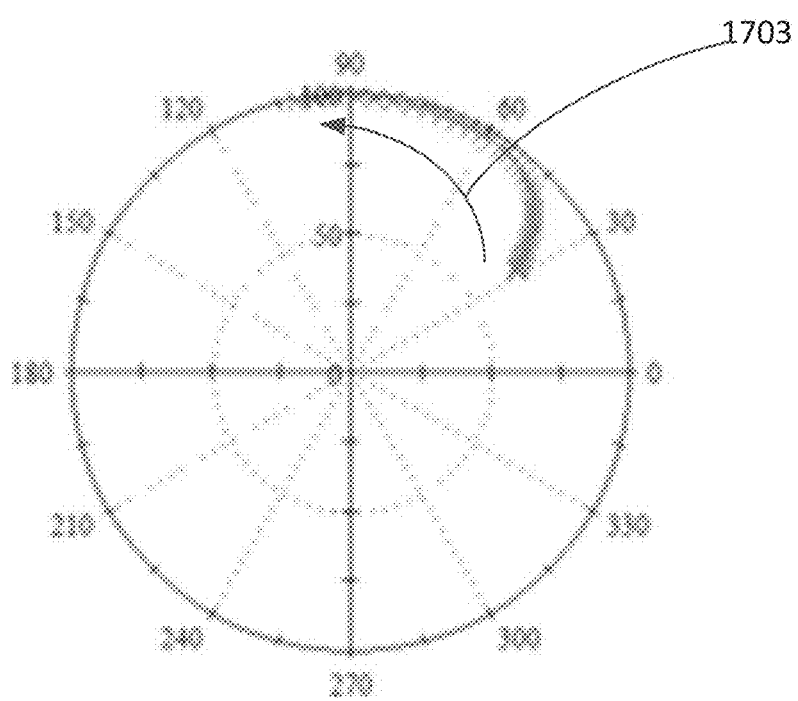
FIG. 17D illustrates the a*b* values in the CIE L*a*b* color space when the third example of the optical structure shown in FIG. 14A or 14B is viewed in the transmission mode at different viewing angles between 0 degrees and 40 degrees with respect to the normal to the surface of the third example of the optical structure.

FIG. 17C is a CIE 1931 color space chromaticity diagram showing the x and y chromaticity coordinates of light transmitted through the third example of the optical structure 300a or 300b for different viewing angles between 0 degrees and 40 degrees with respect to a normal to a surface of the optical structure 300a or 300b. As the viewing angle increases, the color of the optical structure 300a or 300b changes from red towards green in the direction of the arrow 1701. FIG. 17D illustrates the a*b* values in the CIE L*a*b* color space when the third example of the optical structure 300a/300b is viewed in the transmission mode at different viewing angles between 0 degrees and 40 degrees with respect to the normal to the surface of the third example of the optical structure 300a/300b. As the viewing angle increases the color of the third example of the optical structure 300a/300b in the transmission mode shifts in the direction of the arrow 1703. The color of the third example in the transmission mode can have a lightness (L*) value between approximately 26.8 and approximately 77.2 for different viewing angles between 0 degrees and 40 degrees with respect to the normal to the surface of the third example of the optical structure 300a/300b. The color of the third example in the transmission mode can have an (a*) value between approximately −19.2 and approximately 66.0 for different viewing angles between 0 degrees and 40 degrees with respect to the normal to the surface of the third example of the optical structure 300a/300b. The color of the third example in the transmission mode can have a (b*) value between approximately 35.9 and approximately 98.8 for different viewing angles between 0 degrees and 40 degrees with respect to the normal to the surface of the third example of the optical structure 300a/300b.

Figure 17E:
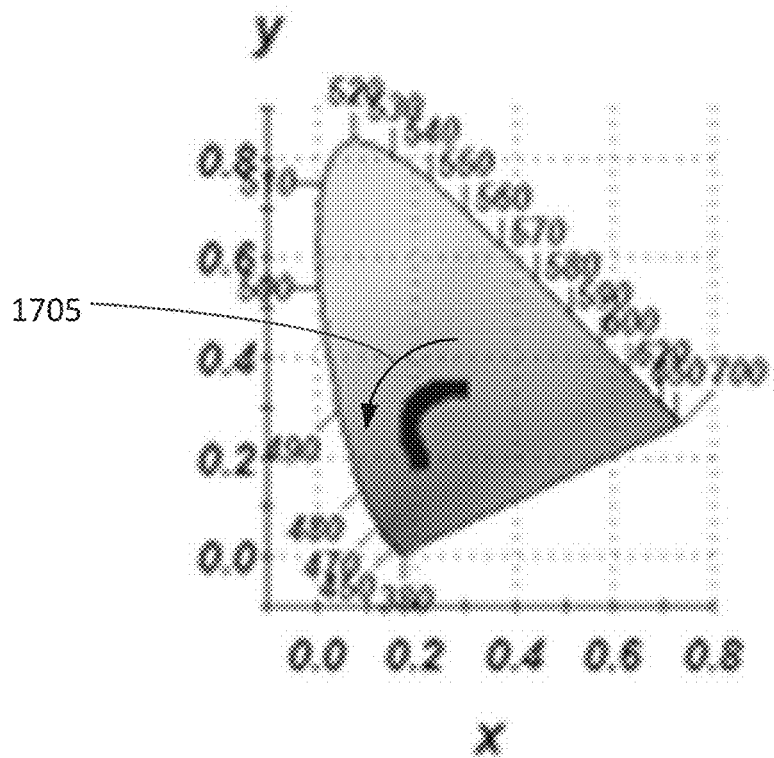
FIG. 17E is a CIE 1931 color space chromaticity diagram showing the x and y chromaticity coordinates of light reflected from the third example of the optical structure shown in FIG. 14A or 14B for different viewing angles between 0 degrees and 40 degrees with respect to a normal to a surface of the optical structure.
Figure 17F:
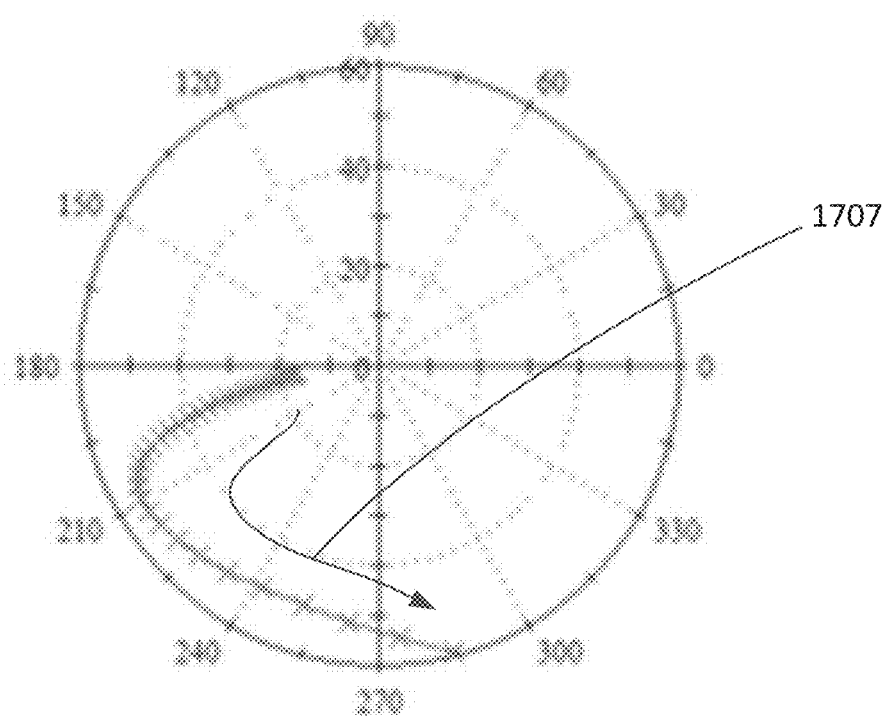
FIG. 17F illustrates the a*b* values in the CIE L*a*b* color space when the third example of the optical structure shown in FIG. 14A or 14B is viewed in the reflection mode at different viewing angles between 0 degrees and 40 degrees with respect to the normal to the surface of the third example of the optical structure.

FIG. 17E is a CIE 1931 color space chromaticity diagram showing the x and y chromaticity coordinates of light reflected from the third example of the optical structure 300a or 300b for different viewing angles between 0 degrees and 40 degrees with respect to a normal to a surface of the third example of the optical structure 300a or 300b. As the viewing angle increases, the color of the optical structure 300a or 300b changes from grey towards blue in the direction of the arrow 1705. FIG. 17F illustrates the a*b* values in the CIE L*a*b* color space when the third example of the optical structure 300a/300b is viewed in the reflection mode at different viewing angles between 0 degrees and 40 degrees with respect to the normal to the surface of the third example of the optical structure 300a/300b. As the viewing angle increases the color of the third example of the optical structure 300a/300b in the reflection mode shifts in the direction of the arrow 1707. The color of the third example in the reflection mode can have a lightness (L*) value between approximately 63.3 and approximately 97.2 for different viewing angles between 0 degrees and 40 degrees with respect to the normal to the surface of the third example of the optical structure 300a/300b. The color of the third example in the reflection mode can have an (a*) value between approximately −48.0 and approximately 15.5 for different viewing angles between 0 degrees and 40 degrees with respect to the normal to the surface of the third example of the optical structure 300a/300b. The color of the third example in the reflection mode can have a (b*) value between approximately −1.0 and approximately −57.9 for different viewing angles between 0 degrees and 40 degrees with respect to the normal to the surface of the third example of the optical structure 300a/300b.

Figure 18A:
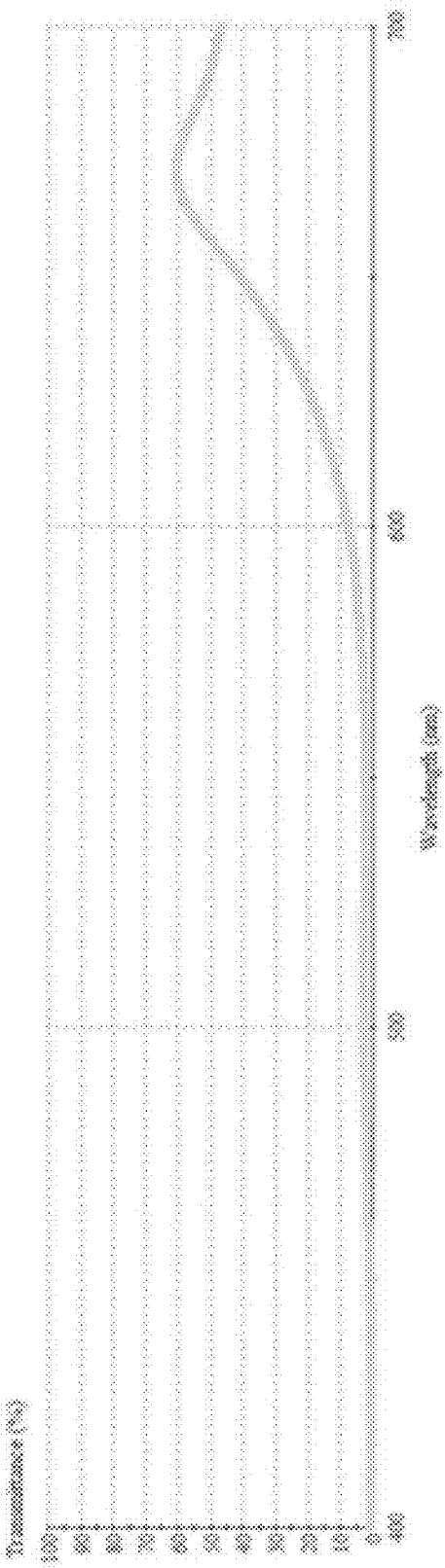
FIG. 18A shows the variation of the transmittance with wavelength for a fourth example of the optical structure shown in FIG. 14A or 14B at a viewing angle of about 0 degrees with respect to a normal to the surface of the optical structure.
Figure 18B:
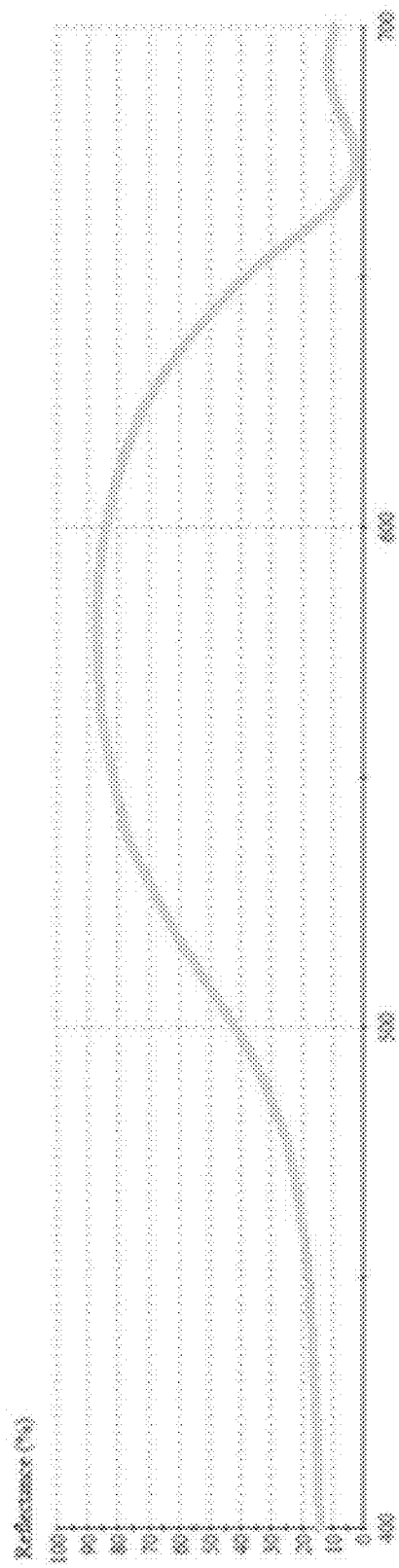
FIG. 18B shows the variation of the reflectance with wavelength for the fourth example of the optical structure shown in FIG. 14A or 14B at a viewing angle of about 0 degrees with respect to a normal to the surface of the optical structure.

FIG. 18A shows the variation of the transmittance with wavelength for a fourth example of the optical structure 300a/300b at a viewing angle of 0 degrees with respect to a normal to the surface of the optical structure 300a/300b. FIG. 18B shows the variation of the reflectance with wavelength for the fourth example of the optical structure 300a/300b at a viewing angle of 0 degrees with respect to a normal to the surface of the optical structure 300a/300b. The fourth example of the optical structure 300a or 300b comprises a layer of gold (Au) (corresponding to the layer 301b of FIG. 14A or the region 310 of FIG. 14B) having a thickness of about 40 nm surrounded by two layers of a dielectric material comprising magnesium fluoride (MgF$_2$) (corresponding to the layers 303a and 303b of FIG. 14A or the region 312 of FIG. 14B) having an individual thickness of about 185 nm. The fourth example further comprises two additional gold layers disposed over the two dielectric layers (corresponding to the layers 301a and 301c of FIG. 14A or the region 314 of FIG. 14B) having an individual thickness of about 23 nm. The fourth example of the optical structure 300a or 300b is encapsulated in a SiO$_2$ matrix which is used to simulate the printing medium or ink which has a similar refractive index.

It is observed from FIG. 18A that the transmittance through the fourth example of the optical structure 300a/300b is less than 10% in a wavelength range between about 400 nm and about 600 nm. The transmittance is greater than about 10% for wavelengths greater than about 600 nm and less than about 700 nm. The maximum value of the transmittance occurs at a wavelength between about 650 nm and about 675 nm. It is observed from FIG. 18B that the reflectance from the fourth example of the optical structure 300a/300b is greater than 30% for wavelengths between about 480 nm and about 650 nm. It is observed from the transmittance and the reflectance spectra that the fourth example of the optical structure 300a/300b will appear red/orange in the transmission mode and yellow-green/aquamarine in the reflection mode.

Figure 18C:
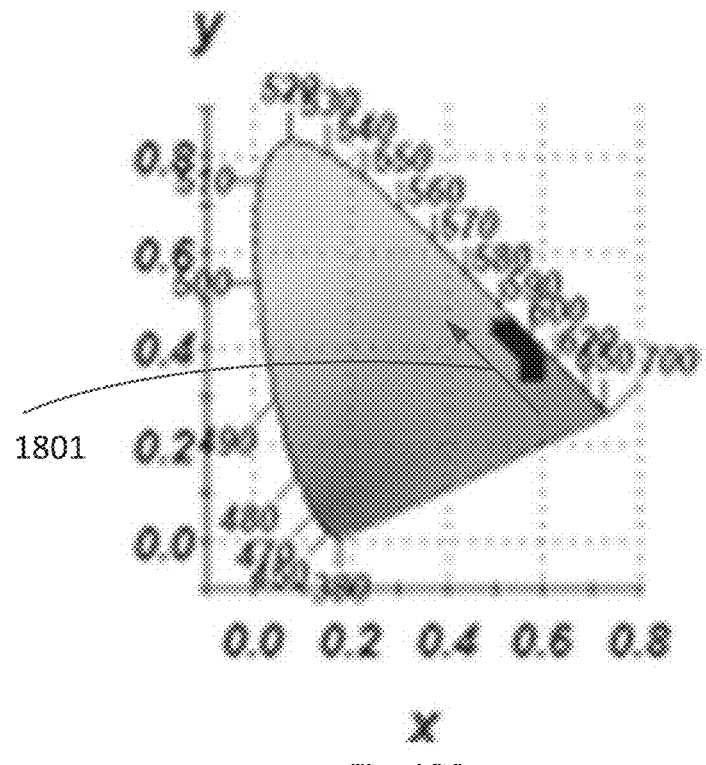
FIG. 18C is a CIE 1931 color space chromaticity diagram showing the x and y chromaticity coordinates of light transmitted through the fourth example of the optical structure for different viewing angles between 0 degrees and 40 degrees with respect to a normal to a surface of the optical structure.
Figure 18D:
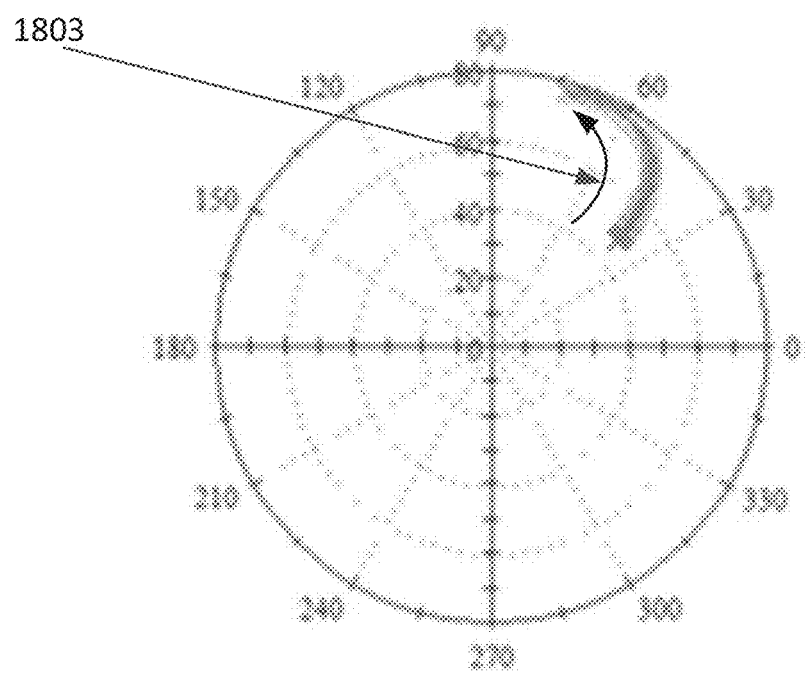
FIG. 18D illustrates the a*b* values in the CIE L*a*b* color space when the fourth example of the optical structure shown in FIG. 14A or 14B is viewed in the transmission mode at different viewing angles between 0 degrees and 40 degrees with respect to the normal to the surface of the fourth example of the optical structure.

FIG. 18C is a CIE 1931 color space chromaticity diagram showing the x and y chromaticity coordinates of light transmitted through the fourth example of the optical structure 300a or 300b for different viewing angles between 0 degrees and 40 degrees with respect to a normal to a surface of the optical structure 300a or 300b. As the viewing angle increases, the color of the optical structure 300a or 300b changes from red towards orange in the direction of the arrow 1801. FIG. 18D illustrates the a*b* values in the CIE L*a*b* color space when the fourth example of the optical structure 300a/300b is viewed in the transmission mode at different viewing angles between 0 degrees and 40 degrees with respect to the normal to the surface of the fourth example of the optical structure 300a/300b. As the viewing angle increases the color of the fourth example of the optical structure 300a/300b in the transmission mode shifts in the direction of the arrow 1803. The color of the fourth example in the transmission mode can have a lightness (L*) value between approximately 27.1 and approximately 62.1 for different viewing angles between 0 degrees and 40 degrees with respect to the normal to the surface of the fourth example of the optical structure 300a/300b. The color of the fourth example in the transmission mode can have an (a*) value between approximately 20.5 and approximately 47.2 for different viewing angles between 0 degrees and 40 degrees with respect to the normal to the surface of the fourth example of the optical structure 300a/300b. The color of the fourth example in the transmission mode can have a (b*) value between approximately 29.5 and approximately 74.3 for different viewing angles between 0 degrees and 40 degrees with respect to the normal to the surface of the fourth example of the optical structure 300a/300b.

Figure 18E:
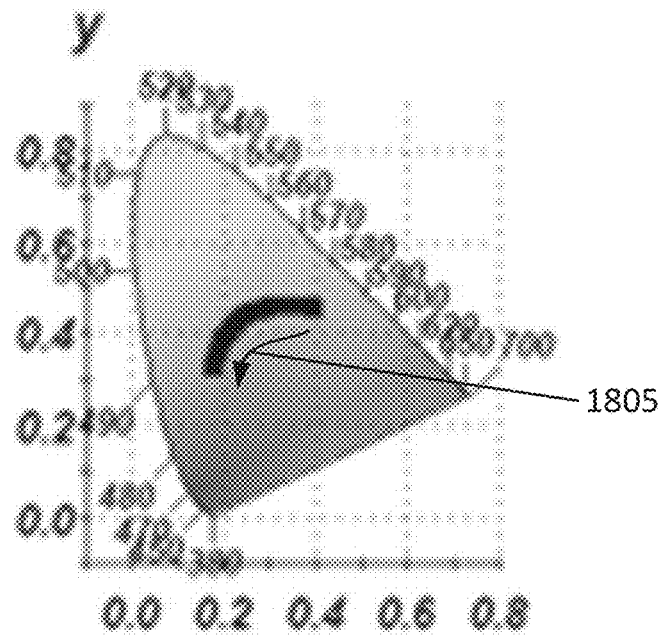
FIG. 18E is a CIE 1931 color space chromaticity diagram showing the x and y chromaticity coordinates of light reflected from the fourth example of the optical structure shown in FIG. 14A or 14B for different viewing angles between 0 degrees and 40 degrees with respect to a normal to a surface of the optical structure.
Figure 18F:
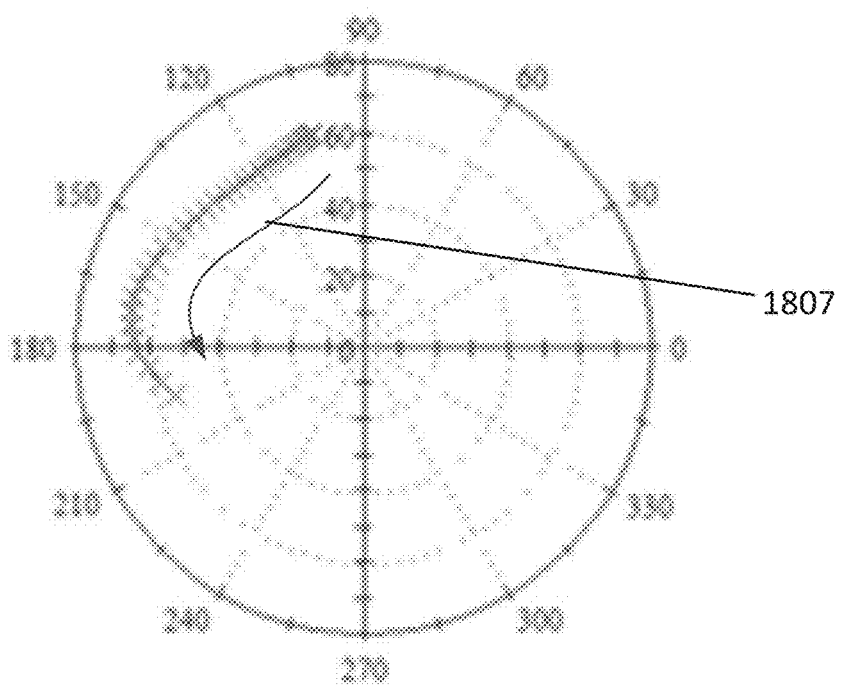
FIG. 18F illustrates the a*b* values in the CIE L*a*b* color space when the fourth example of the optical structure is viewed in the reflection mode at different viewing angles between 0 degrees and 40 degrees with respect to the normal to the surface of the fourth example of the optical structure 300a/300b.

FIG. 18E is a CIE 1931 color space chromaticity diagram showing the x and y chromaticity coordinates of light reflected from the fourth example of the optical structure 300a or 300b for different viewing angles between 0 degrees and 40 degrees with respect to a normal to a surface of the optical structure 300a or 300b. As the viewing angle increases, the color of the optical structure 300a or 300b changes from yellow-green towards aquamarine in the direction of the arrow 1805. FIG. 18F illustrates the a*b* values in the CIE L*a*b* color space when the fourth example of the optical structure 300a/300b is viewed in the reflection mode at different viewing angles between 0 degrees and 40 degrees with respect to the normal to the surface of the fourth example of the optical structure 300a/300b. As the viewing angle increases the color of the fourth example of the optical structure 300a/300b in the reflection mode shifts in the direction of the arrow 1807. The color of the fourth example in the reflection mode can have a lightness (L*) value between approximately 53.3 and approximately 88.5 for different viewing angles between 0 degrees and 40 degrees with respect to the normal to the surface of the fourth example of the optical structure 300a/300b. The color of the fourth example in the reflection mode can have an (a*) value between approximately −13.9 and approximately −65.5 for different viewing angles between 0 degrees and 40 degrees with respect to the normal to the surface of the fourth example of the optical structure 300a/300b. The color of the fourth example in the reflection mode can have a (b*) value between approximately −13.0 and approximately 59.9 for different viewing angles between 0 degrees and 40 degrees with respect to the normal to the surface of the fourth example of the optical structure 300a/300b.

FIG. 19A shows the variation of the transmittance, reflectance and absorptance with wavelength for a fifth example of the optical structure 300a/300b at a viewing angle of 0 degrees with respect to a normal to the surface of the optical structure 300a/300b. In FIG. 19A, curve 1901 shows the variation of transmittance with wavelength, curve 1903 shows the variation of reflectance with wavelength, and curve 1905 shows the variation of absorptance with wavelength. The fifth example of the optical structure 300a or 300b comprises a layer of gold (Au) (corresponding to the layer 301b of FIG. 14A or the region 310 of FIG. 14B) having a thickness of about 40 nm surrounded by two layers of a dielectric material comprising zinc sulfide (ZnS) (corresponding to the layers 303a and 303b of FIG. 14A or the region 312 of FIG. 14B) having an individual thickness of about 80 nm. The fifth example further comprises two additional gold layers disposed over the two dielectric layers (corresponding to the layers 301a and 301c of FIG. 14A or the region 314 of FIG. 14B) having an individual thickness of about 23 nm. The fifth example of the optical structure 300a or 300b is encapsulated in a SiO$_2$ matrix which is used to simulate the printing medium or ink which has a similar refractive index.

It is observed from FIG. 19A that the transmittance through the fifth example of the optical structure 300a/300b is greater than about 10% for wavelengths greater than about 550 nm and less than about 700 nm. The maximum value of the transmittance occurs at a wavelength between about 600 nm and about 650 nm. It is further observed from FIG. 19A that the reflectance from the fifth example of the optical structure 300a/300b is greater than 30% for wavelengths between about 430 nm and about 580 nm. The fifth example of the optical structure 300a/300b has significant absorptance (e.g., greater than about 10%) for wavelengths between about 400 nm and about 700 nm. Accordingly, the color in the transmission mode is not expected to be complementary to the color in the reflection mode.

FIG. 19B is a CIE 1931 color space chromaticity diagram showing the x and y chromaticity coordinates of light transmitted through the fifth example of the optical structure 300a or 300b for different viewing angles between 0 degrees and 40 degrees with respect to a normal to a surface of the optical structure 300a or 300b. FIG. 19C illustrates the a*b* values in the CIE L*a*b* color space when the fifth example of the optical structure 300a/300b is viewed in the transmission mode at different viewing angles between 0 degrees and 40 degrees with respect to the normal to the surface of the fifth example of the optical structure 300a/300b. As the viewing angle increases the color of the fourth example of the optical structure 300a/300b in the transmission mode shifts in the direction of the arrow 1907. The color of the fifth example in the transmission mode can have a lightness (L*) value between approximately 54.0 and approximately 58.5 for different viewing angles between 0 degrees and 40 degrees with respect to the normal to the surface of the fifth example of the optical structure 300a/300b. The color of the fifth example in the transmission mode can have an (a*) value between approximately 35.0 and approximately 40.3 for different viewing angles between 0 degrees and 40 degrees with respect to the normal to the surface of the fifth example of the optical structure 300a/300b. The color of the fifth example in the transmission mode can have a (b*) value between approximately 62.8 and approximately 74.9 for different viewing angles between 0 degrees and 40 degrees with respect to the normal to the surface of the fifth example of the optical structure 300a/300b.

Figure 19D:
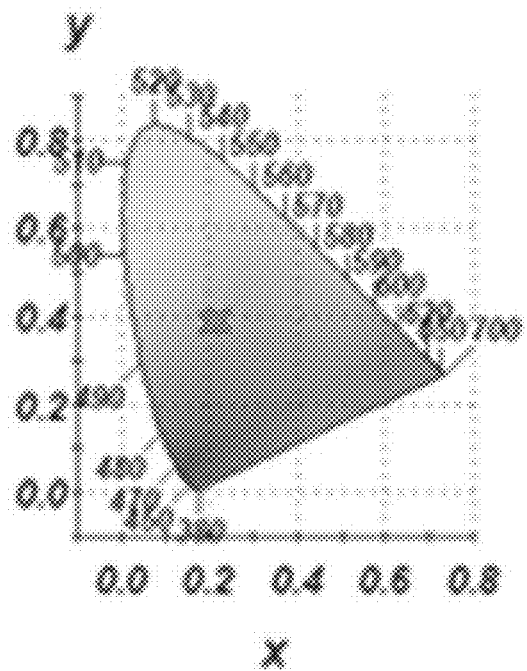
FIG. 19D is a CIE 1931 color space chromaticity diagram showing the x and y chromaticity coordinates of light reflected from the fifth example of the optical structure shown in FIG. 14A or 14B for different viewing angles between 0 degrees and 40 degrees with respect to a normal to a surface of the optical structure.
Figure 19E:
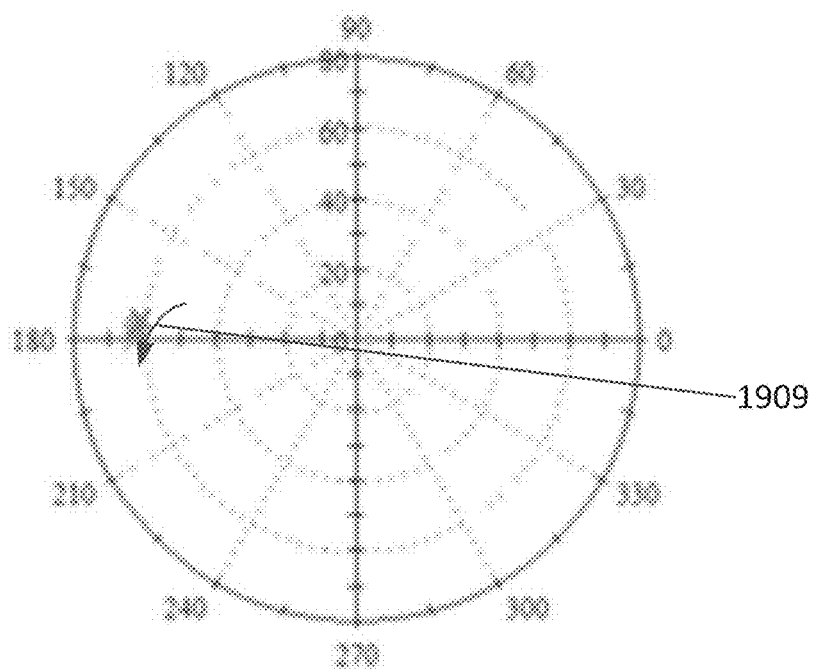
FIG. 19E illustrates the a*b* values in the CIE L*a*b* color space when the fifth example of the optical structure shown in FIG. 14A or 14B is viewed in the reflection mode at different viewing angles between 0 degrees and 40 degrees with respect to the normal to the surface of the fifth example of the optical structure.

FIG. 19D is a CIE 1931 color space chromaticity diagram showing the x and y chromaticity coordinates of light reflected from the fifth example of the optical structure 300a or 300b for different viewing angles between 0 degrees and 40 degrees with respect to a normal to a surface of the optical structure 300a or 300b. FIG. 19E illustrates the a*b* values in the CIE L*a*b* color space when the fifth example of the optical structure 300a/300b is viewed in the reflection mode at different viewing angles between 0 degrees and 40 degrees with respect to the normal to the surface of the fifth example of the optical structure 300a/300b. As the viewing angle increases the color of the fifth example of the optical structure 300a/300b in the reflection mode shifts in the direction of the arrow 1909. The color of the fifth example in the reflection mode can have a lightness (L*) value between approximately 64.5 and approximately 77.3 for different viewing angles between 0 degrees and 40 degrees with respect to the normal to the surface of the fifth example of the optical structure 300a/300b. The color of the fifth example in the reflection mode can have an (a*) value between approximately −60.1 and approximately −63.7 for different viewing angles between 0 degrees and 40 degrees with respect to the normal to the surface of the fifth example of the optical structure 300a/300b. The color of the fifth example in the reflection mode can have a (b*) value between approximately −0.1 and approximately 6.6 for different viewing angles between 0 degrees and 40 degrees with respect to the normal to the surface of the fifth example of the optical structure 300a/300b.

Without relying on any particular theory, the color in the reflection and the transmission mode is dependent on the thickness and the composition of the different layers of the optical structure 300a or 300b. For example, in some implementations little to no light is transmitted through an implementation of an optical structure 300a or 300b in which the dielectric layers 303a and 303b are absent. The brightness of the color in the reflection mode can increase as the thickness of the metal layers 301a, 301b, and 301c increases while the brightness of the color in the transmission mode can decrease as the thickness of the metal layers 301a, 301b, and 301c increases in certain implementations.

Without subscribing on any particular theory, various implementations of the optical structure 300a or 300b can exhibit variation in the reflected and/or transmitted color as the viewing angle changes. The variation in the reflected and/or transmitted color with change in the viewing angle can be large (or significant) if the refractive index of the dielectric material of the layers 303a and 303b has a refractive index less than about 2.0. For example, the variation in the reflected and/or transmitted color with change in the viewing angle can be large (or significant) if the layers 303a and 303b comprises silica ($SiO_2$) having a refractive index of about 1.5 or magnesium fluoride ($MgF_2$) having a refractive index of about 1.39. The variation in the reflected and/or transmitted color with change in the viewing angle can be small (or insignificant) if the refractive index of the dielectric material of the layers 303a and 303b has a refractive index greater than about 2.0. For example, the variation in the reflected and/or transmitted color with change in the viewing angle can be small (or insignificant) if the layers 303a and 303b comprises zinc sulfide (ZnS) having a refractive index of about 2.38 or other high refractive index materials such as, for example, zirconium dioxide ($ZrO_2$) or ceric oxide ($CeO_2$). In various implementations, the variation in the reflected and/or transmitted color with change in the viewing angle can depend on the thickness of the dielectric layers 303a and 303b.

The optical structures 300a/300b configured as foil, film or platelets can be incorporated with or in a document (e.g., a banknote), package, product, or other item. Optical products such as a film, a thread, a laminate, a foil, a pigment, or an ink comprising one or more of the optical structures 300a/300b discussed above can be incorporated with or in documents such as banknotes or other documents to verify authenticity of the documents, packaging materials, etc. For example, the optical structures 300a/300b can be configured as an ink or a pigment which is disposed on a base comprising at least one of a polymer, a plastic, a paper or a fabric. The base may be flexible in some implementations. The base comprising the ink or a pigment or pigment comprising the optical structures 300a or 300b can be cut or diced to obtain a thread or a foil. A plurality of optical structures 300a or 300b discussed above can be incorporated in a particular optical product (e.g., ink, pigment, thread, filament, paper, security ink, security pigment, security thread, security filament, security paper, etc.). The shapes, sizes and/or aspect ratios of the plurality of optical structures 300a or 300b discussed above that are incorporated in a particular optical product (e.g., ink, pigment, thread, filament, paper, security ink, security pigment, security thread, security filament, security paper, etc.) can vary. Accordingly, a particular optical product (e.g., ink, pigment, thread, filament, paper, security ink, security pigment, security thread, security filament, security paper, etc.) can comprise optical structures 300a or 300b with different distributions of shapes, sizes and/or aspect ratios of the optical structures. For example, a particular optical product (e.g., ink, pigment, thread, filament, paper, security ink, security pigment, security thread, security filament, security paper, etc.) can comprise optical structures 300a or 300b with sizes distributed around one or more mean sizes. As another example, a particular optical product (e.g., ink, pigment, thread, filament, paper, security ink, security pigment, security thread, security filament, security paper, etc.) can comprise optical structures 300a or 300b with aspect ratios distributed around one or more aspect ratios.

As discussed above, the color in the reflection mode and the transmission mode of an implementation of an optical structure 300a or 300b depends on the thickness and the composition of the various metal layers and the various dielectric layers that form the implementation of the optical structure 300a or 300b. Accordingly, the reflected and/or transmitted color of a particular optical product (e.g., ink, pigment, thread, filament, paper, security ink, security pigment, security thread, security filament, security paper, etc.) can be tailored by incorporated plurality of optical structures 300a or 300b having different thicknesses and/or compositions of the various constituent layers. By combining plurality of optical structures 300a or 300b having different thicknesses and/or compositions of the various constituent layers, optical products (e.g., ink, pigment, thread, filament, paper, security ink, security pigment, security thread, security filament, security paper, etc.) having different reflected and/or transmitted colors can be manufactured.

Figure 20A:
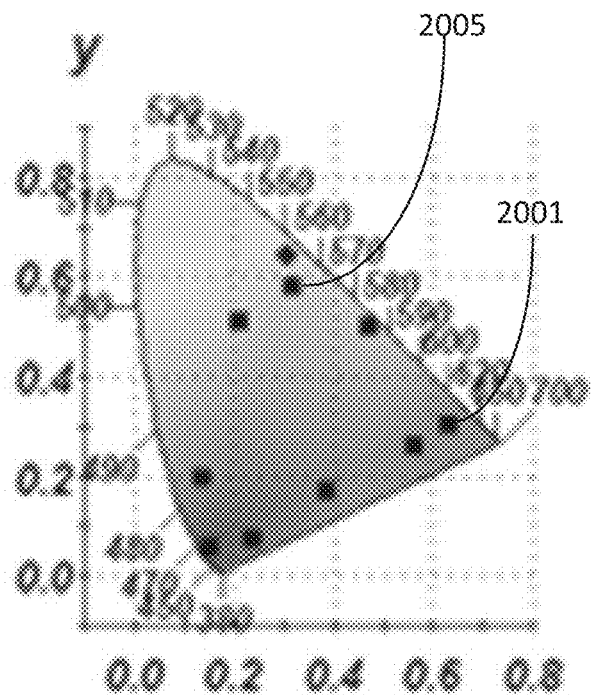
FIGS. 20A and 20B are CIE 1931 color space chromaticity diagrams respectively showing the x and y chromaticity coordinates of light transmitted through and reflected from various implementations of an optical structure having a geometry similar to the geometry of the implementations illustrated in FIGS. 14A and 14B.
Figure 20B:
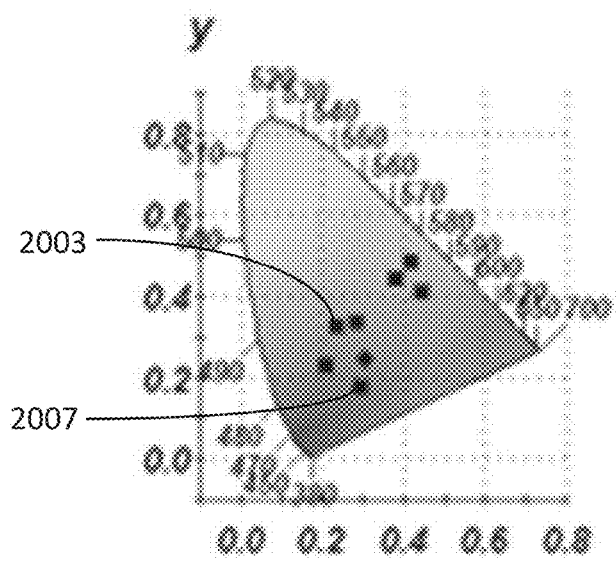

FIGS. 20A and 20B are CIE 1931 color space chromaticity diagrams respectively showing the x and y chromaticity coordinates of light transmitted through and reflected from various implementations of an optical structure having a geometry similar to optical structure 300a or 300b. The various implementations of the optical structure include three metal layers comprising silver (Ag) and two dielectric layers comprising zinc sulfide (ZnS). The thickness of a central metal layer comprising silver (Ag) (e.g., corresponding to layer 301b in FIG. 14A or region 310 in FIG. 14B) can be about 40 nm in the various implementations of the optical structure. The thickness of the surrounding metal layers comprising silver (Ag) (e.g., corresponding to layers 301a and 301c in FIG. 14A or region 314 in FIG. 14B) can be about 25 nm in the various implementations of the optical structure. The thickness of the two dielectric layers (e.g., corresponding to layers 303a and 303b in FIG. 14A or region 312 in FIG. 14B) can be in a range between about 40 nm and about 183 nm in the various implementations of the optical structure.

For example, the region 2001 in FIG. 20A shows the x and y chromaticity coordinates of light transmitted through an implementation of an optical structure with two dielectric layers comprising zinc sulfide (ZnS) having an individual thickness of about 95 nm. The region 2003 in FIG. 20B shows the corresponding x and y chromaticity coordinates of light reflected from the implementation of the optical structure with two dielectric layers comprising zinc sulfide (ZnS) having an individual thickness of about 95 nm. As another example, the region 2005 in FIG. 20A shows the x and y chromaticity coordinates of light transmitted through an implementation of an optical structure with two dielectric layers comprising zinc sulfide (ZnS) having an individual thickness of about 66 nm. The region 2007 in FIG. 20B shows the corresponding x and y chromaticity coordinates of light reflected from the implementation of the optical structure with two dielectric layers comprising zinc sulfide (ZnS) having an individual thickness of about 66 nm.

As noted from FIGS. 20A and 20B implementations of optical structures with different thickness of the dielectric layers produce different colors in the transmission and reflection mode. For example, other regions corresponding to other designs are also shown in the CIE 1931 color space chromaticity diagrams of FIGS. 20A and 20B. Accordingly, pigments and/or inks that are configured to produce a wide variety of colors in a color space can be obtained by varying the thickness of the individual dielectric layers of the constituent optical structures. Other variations, for example, of the material composition and/or thickness of the other layers (metal and/or dielectric) are possible. Such different designs may provide different colors and/or other characteristics such as amount of color shift with angle, etc.

The optical performance of example optical structures with and without protective dielectric layers having parameters provided in Tables 9 and 10 were analyzed. The material composition and the thickness of the various layers for the example optical structure without protective layers are provided in Table 9 and the material composition and the thickness of the various layers for the example optical structure with protective layers are provided in Table 10.

TABLE 9

Material Composition and thickness of the various layers of an example optical structure without protective layers.

| Layer | Material | Refractive Index | Extinction Coefficient | Optical Physical Thickness (Full Wavelength Optical Thickness) | Thickness (nm) |
|---|---|---|---|---|---|
|  | SiO2 | 1.46180 | 0.00000 |  |  |
| 1 | Ag | 0.05100 | 2.96000 | 0.00250000 | 25.00 |
| 2 | ZnS | 2.37920 | 0.00000 | 0.30789645 | 66.00 |
| 3 | Ag | 0.05100 | 2.96000 | 0.00400000 | 40.00 |
| 4 | ZnS | 2.37920 | 0.00000 | 0.30789645 | 66.00 |
| 5 | Ag | 0.05100 | 2.96000 | 0.00250000 | 25.00 |
| Sub-strate | Glass | 1.52083 | 0.00000 |  |  |

TABLE 10

Material Composition and thickness of the various layers of an example optical structure with protective layers.

| | Medium | Refractive Index | Extinction Coefficient | Optical Physical Thickness (Full Wavelength Optical Thickness) | Thickness (nm) |
|---|---|---|---|---|---|
|  | SiO2 | 1.46180 | 0.00000 |  |  |
| 1 | ZnS | 2.37920 | 0.00000 | 0.04665098 | 10.00 |
| 2 | Ag | 0.05100 | 2.96000 | 0.00250000 | 25.00 |
| 3 | ZnS | 2.37920 | 0.00000 | 0.30789645 | 66.00 |
| 4 | Ag | 0.05100 | 2.96000 | 0.00400000 | 40.00 |
| 5 | ZnS | 2.37920 | 0.00000 | 0.30789645 | 66.00 |
| 6 | Ag | 0.05100 | 2.96000 | 0.00250000 | 25.00 |
| 7 | ZnS | 2.37920 | 0.00000 | 0.04665098 | 10.00 |
| Sub-strate | Glass | 1.52083 | 0.00000 |  |  |

The material composition of the various layers of the example optical structure with protective layers is the same as the material composition of the various layers of the example optical structure without protective layers but with the additional protective layers. For example, the example optical structures comprise an Ag layer having a thickness of 40 nm sandwiched by two ZnS layers each having a thickness of 66 nm. Two Ag layers each having a thickness of 25 nm are disposed on the side of the two ZnS layers opposite the side facing the Ag layer having a 40 nm thickness. The example optical structure with the protective layers included additional ZnS layers each having a thickness of 10 nm. The $SiO_2$ layer and glass layer represent the medium (e.g., refractive indices of approximately 1.4-1.6) in which the optical stack is immersed (e.g., organic vehicle for pigment). In both examples, when outputting a spectral scan, $SiO_2$ and glass can index match the organic vehicle and in effect disappear with respect to the optical performance of the optical stack.

Table 11 provides the CIELa*b* values for transmission mode when the example optical structure without protective layers (e.g., having parameters as described in Table 9) is viewed at different viewing angles in the presence of a D65 light source. Table 12 provides the CIELa*b* values for transmission mode when the example optical structure with protective layers (e.g., having parameters as described in Table 10) is viewed at different viewing angles in the presence of a D65 light source.

TABLE 11

CIELab values for transmission mode when the example optical structure without protective layers (e.g., having parameters as described in Table 9) is viewed at different viewing angles in the presence of a D65 light source.
Design ZnS with 3 layers of Ag dichroic design
Polarisation P
Source D65
Observer CIE 1931
Mode Transmittance

| Incident Angle | L* | a* | b* |
|---|---|---|---|
| Wht Pt | 100.0000 | 0.0000 | 0.0000 |
| 0.0 | 75.0871 | −72.4036 | 71.2058 |
| 5.0 | 75.0948 | −72.6351 | 71.1003 |
| 10.0 | 75.1162 | −73.3251 | 70.7800 |
| 15.0 | 75.1464 | −74.4601 | 70.2335 |
| 20.0 | 75.1770 | −76.0180 | 69.4423 |
| 25.0 | 75.1956 | −77.9679 | 68.3802 |
| 30.0 | 75.1849 | −80.2708 | 67.0130 |
| 35.0 | 75.1217 | −82.8794 | 65.2976 |
| 40.0 | 74.9748 | −85.7385 | 63.1796 |

TABLE 12

CIELab values for transmission mode when the example optical structure with protective layers (e.g., having parameters as described in Table 10) is viewed at different viewing angles in the presence of a D65 light source.
Design ZnS with 3 layers of Ag dichroic design
Polarisation P
Source D65
Observer CIE 1931
Mode Transmittance

| Incident Angle | L* | a* | b* |
|---|---|---|---|
| Wht Pt | 100.0000 | 0.0000 | 0.0000 |
| 0.0 | 78.6293 | −69.6413 | 69.0996 |
| 5.0 | 78.6168 | −69.9121 | 69.0059 |
| 10.0 | 78.5767 | −70.7180 | 68.7193 |
| 15.0 | 78.5019 | −72.0398 | 68.2237 |
| 20.0 | 78.3805 | −73.8464 | 67.4936 |
| 25.0 | 78.1956 | −76.0948 | 66.4964 |
| 30.0 | 77.9258 | −78.7316 | 65.1949 |
| 35.0 | 77.5441 | −81.6934 | 63.5499 |
| 40.0 | 77.0167 | −84.9067 | 61.5232 |

Figure 21A:
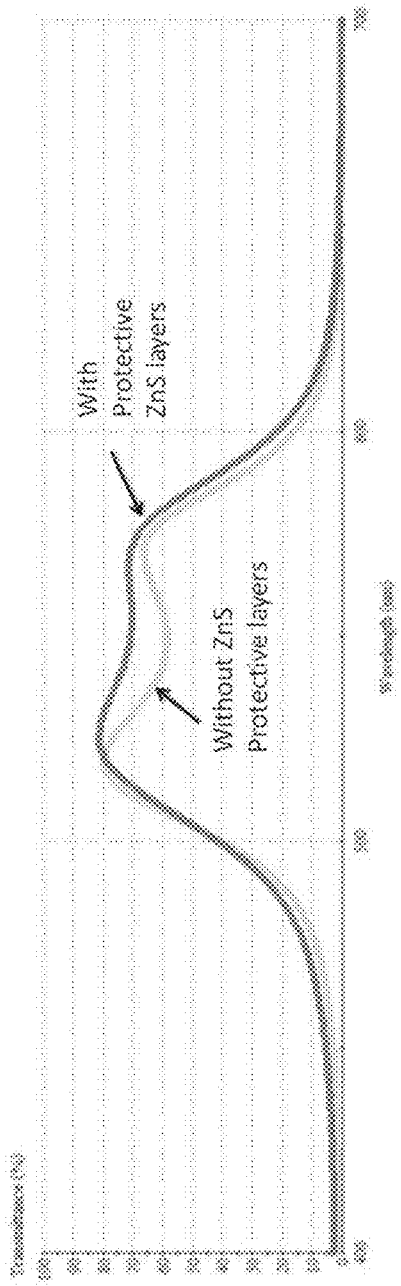
FIGS. 21A and 21B respectively illustrate the transmittance and reflectance spectra for example optical structures with and without protective layers.
Figure 21B:
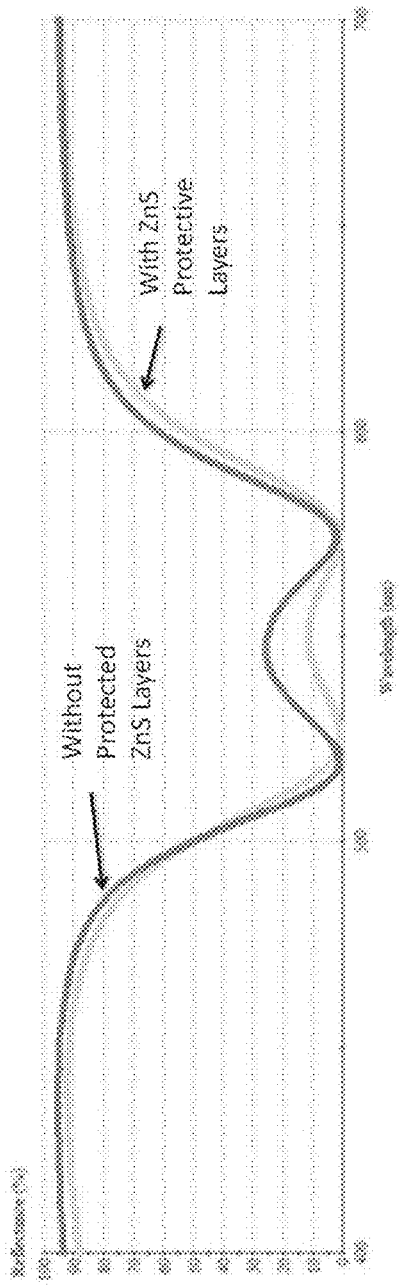

FIGS. 21A and 21B respectively illustrate the transmittance and reflectance spectra for the example optical structures with and without protective layers. With additional protective layers, the color in transmission or reflection (e.g., as indicated by the peaks and dips) is not greatly impacted. Hence, in various implementations, protective layers can be used to enhance durability, allow for safer processing, reduce oxidation and/or corrosion with negligible effect on optical performance in transmission and/or reflection.

The disclosure set forth herein describes a wide variety of structures and methods but should not be considered to be limited to those particular structures or methods. For example, although many of the example optical structures 10, 300a, or 300b are symmetrical, asymmetric structures are also possible. For example, instead of having a pair of similar or identical dielectric layers sandwiching the pair of metallic layers, either dielectric or metal layers having different characteristics (e.g., thickness or material) may be used on opposite sides of the structure or alternatively, maybe only one side of the pair of metal layers has a dielectric layer thereon. Similarly, the metal layers need not be identical and may have different characteristics such as different thicknesses or materials. As described above, intervening layers may also be included. One or more such intervening layer may be include such that the optical structure is not symmetric. For example, one or more intervening layers may be included between the dielectric layer 12 and metal layer 13 (or the dielectric layer 303a and the metal layer 301a) and not between that metal layer 15 and the dielectric layer 16 (or the dielectric layer 303b and the metal layer 301c) or vice versa. Similarly, one or more intervening layers may be included between the metal layer 13 and the dielectric layer 14 and not between the dielectric layer 14 and the metal layer 15, or vice versa. Likewise, one or more intervening layers having different characteristics (e.g., material or thickness) may be included on different sides of the optical structure 10, 300a, or 300b. Or more intervening layers may be included on one side of the optical structure 10, 300a or 300b than on the other side of the optical structure. For example, the metal layer 13, the metal layer 15, the metal layer 301a, the metal layer 301b and/or the metal layer 301c can comprise metal sub-layers. In some implementations, the metal layer 13 and/or the metal layer 15 can comprise a first metal (e.g., silver) facing the high refractive index transparent layers 12 or 16 and a second metal (e.g., gold) facing the dielectric layer 14. In some implementations, the metal layer 301a and the metal layer 301c can comprise a first metal (e.g., gold) and the metal layer 301b can comprise a second metal (e.g., silver). Other variations are possible.

Likewise, although this disclosure describes applications of the structures and method describe herein to include security applications, e.g., countering successful use of counterfeit currency, documents, and products, this disclosure should not be considered to be limited to those particular applications. Alternatively or in addition, such features could, for example, be used for providing an aesthetic effect, to create appealing or attractive features on products or packaging for marketing and advertisement, or for other reasons.

Dimensions, such as, thickness, length, width of various embodiments described herein can be outside the different ranges provided in this disclosure. The values of refractive indices for the various materials discussed herein can be outside the different ranges provided in this disclosure. The values for reflectance and/or transmittance of the different structures can be outside the different ranges provided herein. The values for spectral widths and peak locations for the reflection and transmission spectra can be outside the different ranges provided herein.

Various embodiments of the present invention have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. A document having security features, the document comprising:
    a main body; and
    an optical structure disposed on the main body, the optical structure comprising:
        a first metal layer having a first refractive index (n+ik) comprising a real part (n) and an imaginary part (k), wherein a ratio of the real part (n) of the first refractive index to the imaginary part (k) of the first refractive index is greater than or equal to 0.01 and less than or equal to 0.2;
a first dielectric layer disposed on a first side of the first metal layer;
a second dielectric layer disposed on a second side of the first metal layer;
a second metal layer disposed on a side of the first dielectric layer opposite a side facing the first metal layer, the second metal layer having a second refractive index (n+ik) comprising a real part (n) and an imaginary part (k), wherein a ratio of the real part (n) of the second refractive index to the imaginary part (k) of the second refractive index is greater than or equal to 0.01 and less than or equal to 0.2; and
a third metal layer disposed on a side of the second dielectric layer opposite a side facing the first metal layer, the third metal layer having a third refractive index (n+ik) comprising a real part (n) and an imaginary part (k), wherein a ratio of the real part (n) of the third refractive index to the imaginary part (k) of the third refractive index is greater than or equal to 0.01 and less than or equal to 0.2,
wherein the optical structure is configured to produce a first color in transmission mode and a second color different from the first color in reflection mode.

2. The document of claim 1, wherein the optical structure is suspended in a medium.

3. The document of claim 2, wherein the medium comprises acrylic melamine, urethane, polyester, vinyl resin, acrylate, methacrylate, acrylonitrile butadiene styrene (ABS) resin, epoxy, styrene, a formulation based on alkyd resin, or a combination or mixture thereof.

4. The document of claim 1, wherein the optical structure has a thickness, and wherein a length or a width of the optical structure is between 5-10 times the thickness of the optical structure.

5. The document of claim 1, wherein the first metal layer comprises at least one of silver, silver alloy, gold, or gold alloy.

6. The document of claim 1, wherein the second metal layer comprises at least one of silver, silver alloy, gold, or gold alloy.

7. The document of claim 1, wherein the third metal layer comprises at least one of silver, silver alloy, gold, or gold alloy.

8. The document of claim 1, wherein the first or second dielectric layer comprises at least one of magnesium fluoride, silicon dioxide, ceric oxide, zinc sulfide, zirconium dioxide, titanium dioxide, tantalum pentoxide, yttrium oxide, indium oxide, tin oxide, indium tin oxide, aluminum oxide or tungsten trioxide.

9. The document of claim 1, further comprising:
a third dielectric layer disposed on a side of the second metal layer opposite a side facing the first dielectric layer; and
a fourth dielectric layer disposed on a side of the third metal layer opposite a side facing the second dielectric layer.

10. The document of claim 9, wherein the third and/or the fourth dielectric layers have a thickness from 2 nm to 20 nm.

11. The document of claim 9, wherein the optical structure is suspended in a medium having a refractive index, and wherein the third and/or fourth dielectric layers have a refractive index that substantially matches the refractive index of the medium.

12. The document of claim 9, wherein the third and/or fourth dielectric layers comprise silicon dioxide.

13. The document of claim 1, wherein the optical structure is configured as a film or foil.

14. The document of claim 1, wherein the optical structure is configured as a thread, laminate, hot stamp, window patch, or label.

15. The document of claim 1, wherein a thickness of the first, second, or third metal layer is between 5 nm and 100 nm.

16. The document of claim 1, wherein a thickness of the first or second dielectric layer is between 40 nm and 850 nm.

17. The document of claim 1, wherein the second color is a complementary color of the first color.

18. The document of claim 1, wherein the second color is a non-complementary color of the first color.

19. The document of claim 1, wherein the first color or the second color changes with a change in a viewing angle.

20. The document of claim 1, wherein the first color or the second color does not change with a change in a viewing angle.

21. The document of claim 1, wherein the document is a banknote.

22. The document of claim 1, wherein the optical structure is configured as a pigment, paint, or ink.

* * * * *